(12) United States Patent
Brown et al.

(10) Patent No.: US 9,182,486 B2
(45) Date of Patent: Nov. 10, 2015

(54) SONAR RENDERING SYSTEMS AND ASSOCIATED METHODS

(75) Inventors: Kevin Brown, Broken Arrow, OK (US); Aaron Coleman, Broken Arrow, OK (US)

(73) Assignee: Navico Holding AS, Egersund (NO)

( * ) Notice: Subject to any disclaimer, the term of this patent is extended or adjusted under 35 U.S.C. 154(b) by 902 days.

(21) Appl. No.: 13/313,574

(22) Filed: Dec. 7, 2011

(65) Prior Publication Data
US 2013/0148471 A1   Jun. 13, 2013

(51) Int. Cl.
| G01S 15/00 | (2006.01) |
| G01S 15/89 | (2006.01) |
| G01S 7/62 | (2006.01) |
| G01S 15/02 | (2006.01) |
| G01S 15/50 | (2006.01) |

(52) U.S. Cl.
CPC ............ G01S 15/8902 (2013.01); G01S 7/629 (2013.01); G01S 7/6281 (2013.01); G01S 15/025 (2013.01); G01S 15/50 (2013.01)

(58) Field of Classification Search
CPC . G01S 15/025; G01S 15/8902; G01S 15/629; G01S 7/629; G01S 7/6281
See application file for complete search history.

(56) References Cited

U.S. PATENT DOCUMENTS

| 1,667,540 | A | 4/1928 | Dorsey |
| 1,823,329 | A | 9/1931 | Marrison |
| 2,416,338 | A | 2/1947 | Mason |
| 3,005,973 | A | 10/1961 | Kietz |
| 3,090,030 | A | 5/1963 | Schuck |
| 3,142,032 | A | 7/1964 | Jones |
| 3,144,631 | A | 8/1964 | Lustig et al. |
| 3,296,579 | A | 1/1967 | Farr et al. |
| 3,304,532 | A | 2/1967 | Nelkin et al. |

(Continued)

FOREIGN PATENT DOCUMENTS

| DE | 1 566 870 A1 | 4/1970 |
| DE | 35 16 698 A1 | 11/1986 |

(Continued)

OTHER PUBLICATIONS

Google   http://wayback.archive.org/web/20100425042606/http://computer.howstuffworks.com/internet/basics/google-earth7.htm, Mar. 25, 2010 , pp. 1-2.*

(Continued)

*Primary Examiner* — Isam Alsomiri
*Assistant Examiner* — Hovhannes Baghdasaryan
(74) *Attorney, Agent, or Firm* — Alston & Bird LLP

(57) ABSTRACT

Sonar rendering systems and methods are described herein. One example is an apparatus that includes a transducer element, position sensing circuitry, processing circuitry, and a display device. The processing circuitry may be configured to receive raw sonar data and positioning data, convert the raw sonar data into range cell data based at least on amplitudes of the return echoes, make a location-based association between the raw sonar data and the positioning data, plot the range cell data based on respective positions derived from the positioning data and rotate the range cell data based on a direction of movement of the watercraft to generate adjusted range cell data. The processing circuitry may be further configured to convert the adjusted range cell data into sonar image data, and cause the display device to render the sonar image data with a presentation of a geographic map.

108 Claims, 16 Drawing Sheets

(56) References Cited

U.S. PATENT DOCUMENTS

| | | |
|---|---|---|
| 3,359,537 A | 12/1967 | Geil et al. |
| 3,381,264 A | 4/1968 | Lavergne et al. |
| 3,451,038 A | 6/1969 | Maass |
| 3,458,854 A | 7/1969 | Murphree |
| 3,484,737 A | 12/1969 | Walsh |
| 3,496,524 A | 2/1970 | Stavis et al. |
| 3,553,638 A | 1/1971 | Sublett |
| 3,585,578 A | 6/1971 | Fischer, Jr. et al. |
| 3,585,579 A | 6/1971 | Dorr et al. |
| 3,618,006 A | 11/1971 | Wright |
| 3,624,596 A | 11/1971 | Dickenson et al. |
| 3,716,824 A | 2/1973 | Door et al. |
| 3,742,436 A | 6/1973 | Jones |
| 3,757,287 A | 9/1973 | Bealor, Jr. |
| 3,781,775 A | 12/1973 | Malloy et al. |
| 3,895,339 A | 7/1975 | Jones et al. |
| 3,895,340 A | 7/1975 | Gilmour |
| 3,898,608 A | 8/1975 | Jones et al. |
| 3,907,239 A | 9/1975 | Ehrlich |
| 3,922,631 A | 11/1975 | Thompson et al. |
| 3,949,348 A | 4/1976 | Dorr |
| 3,950,723 A | 4/1976 | Gilmour |
| 3,953,828 A | 4/1976 | Cook |
| 3,964,424 A | 6/1976 | Hagemann |
| 3,967,234 A | 6/1976 | Jones |
| 3,975,704 A | 8/1976 | Klein |
| 4,030,096 A | 6/1977 | Stevens et al. |
| 4,047,148 A | 9/1977 | Hagemann |
| 4,052,693 A | 10/1977 | Gilmour |
| 4,063,212 A | 12/1977 | Sublett |
| 4,068,209 A | 1/1978 | Lagier |
| 4,075,599 A | 2/1978 | Kosalos et al. |
| 4,121,190 A | 10/1978 | Edgerton et al. |
| 4,184,210 A | 1/1980 | Hageman |
| 4,197,591 A | 4/1980 | Hagemann |
| 4,198,702 A | 4/1980 | Clifford |
| 4,199,746 A | 4/1980 | Jones et al. |
| 4,200,922 A | 4/1980 | Hagemann |
| 4,204,281 A | 5/1980 | Hagemann |
| 4,207,620 A | 6/1980 | Morgera |
| 4,216,537 A | 8/1980 | Delignieres |
| 4,232,380 A | 11/1980 | Caron et al. |
| 4,347,591 A | 8/1982 | Stembridge et al. |
| RE31,026 E | 9/1982 | Shatto |
| 4,400,803 A | 8/1983 | Spiess et al. |
| 4,413,331 A | 11/1983 | Rowe, Jr. et al. |
| 4,493,064 A | 1/1985 | Odero et al. |
| 4,538,249 A | 8/1985 | Richard |
| 4,561,076 A | 12/1985 | Gritsch |
| 4,596,007 A | 6/1986 | Grall et al. |
| 4,635,240 A | 1/1987 | Geohegan, Jr. et al. |
| 4,641,290 A | 2/1987 | Massa et al. |
| 4,642,801 A | 2/1987 | Perny |
| 4,751,645 A | 6/1988 | Abrams et al. |
| 4,774,837 A | 10/1988 | Bird |
| 4,796,238 A | 1/1989 | Bourgeois et al. |
| 4,802,148 A | 1/1989 | Gilmour |
| 4,815,045 A | 3/1989 | Nakamura |
| 4,829,493 A | 5/1989 | Bailey |
| 4,855,961 A | 8/1989 | Jaffe et al. |
| 4,879,697 A | 11/1989 | Lowrance et al. |
| 4,907,208 A | 3/1990 | Lowrance et al. |
| 4,912,685 A | 3/1990 | Gilmour |
| 4,924,448 A | 5/1990 | Gaer |
| 4,935,906 A | 6/1990 | Baker et al. |
| 4,939,700 A | 7/1990 | Breton |
| 4,958,330 A | 9/1990 | Higgins |
| 4,970,700 A | 11/1990 | Gilmour et al. |
| 4,972,387 A | 11/1990 | Warner |
| 4,975,887 A | 12/1990 | Maccabee et al. |
| 4,982,924 A | 1/1991 | Havins |
| 5,025,423 A | 6/1991 | Earp |
| 5,033,029 A | 7/1991 | Jones |
| 5,077,699 A | 12/1991 | Passamante et al. |
| 5,109,364 A | 4/1992 | Stiner |
| 5,113,377 A | 5/1992 | Johnson |
| 5,142,497 A | 8/1992 | Warrow |
| 5,142,502 A | 8/1992 | Wilcox et al. |
| D329,615 S | 9/1992 | Stiner |
| D329,616 S | 9/1992 | Stiner |
| 5,155,706 A | 10/1992 | Haley et al. |
| 5,182,732 A | 1/1993 | Pichowkin |
| 5,184,330 A | 2/1993 | Adams et al. |
| 5,191,341 A | 3/1993 | Gouard et al. |
| 5,200,931 A | 4/1993 | Kosalos et al. |
| 5,214,744 A | 5/1993 | Schweizer et al. |
| 5,231,609 A | 7/1993 | Gaer |
| 5,237,541 A | 8/1993 | Woodsum |
| 5,241,314 A | 8/1993 | Keeler et al. |
| 5,243,567 A | 9/1993 | Gingerich |
| 5,245,587 A | 9/1993 | Hutson |
| 5,257,241 A | 10/1993 | Henderson et al. |
| 5,260,912 A | 11/1993 | Latham |
| 5,276,453 A | 1/1994 | Heymsfield et al. |
| 5,297,109 A | 3/1994 | Barksdale, Jr. et al. |
| 5,299,173 A | 3/1994 | Ingram |
| 5,303,208 A | 4/1994 | Dorr |
| 5,376,933 A | 12/1994 | Tupper et al. |
| 5,390,152 A | 2/1995 | Boucher et al. |
| 5,412,618 A | 5/1995 | Gilmour |
| 5,433,202 A | 7/1995 | Mitchell et al. |
| 5,438,552 A | 8/1995 | Audi et al. |
| 5,442,358 A | 8/1995 | Keeler et al. |
| 5,455,806 A | 10/1995 | Hutson |
| 5,485,432 A | 1/1996 | Aechter et al. |
| 5,493,619 A | 2/1996 | Haley et al. |
| 5,515,337 A | 5/1996 | Gilmour et al. |
| 5,525,081 A | 6/1996 | Mardesich et al. |
| 5,537,366 A | 7/1996 | Gilmour |
| 5,537,380 A | 7/1996 | Sprankle, Jr. et al. |
| 5,546,356 A | 8/1996 | Zehner |
| 5,546,362 A | 8/1996 | Baumann et al. |
| 5,561,641 A | 10/1996 | Nishimori et al. |
| 5,574,700 A | 11/1996 | Chapman |
| 5,596,549 A | 1/1997 | Sheriff |
| 5,596,550 A | 1/1997 | Rowe, Jr. et al. |
| 5,602,801 A | 2/1997 | Nussbaum et al. |
| 5,612,928 A | 3/1997 | Haley et al. |
| 5,623,524 A | 4/1997 | Weiss et al. |
| 5,675,552 A | 10/1997 | Hicks et al. |
| 5,694,372 A | 12/1997 | Perennes |
| 5,790,474 A | 8/1998 | Feintuch |
| 5,805,525 A | 9/1998 | Sabol et al. |
| 5,805,528 A | 9/1998 | Hamada et al. |
| 5,808,967 A | 9/1998 | Yu et al. |
| 5,838,635 A | 11/1998 | Masreliez |
| 5,850,372 A | 12/1998 | Blue |
| 5,930,199 A | 7/1999 | Wilk |
| 5,991,239 A | 11/1999 | Fatemi-Booshehri et al. |
| 6,002,644 A | 12/1999 | Wilk |
| 6,084,827 A | 7/2000 | Johnson et al. |
| 6,130,641 A | 10/2000 | Kraeutner et al. |
| 6,215,730 B1 | 4/2001 | Pinto |
| 6,225,984 B1 | 5/2001 | Crawford |
| 6,226,227 B1 | 5/2001 | Lent et al. |
| 6,273,771 B1 | 8/2001 | Buckley et al. |
| 6,285,628 B1 | 9/2001 | Kiesel |
| 6,321,158 B1 | 11/2001 | DeLorme et al. |
| 6,325,020 B1 | 12/2001 | Guigne et al. |
| 6,335,905 B1 | 1/2002 | Kabel |
| 6,411,283 B1 | 6/2002 | Murphy |
| 6,418,080 B2 | 7/2002 | Inouchi |
| 6,421,299 B1 | 7/2002 | Betts et al. |
| 6,421,301 B1 | 7/2002 | Scanlon |
| 6,445,646 B1 | 9/2002 | Handa et al. |
| 6,449,215 B1 * | 9/2002 | Shell ................. 367/7 |
| 6,537,224 B2 | 3/2003 | Mauchamp et al. |
| 6,606,958 B1 | 8/2003 | Bouyoucos |
| 6,678,403 B1 | 1/2004 | Wilk |
| 6,738,311 B1 | 5/2004 | Guigne |

(56) References Cited

U.S. PATENT DOCUMENTS

| | | |
|---|---|---|
| 6,761,692 B2 | 7/2004 | Angelsen et al. |
| 6,778,468 B1 | 8/2004 | Nishimori et al. |
| 6,816,782 B1 | 11/2004 | Walters et al. |
| 6,842,401 B2 | 1/2005 | Chiang et al. |
| 6,899,574 B1 | 5/2005 | Kalis et al. |
| 6,904,798 B2 | 6/2005 | Boucher et al. |
| 6,941,226 B2 | 9/2005 | Estep |
| 6,980,688 B2 | 12/2005 | Wilk |
| 7,002,579 B2 | 2/2006 | Olson |
| 7,035,166 B2 | 4/2006 | Zimmerman et al. |
| 7,215,599 B2 | 5/2007 | Nishimori et al. |
| 7,236,426 B2 | 6/2007 | Turner et al. |
| 7,236,427 B1 | 6/2007 | Schroeder |
| 7,239,263 B1 | 7/2007 | Sawa |
| 7,242,638 B2 | 7/2007 | Kerfoot et al. |
| 7,339,494 B2 | 3/2008 | Shah et al. |
| 7,355,924 B2 | 4/2008 | Zimmerman et al. |
| 7,369,459 B2 | 5/2008 | Kawabata et al. |
| 7,405,999 B2 | 7/2008 | Skjold-Larsen |
| 7,430,461 B1 | 9/2008 | Michaels |
| 7,542,376 B1 | 6/2009 | Thompson et al. |
| 7,652,952 B2 | 1/2010 | Betts et al. |
| 7,710,825 B2 | 5/2010 | Betts et al. |
| 7,729,203 B2 | 6/2010 | Betts et al. |
| 7,755,974 B2 | 7/2010 | Betts et al. |
| 7,812,667 B2 | 10/2010 | Fagg |
| 7,839,720 B2 | 11/2010 | Brumley et al. |
| 7,870,496 B1 | 1/2011 | Sherwani |
| 7,889,600 B2 | 2/2011 | Thompson et al. |
| 7,890,867 B1 | 2/2011 | Margulis |
| 7,961,552 B2 | 6/2011 | Boucher et al. |
| 8,063,540 B2 | 11/2011 | Angelsen et al. |
| 8,300,499 B2 | 10/2012 | Coleman et al. |
| 8,305,840 B2 | 11/2012 | Maguire |
| 8,305,841 B2 | 11/2012 | Riordan et al. |
| 8,514,658 B2 | 8/2013 | Maguire |
| 8,605,550 B2 | 12/2013 | Maguire |
| 2001/0026499 A1 | 10/2001 | Inouchi |
| 2002/0035574 A1 | 3/2002 | Dumas |
| 2002/0071029 A1 | 6/2002 | Zell et al. |
| 2002/0085452 A1 | 7/2002 | Scanlon |
| 2002/0093541 A1 | 7/2002 | Schileru-Key |
| 2002/0126577 A1 | 9/2002 | Borchardt |
| 2003/0202426 A1 | 10/2003 | Ishihara et al. |
| 2003/0206489 A1 | 11/2003 | Preston et al. |
| 2003/0214880 A1 | 11/2003 | Rowe |
| 2004/0184351 A1 | 9/2004 | Nishimori et al. |
| 2004/0193364 A1 | 9/2004 | Chojnacki |
| 2004/0221468 A1 | 11/2004 | Cotterchio et al. |
| 2005/0036404 A1 | 2/2005 | Zhu et al. |
| 2005/0043619 A1 | 2/2005 | Sumanaweera et al. |
| 2005/0099887 A1 | 5/2005 | Zimmerman et al. |
| 2005/0102101 A1 | 5/2005 | Beesley et al. |
| 2005/0216487 A1 | 9/2005 | Fisher et al. |
| 2006/0002232 A1 | 1/2006 | Shah et al. |
| 2006/0013066 A1 | 1/2006 | Nishimori et al. |
| 2006/0023570 A1 | 2/2006 | Betts et al. |
| 2006/0119585 A1 | 6/2006 | Skinner |
| 2006/0224940 A1 | 10/2006 | Lee |
| 2007/0025183 A1 | 2/2007 | Zimmerman et al. |
| 2007/0091723 A1 | 4/2007 | Zhu et al. |
| 2007/0159922 A1 | 7/2007 | Zimmerman et al. |
| 2008/0013404 A1 | 1/2008 | Acker et al. |
| 2008/0126935 A1 | 5/2008 | Blomgren |
| 2008/0137483 A1 | 6/2008 | Sawrie |
| 2008/0204424 A1 | 8/2008 | Jin et al. |
| 2009/0031940 A1 | 2/2009 | Stone et al. |
| 2009/0064055 A1 | 3/2009 | Chaudhri et al. |
| 2009/0099871 A1 | 4/2009 | Gadodia |
| 2009/0179789 A1 | 7/2009 | Haughay, Jr. et al. |
| 2009/0249247 A1 | 10/2009 | Tseng et al. |
| 2009/0287409 A1 | 11/2009 | Summers |
| 2010/0014386 A1* | 1/2010 | Thompson et al. .......... 367/104 |
| 2010/0080082 A1 | 4/2010 | Betts et al. |
| 2010/0145601 A1 | 6/2010 | Kurtti et al. |
| 2010/0199225 A1 | 8/2010 | Coleman et al. |
| 2010/0226203 A1 | 9/2010 | Buttle et al. |
| 2010/0250122 A1 | 9/2010 | Kubota et al. |
| 2011/0007606 A1 | 1/2011 | Curtis |
| 2011/0012773 A1 | 1/2011 | Cunning et al. |
| 2011/0013484 A1 | 1/2011 | Coleman et al. |
| 2011/0013485 A1* | 1/2011 | Maguire .......................... 367/88 |
| 2011/0019887 A1 | 1/2011 | Roehrig et al. |
| 2011/0025720 A1 | 2/2011 | Jo et al. |
| 2011/0154183 A1 | 6/2011 | Burns et al. |
| 2011/0238762 A1* | 9/2011 | Soni et al. ..................... 709/206 |
| 2012/0001773 A1 | 1/2012 | Lyons et al. |
| 2012/0011437 A1 | 1/2012 | James et al. |
| 2012/0014220 A1 | 1/2012 | DePasqua |
| 2012/0069712 A1 | 3/2012 | Potanin et al. |
| 2012/0106300 A1 | 5/2012 | Maguire |
| 2012/0185801 A1 | 7/2012 | Madonna et al. |
| 2013/0007665 A1 | 1/2013 | Chaudhri et al. |
| 2013/0016588 A1 | 1/2013 | O'Dell |
| 2013/0208568 A1 | 8/2013 | Coleman |
| 2014/0010048 A1 | 1/2014 | Proctor |
| 2014/0064024 A1 | 3/2014 | Maguire |

FOREIGN PATENT DOCUMENTS

| | | |
|---|---|---|
| EP | 1 272 870 B1 | 4/2004 |
| EP | 1 393 025 B1 | 2/2006 |
| EP | 2 070 068 B1 | 3/2008 |
| EP | 2 023 159 A1 | 2/2009 |
| GB | 823304 A | 11/1959 |
| GB | 1 306 769 A | 2/1973 |
| GB | 1 315 651 A | 5/1973 |
| GB | 1316138 | 5/1973 |
| GB | 1 329 829 A | 9/1973 |
| GB | 1 330 472 A | 9/1973 |
| GB | 2 111 679 A | 7/1983 |
| GB | 2 421 312 A | 6/2006 |
| GB | 2 444 161 A | 5/2008 |
| JP | 50-109389 U | 9/1975 |
| JP | 54-054365 U | 4/1979 |
| JP | 57-046173 A | 3/1982 |
| JP | 58-079178 A | 5/1983 |
| JP | S-59-107285 A | 6/1984 |
| JP | S-61-102574 A | 5/1986 |
| JP | 61-116678 A | 6/1986 |
| JP | S-61-262674 A | 11/1986 |
| JP | 62-099877 U | 6/1987 |
| JP | 62-134084 U | 8/1987 |
| JP | 62-190480 A | 8/1987 |
| JP | 63-261181 A | 10/1988 |
| JP | H02-159591 A | 6/1990 |
| JP | H-03-85476 A | 4/1991 |
| JP | 4-357487 A | 12/1992 |
| JP | 4357487 A | 12/1992 |
| JP | 7-031042 A | 1/1995 |
| JP | 07-270523 A | 10/1995 |
| JP | H-10-123247 A | 5/1998 |
| JP | H-10-132930 A | 5/1998 |
| JP | 10-186030 A | 7/1998 |
| JP | H-10-325871 A | 12/1998 |
| JP | 2001-074840 A | 3/2001 |
| JP | 2002-168592 A | 6/2002 |
| JP | 2004-020276 A | 1/2004 |
| JP | 2004-219400 A | 8/2004 |
| JP | 2005-091307 A | 4/2005 |
| JP | 2006-064524 A | 3/2006 |
| JP | 2006-162480 A | 6/2006 |
| JP | 2006-208300 A | 8/2006 |
| JP | 2008-508539 | 3/2008 |
| JP | 2008-128900 A | 6/2008 |
| JP | 2009-222414 A | 10/2009 |
| JP | 2010-030340 A | 2/2010 |
| WO | WO 84/01833 A1 | 5/1984 |
| WO | WO-91/02989 A1 | 3/1991 |
| WO | WO 98/15846 | 4/1998 |
| WO | WO 03/009276 A2 | 1/2003 |
| WO | WO-2005/057234 A1 | 6/2005 |

(56) References Cited

FOREIGN PATENT DOCUMENTS

| WO | WO-2008/105932 A2 | 9/2008 |
|---|---|---|
| WO | WO-2008/152618 A1 | 12/2008 |
| WO | WO 2011/008429 A1 | 1/2011 |

OTHER PUBLICATIONS

Wilson http://flindersarchaeology.com/2011/10/25/side-scan-sonar-the-key-to-underwater-survey/, Oct. 25, 2011, pp. 1-5.*
J. Green, Maritime Archaeology: A Technical Handbook, ISBN 0-12-298632-6, 2004, pp. 1-468.*
Search Report for European Application No. 12195752.6; dated Mar. 7, 2013.
Marine Acoustics Society of Japan (Editor); "Basics and Application of Marine Acoustics"; Apr. 28, 2004; pp. 152-172.
De Jong, C. D., et al.; "*Hydrography: Series on Mathematical Geodesy and Positioning*;" VSSD; ISBN 90-407-2359-1; dated 2002.
Berktay, H. O., et al.; "*Farfield performance of parametric transmitters*;" Journal of Acoustical Society of America, vol. 55, No. 3; dated Mar. 1974.
Fried, N. W.; "*An Investigation of a Large Step-Down Ratio Parametric Sonar and Its Use in Sub-Bottom Profiling*;" Thesis: Simon Fraser University; dated Aug. 1992.
Hardiman, J. E., et al.; "*High Repetition Rate Side Looking Sonar*;" Oceans 2002 MTSIEEE, vol. 4; dated Oct. 2002.
Naoi, J., et al.; "*Sea Trial Results of a Cross Fan Beam Type Sub-Bottom Profiler*;" Japanese Journal of Applied Physics, vol. 39, No. 5; dated May 2000.
Plueddemann, A. J., et al.; "*Design and Performance of a Self-Contained Fan-Beam ADCP*;" IEEE Journal of Oceanic Engineering, vol. 26, No. 2; dated Apr. 2001.
Riordan, J., et al.; "*Implementation and Application of a Real-time Sidescan Sonar Simulator*;" Oceans 2005—Europe, vol. 2; dated Jun. 2005.
Yang, L., et al.; "*Bottom Detection for Multibeam Sonars with Active Contours*;" MTSIEEE Conference Proceedings, vol. 2; dated Oct. 1997.
"*100 W adjustable Wide-Beam: Transom-Mount Transducer—P48W*;" Airmar Technology Corporation; <www.airmar.com>.
Extended European Search Report for Application No. 13153403.4; dated May 7, 2013.
International Search Report for Application No. PCT/US05/27436 dated Nov. 20, 2007; 1 page.
International Preliminary Report on Patentability for Application No. PCT/US05/27436 dated Dec. 6, 2007; 5 pages.
Translation of Notice of Reason(s) for Rejection for Japanese Application No. 2007-524919 dated Aug. 16, 2011; 4 pages.
Communication [extended European Search Report] for European Application No. 5782717.2-2220 dated Aug. 31, 2011; 12 pages.
Communication for European Patent Application No. 05782717.2-2220 dated May 11, 2012; 9 pages.
Australian Government, Department of Sustainability, Environment, Water, Population and Communities; Fact Sheet—The RV Tangaroa; date unknown; 3 pages.
Blondel, Philippe; The Handbook of Sidescan Sonar; © 2009; 316 pages.
Calcutt, Ron; Lowrance Book of Sonar & GPS; © 1986; and Lowrance Book of Sonar & GPS Update; 1997; collectively 122 pages.
Derrow, II, Robert W. et al., A Narrow-Beam, Side-Looking Sonar for Observing and Counting Fish in Shallow Aquaculture Ponds; 1996; 34 pages.
DSME E&R Ltd.; Remotely Operated Sonar Boat System (SB-100S); http://dsmeu.en.ec21.com/Remotely_Operated_Sonar_Boat_System-618904_2479905.html; printed on Feb. 12, 2010; 3 pages.
Eagle Electronics; Ultra 3D Installation and Operation Manual; © 2002; 24 pages.
Furuno Electric Co., Ltd.; Side Looking Sonar, Model SL-16, 1983; 4 pages.
GEOACOUSTICS; GeoPulse, Profiler System; Feb. 2006, 2 pages.
HUMMINBIRD 1198C Review for Catfishing, Catfishing "How to" Catfishing Techniques, Oct. 31, 2011, 9 pages.
Imagenex Technology Corp., Model 881 SportScan, Single or Dual Frequency Digital Sidescan Sonar, Software User's Manual; May 9, 2003; 16 pages.
Klein Associates, Inc.; Modular Side Scan Sonar and Sub-Bottom Profiler System Components for Customized Configurations; date unknown; 10 pages.
Klein, Martin; Side Scan Sonar; UnderSea Technology; Apr. 1967; 4 pages.
Klein, M. et al., Sonar—a modern technique for ocean exploitation; IEEE Spectrum; Jun. 1968; pp. 40-46 and Authors page.
Klein, Martin; New Developments in Side Scan Sonar for Hydrography; date unknown; 14 pages.
Klein, Martin; Side Scan Sonar; Offshore Services; Apr. 1977, pp. 67, 68, 71, 72, 75.
Klein, Martin; New Capabilities of Side Scan Sonar Systems; date unknown; pp, 142-147.
Klein, Martin; Sea Floor Investigations Using Hybrid Analog/Digital Side Scan Sonar; date unknown; 18 pages.
Kongsberg Maritime AS; Side Looking Transducer, 200 kHz-0.5x49, 200 kHz side looking transducer for shallow water and surveying and high resolution; date unknown; 2 pages.
Kongsberg Simrad AS; ConCat Containerised Catamaran, Inshore hydrographic survey vessel that fits in a container, Rev. B, Apr. 2004; 4 pages.
Kvitek, Rikk et al.; Final Report, Early Implementation of Nearshore Ecosystem Database Project Tasks 2 and 3; http://seafloor.csumb.edu/taskforce/html%202%20web/finalreport.htm; Jul. 29, 1999; 92 pages.
Law, G., Sideways Glance, Side- and down-scan Imaging Open New Windows in Fishing Finding, Electronics, Nov. 2011, pp. 28-29.
Leonard, John L.; Cooperative Autonomous Mobile Robots; date unknown; 11 pages.
Maritime surveys takes delivery of SeaBat 8160; Sea Technology, Jul. 2001; http://findarticles.com/p/articles/mi_qa5367/is_200107/ai_n21475675/; webside printed Jun. 30, 2010.
Marine Sonic Technology, Ltd.; Sea Scan® PC Side Scan Sonar System Information/Specifications Sheet; Sep. 9, 2002; 10 pages.
Mesotech; Mesotech Model 971 Sonar System Summary; Mar. 26, 1985, 2 pages.
Oughterson, B., Sophisticated Sonar Reveals Detailed Images Recently Unimaginable. Is It Too Much too Soon?, Basic Instincts, pp. 75-78.
Raymarine, L750 Fishfinder, Operation Handbook; date unknown; 93 pages.
Raytheon Marine Company; Installation Instructions; Oct. 1998; 2 pages.
Remtechsroy Group; Side Scan Sonar-Remotely Operated Vehicle Surface; http://remtechnology.en.ec21.com/Side_Scan_Sonar_Remotely_Operated-2902034_2902230.html; printed on Feb. 12, 2010; 4pages.
RESON Inc.; SeaBat 8101 Product Specification, 240kHz Multibeam Echo Sounder; © 1999; 2 pages.
RESON; SeaBat 8101; Multibeam acoustic echosounder; date unknown; 1 page.
RESON; SeaBat 8160 Product Specification, Multibeam Echosounder System; date unknown; 2 pages.
Russell-Cargill, W.G.A. ed.; Recent Developments in Side Scan Sonar Techniques; © 1982; 141 pages.
Simrad; Product Specifications, Simrad EA 500 Side-looking Option; Feb. 1992, 1 page.
Techsonic Industries, Inc., Humminbird Wide fish wide open!; brochure, 1997; 4 pages.
Techsonic Industries, Inc.; Humminbird GPS brochure; © 1992; 10 pages.
Teleflex Electronic Systems; Humminbird 1997; © 1996; 24 pages.
The Norwegian and Finnish navies performing operations with the Kongsberg Hugin AUV and minesniper mine disposal vehicle in Finnish waters; FFU nytt; No. 3, Nov. 2003; p. 12.
Trabant, Peter K.; Applied High-Resolution Geophysical Methods, Offshore Geoengineering Hazards; © 1984; 265 pages.

(56) References Cited

OTHER PUBLICATIONS

Tritech International Limited; StarFish; 450H Hull-Mounted Sidescan System; date unknown; 2 pages.
Universal Sonar Limited; High Frequency Broad Band Line Array Type G27/300LQ; date unknown 2 pages.
Williams, J. P., *Glancing Sideways, Nautical Know-How*, Chesapeake Bay Magazine, May 2011 pp. 14-17.
Office Action for Japanese Application No. 2012-267270 dated Dec. 2, 2013.
Tokuyama, H. et al., *Principles and Applications of Izanagi Oceanfloor Imaging Sonar System*, Journal of the Japan Society of Photogrammetry and Remote Sensing, vol. 29, No. 2, 1990, pp. 76-83.
Yamamoto, F. et al., *Oceanfloor Imaging System—Izanagi*, Journal of the Japan Society for Marine Surveys and Technology 1 (2), Sep. 1989, pp. 45-51, 53 and 54.
Imagenex Technology Corp.; YellowFin SideScan Sonar, (Model 872); user's manual; data storage file format; Ethernet interface specification, and Ethernet setup guide; Nov. 2004; 46 pages.
Office Action for Reexamination No. 90/009,956; dated Apr. 6, 2012; 32 pages.
Office Action for Reexamination No. 90/009,957; dated Jun. 4, 2012; 17 pages.
Office Action for Reexamination No. 90/009,958; dated Jun. 18, 2012; 19 pages.
Office Action for U.S. Appl. No. 11/195,107; dated Feb. 15, 2007; 5 pages.
Office Action for U.S. Appl. No. 11/195,107; dated Aug. 9, 2007; 7 pages.
Office Action for U.S. Appl. No. 11/195,107; dated Mar. 4, 2008; 7 pages.
Office Action for U.S. Appl. No. 11/195,107; dated Jul. 17, 2008; 7 pages.
Office Action for U.S. Appl. No. 11/195,107; dated May 12, 2009; 9 pages.
Office Action for U.S. Appl. No. 12/319,594; dated Jun. 8, 2009; 10 pages.
Office Action for U.S. Appl. No. 12/319,586; dated Sep. 3, 2009; 5 pages.
Office Action for U.S. Appl. No. 12/319,586; dated Mar. 2, 2010; 5 pages.
Office Action for U.S. Appl. No. 12/319,604; dated Sep. 29, 2009; 7 pages.
Office Action for U.S. Appl. No. 12/631,229; dated Sep. 9, 2010, 8 pages.
Response to European Search Report for European Patent Application No. 05782717.2-2220; dated Mar. 23, 2012; Johnson Outdoors, Inc.; 35 pages.
Office Action for European Application No. 10728530.6; dated Apr. 2, 2013.
Office Action for European Application No. 10729001.7; dated Apr. 5, 2013.
International Search Report and Written Opinion for Application No. PCT/US2012/046062 dated Dec. 14, 2012.
HUMMINBIRD WIDE Optic Operations Manual 1997; fish wide open!: 32 pages.
HUMMINBIRD WIDE Brochure 1997; fish wide open!; 4 pages.
HUMMINBIRD 997c SI Combo Installation and Operations Manual 2008; 151 pages.
HUMMINBIRD 757c, 787c2 and 757c2i CPS Chartplotter Operations Manual 2006; 161 pages.
Lowrance Electronics, Inc.; X-70A 3D Installation and Operation Instructions; 44 pages.
Raymarine: DSM25 Digital Sounder Module Owner's Handbook; 62 pages.
Raymarine: A65 GPS Chartplotter Owners Handbook; © Raymarine 2006; 100 pages.
Raymarine: E-series Networked Display: Reference Manual; Mar. 2006; 51 pages.
Kongsberg Publication; Pohner, Freddy et al.; Integrating imagery from hull mounted sidescan sonars with multibeam bathymetry: 16 pages.
Airman Technology Corporation, R209 Dual Frequency 2 to 3W Transducer; Oct. 10, 2007; 2 pages.
Airman Technology Corporation, R99 Dual Frequency 2kW Transducer; May 2, 2006; 2 pages.
DeRoos, Bradley G. et al., Technical Survey and Evaluation of Underwater Sensors and Remotely Operated Vehicles; May 1993; 324 pages.
Klein Associates, Inc., Klein Hydroscan System, 1983; 52 pages.
Office Action for Japanese Application No. 2013-037874 dated Mar. 26, 2014.
Petition for Inter Partes Review of U.S. Pat. No. 8,305,840; IPR2013-00355; dated Jun. 13, 2013; Raymarine, Inc.; 63 pages.
Declaration of Paul Stokes for Inter Partes Review of U.S. Pat. No. 8,305,840; IPR2013-00355; dated Jun. 12, 2013; Raymarine, Inc.; 118 pages.
Patent Owner's Preliminary Response; Inter Partes Review of U.S. Pat. No. 8,305,840; IPR2013-00355; dated Sep. 17, 2014; Navico Holding AS; 110 pages.
Decision for Inter Partes Review of U.S. Pat. No. 8,305,840; IPR2013-00355; dated Dec. 12, 2013; United States Patent and Trademark Office; 36 pages.
Judgment of Inter Partes Review of U.S. Pat. No. 8,305,840; IPR2013-00355; dated Mar. 25, 2014; United States Patent and Trademark Office; 3 pages.
Petition for Inter Partes Review of U.S. Pat. No. 8,305,840; IPR2013-00496; dated Aug. 6, 2013; Raymarine, Inc.; 63 pages.
Declaration of Paul Stokes for Inter Partes Review of U.S. Pat. No. 8,305,840; dated Aug. 2, 2013; Raymarine, Inc.; 124 pages.
Patent Owner's Preliminary Response; Inter Partes Review of U.S. Pat. No. 8,305,840; IPR2013-00496 ; dated Sep. 17, 2014; Navico Holding AS; 114 pages.
Decision for Inter Partes Review of U.S. Pat. No. 8,305,840; IPR2013-00496; dated Feb. 11, 2014; United States Patent and Trademark Office; 14 pages.
Judgment of Inter Partes Review of U.S. Pat. No. 8,305,840; IPR2013-00496; dated Mar. 25, 2014; United States Patent and Trademark Office; 3 pages.
Petition for Inter Partes Review of U.S. Patent No. IPR2013-00497; dated Aug. 6, 2013; Raymarine, Inc.; 64 pages.
Declaration of Paul Stokes for Inter Partes Review of U.S. Pat. No. 8,305,840; IPR2013-00497; dated Aug. 2, 2013; Raymarine, Inc.; 166 pages.
Patent Owner's Preliminary Response; Inter Partes Review of U.S. Pat. No. 8,305,840; IPR2013-00497; dated Sep. 17, 2014; Navico Holding AS; 102 pages.
Decision for Inter Partes Review of U.S. Pat. No. 8,305,840; IPR2013-00497; dated Feb. 11, 2014; United States Patent and Trademark Office; 17 pages.
Judgment of Inter Partes Review of U.S. Pat. No. 8,305,840; IPR2013-00497; Mar. 25, 2014; United States Patent and Trademark Office; 3 pages.
Supplemental Response to second set of Interrogatories; International Trade Commission; Investigation No. 337-TA-898; dated Jan. 6, 2014; Raymarine, Inc.; 12 pages.
Invalidity Contention; U.S. Pat. No. 8,305,840 Invalidity Claim Chart; Exhibit A01—Hydrography; Feb. 12, 2014; 30 pages.
Invalidity Contention; U.S. Pat. No. 8,305,840 Invalidity Claim Chart; Exhibit A02—Hydrography, Lustig; Feb. 12, 2014; 42 pages.
Invalidity Contention; U.S. Pat. No. 8,305,840 Invalidity Claim Chart; Exhibit A03—Hydrography, Adams; Feb. 12, 2014; 49 pages.
Invalidity Contention; U.S. Pat. No. 8,305,840 Invalidity Claim Chart; Exhibit A04—Hydrography, Boucher '522; Feb. 12, 2014; 39 pages.
Invalidity Contention; U.S. Pat. No. 8,305,840 Invalidity Claim Chart; Exhibit A05—Hydrography, Boucher '522, Adams; Feb. 12, 2014; 54 pages.
Invalidity Contention; U.S. Pat. No. 8,305,840 Invalidity Claim Chart; Exhibit A06—Hydrography, Adams, Betts; Feb. 12, 2014; 29 pages.

(56) References Cited

OTHER PUBLICATIONS

Invalidity Contention; U.S. Pat. No. 8,305,840 Invalidity Claim Chart; Exhibit A07—Hydrography, Boucher '522, Adam, Betts; Feb. 12, 2014; 33 pages.
Invalidity Contention; U.S. Pat. No. 8,305,840 Invalidity Claim Chart; Exhibit A08—Hydrography, Boucher '798, DeRoos, Adams; Feb. 12, 2014; 46 pages.
Invalidity Contention; U.S. Pat. No. 8,305,840 Invalidity Claim Chart; Exhibit A09—Hydrography, Boucher '798, DeRoos, Adams, Betters; Feb. 12, 2014; 33 pages.
Invalidity Contention; U.S. Pat. No. 8,305,840 Invalidity Claim Chart; Exhibit A10—Furuno; Feb. 12, 2014; 58 pages.
Invalidity Contention; U.S. Pat. No. 8,305,840 Invalidity Claim Chart; Exhibit A11—Airmar P48; Feb. 12, 2014; 70 pages.
Invalidity Contention; U.S. Pat. No. 8,305,840 Invalidity Claim Chart; Exhibit A12—Russell-Cargill et al; Feb. 12, 2014; 89 pages.
Invalidity Contention; U.S. Pat. No. 8,305,840 Invalidity Claim Chart; Exhibit A13—Kongsberg EA 400/600; Feb. 12, 2014; 57 pages.
Invalidity Contention; U.S. Pat. No. 8,305,840 Invalidity Claim Chart; Exhibit A14—Sato; Feb. 12, 2014; 6 pages.
Invalidity Contention; U.S. Pat. No. 8,305,840 Invalidity Claim Chart; Exhibit A15—Chiang, E-Series; Feb. 12, 2014; 5 pages.
Invalidity Contention; U.S. Pat. No. 8,305,840 Invalidity Claim Chart; Exhibit A16—Bird, Wilcox, Nishimori, Hamada, Blue, Fatemi-Boosheri, Boucher '798, Thompson, Betts, Zimmerman, P48, Tri-Beam, Imagenex, Odom Echoscan; Feb. 12, 2014; 40 pages.
Invalidity Contention; U.S. Pat. No. 8,305,840 Invalidity Claim Chart; Exhibit A17—Hydrography, Humminbird 997c, Betts; Feb. 12, 2014; 69 pages.
Invalidity Contention; U.S. Pat. No. 8,305,840 Invalidity Claim Chart; Exhibit A18—Humminbird 997c; Feb. 12, 2014; 83 pages.
Invalidity Contention; U.S. Pat. No. 8,305,840 Invalidity Claim Chart; Exhibit A19—Betts; Feb. 12, 2014; 49 pages.
Invalidity Contention; U.S. Pat. No. 8,300,499 Invalidity Claim Chart; Exhibit B01—Tri-Beam; Feb. 12, 2014; 31 pages.
Invalidity Contention; U.S. Pat. No. 8,300,499 Invalidity Claim Chart; Exhibit B02—Hydrography, Humminbird 757 c; Feb. 12, 2014; 38 pages.
Invalidity Contention; U.S. Pat. No. 8,300,499 Invalidity Claim Chart; Exhibit B03—Airmar-R209, Humminbird 757 c; Feb. 12, 2014; 43 pages.
Invalidity Contention; U.S. Pat. No. 8,300,499 Invalidity Claim Chart; Exhibit B04—Airmar-R209, Hydrography, Humminbird 757c, Sato, Aimar-R99, Zimmerman; Feb. 12, 2014; 59 pages.
Invalidity Contention; U.S. Pat. No. 8,300,499 Invalidity Claim Chart; Exhibit B05—Odom Echoscan; Feb. 12, 2014; 45 pages.
Invalidity Contention; U.S. Pat. No. 8,300,499 Invalidity Claim Chart; Exhibit B06—Kongsberg EA 400/600; Feb. 12, 2014; 37 pages.
Invalidity Contention; U.S. Pat. No. 8,300,499 Invalidity Claim Chart; Exhibit B07—Nishimori, Thompson, Betts, Zimmerman, Melvin, Tri-Beam, Odom Echoscan; Feb. 12, 2014; 22 pages.
Invalidity Contention; U.S. Pat. No. 8,300,499 Invalidity Claim Chart; Exhibit B08—Hydrography, Betts et al, Humminbird 997c and 757c; Feb. 12, 2014; 61 pages.
Invalidity Contention; U.S. Pat. No. 8,300,499 Invalidity Claim Chart; Exhibit B09—Humminbird 997c; Feb. 12, 2014; 40 pages.
Invalidity Contention; U.S. Pat. No. 8,300,499 Invalidity Claim Chart; Exhibit B10—Betts; Feb. 12, 2014; 29 pages.
Supplemental Response to Interrogatories, Exhibit 1; International Trade Commission; dated Feb. 28, 2014; Navico Holding AS.; 114 pages.
Supplemental Response to Interrogatories, Exhibit 2; International Trade Commission; dated Feb. 28, 2014; Navico Holding AS.; 67pages.
Anderson, K.; "Side-Scanning for Sport Fishing"; Salt Water Sportsman; Apr. 1, 2009; 4 pages.
Andrew, C., et al.; "Setup and Trouble shooting Procedures for the Klein 5500 Sidescan Sonar"; Australian Government; Department of Defence; Maritime Operations Division; Systems Sciences Laboratory; Published Nov. 2003.
Armstrong, A.A., et al.; "New Technology for Shallow Water Hydrographic Surveys"; Proceedings of the $25^{th}$ Joint Meeting of UJNR Sea-bottom Surveys Panel; Dec. 1996.
Asplin, R.G., et al.; "A new Generation Side Scan Sonar"; OCEANS '88 Proceedings. 'A Partnership of Marine Interests'; vol. 2; Oct.-Nov. 1988; pp. 329-334.
Baker, N., et al, "Rifting History of the Northern Mariana Trough: SeaMARCH II and Seismic Reflection Surveys," Journals of Geophysical Research, vol. 101, No. B5, May 10, 1996.
Ballantyne, J.; "Find and Catch More Fish, Quickly and Easily, with the FISHIN' BUDDY 2255"; [Online]; [Retrieved on Dec. 7, 2011]; Retrieved from the Internet <URL:http://www.articleslash.net/Recreation-and-Sports/Fishing/67018__Find-and-Catch-More-Fish-Quickly-and-Easily-with-the-FISHIN-BUDDY-2255.html>; 4 pages.
Carey, W.M., "Sonar Array Characterization, Experimental Results"; IEEE Journal of Oceanic Engineering ; vol. 23; Issue 3; Jul. 1998; pp. 297-306.
Cowie, P.A., et al., "Quantitative Fault Studies on the East Pacific Rise: A Comparison of Sonar Imaging Techniques," Journal of Geophysical Research, vol. 99, B8, Aug. 10, 1994.
Curcio, J., et al.; "SCOUT—A Low Cost Autonomous Surface Platform for Research in Cooperative Autonomy"; Department of Mechanical Engineering; Massachusetts Institute of Technology; Aug. 2005.
Farrell, E.J.; , "Color Display and Interactive Interpretation of Three-Dimensional Data"; IBM Journal of Research and Development; vol. 27; No. 4; Jul. 1983; pp. 356-366.
Glynn, Jr., J.M., et al.; "Survey Operations and Results Using a Klein 5410 Bathymetric Sidescan Sonar"; Retrieved from the Internet <URL: http://www.thsoa.org/hy07/03__04.pdf; Mar. 2007.
Hansen, H.H.; "Circular vs. rectangular transducers"; Department of Electronics and Telecommunications; Norwegian University of Science and Technolgy; Mar. 2010; 28 pages.
Hughes Clarke, J. E., et al.; Knudsen 320 200 kHz keel-mounted sidescan trials; Results from 2000/2001/2002 field operations; [online]; Retrieved on Jun. 23, 2010 from the Internet <URL: http://www.omg.unb.ca/Ksidescan/K320__SStrials.html; 11 pages.
Hughes Clarke, J.E.; "Seafloor characterization using keel-mounted sidescan: proper compensation for radiometric and geometric distortion"; Canadian Hydrographic Conference; May 2004; 18 pages.
Hussong, D.M., et al., "High-Resolution Acoustic Seafloor Mapping," $20^{th}$ Annual OTC, Houston, TX, May 2-5, 1988.
Jonsson, J., et al. "Simulation and Evaluation of Small High-Frequency Side-Scan Sonars using COMSOL"; Excerpt from the Proceedings of the COMSOL Conference; 2009; Milan, Italy.
Key, W.H.; "Side Scan Sonar Technology"; Oceans 2000 MTS/IEEE Conference and Exhibition; vol. 2; Sep. 2000; pp. 1029-1033.
Kielczynski, P., et al.; "Finite Element Method (FEM) and Impulse Response Method (IRM) analysis of circular and rectangular transducers"; 1995 IEEE Ultrasonics Symposium; 1995; pp. 693-696.
Kozak, G.; "Side Scan Sonar Target Comparative Techniques for Port Security and MCM Q-Route Requirements"; L-3 Communications; Klein Associates, Inc.; [Online]; Retrieved from the Internet <URL: http://www.chesapeaketech.com/techniques-port-security.pdf; 11 pages.
Krotser, D.J., et al.; "Side-Scan Sonar: Selective Textural Enhancement"; Oceans'76; Washington, DC; Sep. 1976.
Kvitek, R.G., et al.; "Victoria Land Latitudinal Gradient Project: Benthic Marine Habitat Characterization"; California State University; Monterey Bay; Field Report; Feb. 25, 2004.
Langeraar, W.; "Surveying and Charting of the Seas"; Elsevier Oceanography Series; vol. 37; Sep. 1983; p. 321.
Manley, J,E.; "Development of the Autonomous Surface Craft 'Aces'"; Oceans '97 MTS/IEEE Conference Proceedings; Oct. 1997; pp. 827-832.
Manley, J.E., et al.; "Evolution of the Autonomous Surface Craft 'AutoCat'"; Oceans 2000 MTS/IEEE Conference and Exhibition; vol. 1; Sep. 2000; pp. 403-408.

(56) References Cited

OTHER PUBLICATIONS

Melvin, G., et al.; Commercial fishing vessels, automatic acoustic logging systems and 3D data visualization; ICES; Journal of Marine Science; vol. 59; Issue 1; 2002; pp. 179-189.
Newman, P.M.; "MOOS—Mission Orientated Operating Suite"; Department of Ocean Engineering; Massachusetts Institute of Technology; 2002.
Ollivier, F., et al.; "Side scan sonar using phased arrays for high resolution imaging and wide swath bathymetry"; IEEE Proceedings on Radar, Sonar and Navigation; vol. 143; Issue 3; Jun. 1996; pp. 163-168.
Prickett, T.; "Underwater Inspection of Coastal Structures"; The REMR Bulletin; vol. 14; No. 2; Aug. 1997.
Pratson, L.F., et al.; "Introduction to advances in seafloor mapping using sidescan sonar and multibeam bathymetry data"; Marine Geophysical Research; Springer Netherlands; vol. 18; Issue 6; 1996; pp. 601-605.
Pryor, Donald E.; "Theory and Test of Bathymetric Side Scan Sonar"; Office of Charting and Geodetic Services; National Ocean Service; National Oceanic and Atmospheric Administration; Post 1987; pp. 379-384.
Shono, K., et al.; "Integrated Hydro-Acoustic Survey Scheme for Mapping of Sea Bottom Ecology"; Ocean Research Institute; Tokyo, Japan; Nov. 2004.
Trevorrow, M.V., et al.; "Description and Evaluation of a Four-Channel, Coherent 100-kHz Sidescan Sonar"; Defence R&D Canada-Atlantic; Dec. 2004.
Vaganay, J., et al.; "Experimental validation of the Moving Long Base-Line Navigation Concept"; 2004 IEEE/OES Autonomous Underwater Vehicles; Jun. 2004.
Vaneck, T.W., et al.; "Automated Bathymetry Using an Autonomous Surface Craft"; Journal of the Institute of Navigation; vol. 43; Issue 4; Winter 1996; pp. 329-334.
Waite, A.D.; "Sonar for Practising Engineers"; Third Edition; John Wiley & Sons, Ltd.; West Sussex, England; © 2002; 323 pages.
Alpine Geophysical Data Programmer Model 485C Brochure and letter dated Feb. 17, 1976; 2 pages.
Benthos C3D Sonar Imaging System; "High Resolution Side Scan Imagery with Bathymetry"; Benthos, Inc.; © May 2002.
Coastal Engineering Technical Note; "Side-Scan Sonar for Inspecting Coastal Structures"; U.S. Army Engineer Waterways Experiment Station; Revised Nov. 1983.
ConCAT Containerised Catamaran; Inshore hydrographic survey vessel that fits in a container; In Cooperation with Uniteam International; Kongsberg Simrad AS; Apr. 2004.
Datasonics SIS-1000 Seafloor Imaging System; Combined Chirp Side Scan Sonar/Chirp Sub-Bottom Profiling for high resolution seafloor imaging; One System, All the Answers; Benthos, Inc.; © 2000.
Deep Vision Side Scan Sonar Systems; [Online]; [Retrieved on Dec. 2, 2011]; Retrieved from the Internet <URL:http://www.deepvision.se/products.htm>; 5 pages.
Detailed Sonar Transducer Product Information; Transducer Products; Side Scans; Models T36, T63, T62, and T403; Dec. 30, 2003; Retrieved from internet: URL:http://www.neptune-sonar.com/products.as_btype=Side-Scan+Transducers&category=; 4 pages.
EDO Corporation Global Technology Reach, Model 6400 Fan Beam Transducer; http:/web/archive/org/web/20040608054923/www.edoceramic.con/NavDucers.htm; Jun. 3, 2004.
EM1110-2-1003; Department of the Army; U.S. Army Corps of Engineers; Engineering and Design; Hydrographic Surveying; Apr. 1, 2004.
U.S. Appl. No. 60/552,769, filed Mar. 12, 2004; Applicant: Terrence Schoreder.
Final Report; Early Implementation of Nearshore Ecosystem Database Project Tasks 2 and 3; [online]; Retrieved on Feb. 26, 2010 from the Internet <URL: http://seafloor.csumb.edu/taskforce/html%202web/finalreport.htm; 90 pages.
Fishin' Buddy 4200™ Operations Manual; Dated Dec. 21, 2005; 16 pages.

FishFinder L265 Instruction Manual; Raymarine; 79 pages.
FishFinder L365 Instruction Manual; Raymarine; 83 pages.
FishFinder L470 Instruction Manual; Raymarine; 102 pages.
FishFinder L750 Instruction Manual; Raymarine; 93 pages.
Fishing Tool Reviews—Bottom Line Fishin Buddy 1200 Fishfmder; [Online]; [Retrieved on Dec. 7, 2011]; Retrieved from the Internet <URL:http://www.tackletour.com/reviewbottomline1200.html>; 4 pages.
GeoAcoustics; A Kongsberg Company; GeoSwath Plus Brochure; "Wide swath bathymetry and georeferenced side scan"; [Online]; Retrieved from the internet < URL: http://www.km.kongsberg.com/ks/web/nokbg0397.nsf/AllWeb/F4B7FD3461368388C1257599002D34BC/$file/GeoSwath-Plus-brochure.pdf?OpenElement.
GeoPulse; GeoAcoustics Pinger Sub-Bottom Profiler; Retrieved from the Internet <URL: http://www.km.kongsberg.com/ks/web/nokbg0397.nsf/AllWeb/D1084BB7DD0FD2IDC12574C0003E01EA/$file/GeoPulse_Profiler.pdf?OpenElement; GeoAcoustics Limited, UK; A Kongsberg Company.
GlobalMap Sport; Installation and Operation Instructions; Lowrance Electronics, Inc.; © 1996; 61 pages.
GPS Speed Correction; Sidescan Sonar; [online]; Retrieved from the Internet URL: <www.hydrakula.uni-kiel.de/downloads/Sidescan%20Sonar.doc; 10 pages.
HUMMINBIRD 100 Series™ Fishin' Buddy®; 110, 120, 130 and 140c Product Manual; © 2007; 2 pages.
HUMMINBIRD 1197c Operations Manual; Nov. 6, 2007; 196 pages.
HUMMINBIRD 200DX Dual Beam Operations Manual; 43 pages.
HUMMINBIRD 500 Series; 550, 560, 570 and 570 DI Operations Manual; © 2010; 84 pages.
Humminbird: America's favorite Fishfinder—the leading innovator of Side Imaging technology; [Online]; [Retrieved on Mar. 16, 2011]; Retrieved from the Internet <URL: http://www.humminbird.com/support/ProductManuals.aspx>; 20 pages.
HUMMINBIRD Dimension 3 Sonar 600 Operations Manual; 24 pages.
The HUMMINBIRD GPS Navigational System. Nothing Else Even Close.; HUMMINBIRD Marine Information Systems ®; 1992; 10 pages.
HUMMINBIRD GPS NS 10 Operations Manual; 75 pages.
HUMMINBIRD High Speed Transducer; 4 pages.
HUMMINBIRD LCR 400 ID Operations Manual; 28 pages.
HUMMINBIRD Marine Information Systems; Dimension 3 Sonar™; 1992; 16 pages.
HUMMINBIRD "Matrix 35 Fishing System," Prior to Aug. 2, 2003.
HUMMINBIRD Matrix 35 Fishing System; 2 pages.
HUMMINBIRD Matrix 55 and 65 Operations Manual; © 2003; 40 pages.
HUMMINBIRD Matrix 67 GPS Trackplotter Operations Manual; © 2003; 88 pages.
HUMMINBIRD "Matrix 97 GPS Trackplotter Operations Manual" 2003.
HUMMINBIRD Matrix 97 Operations Manual; © 2003; 87 pages.
HUMMINBIRD Matrix™ 87c Operations Manual; © 2004; 45 pages.
HUMMINBIRD The New Wave of Wide; 1997; HUMMINBIRD WIDE®; fish wide open!®; 24 pages.
HUMMINBIRD NS25 Operations Manual; 71 pages.
HUMMINBIRD Piranha 1 & 2 Operation Guide; 5 pages.
HUMMINBIRD Platinum ID 120 Operations Manual; 36 pages.
HUMMINBIRD Platinum ID 600 Operations Manual; 18 pages.
HUMMINBIRD "The Product Line>Matrix Products>Matrix 35" http://web.archive.org/web/20030404000447/www.humminbird.com/hb_Products.asp?ID, Apr. 4, 2003.
Humminbird® Trolling Motor Mounted Transducer with Mount Assembly Brochure; © 2008 Humminbird®, Eufaula, AL; 2 pages.
HUMMINBIRD Wide 3D Paramount Operations Manual; 44 pages.
HUMMINBIRD Wide 3D View Operations Manual; 38 pages.
HUMMINBIRD Wide 3D Vision Operations Manuals; 38 pages.
HUMMINBIRD Wide 3D Vista Operations Manual; 38 pages.
HUMMINBIRD Wide Eye Operations Manual; 32 pages.

(56) References Cited

OTHER PUBLICATIONS

HUMMINBIRD Wide Paramount Operations Manual; fish wide open!; 32 pages.
HUMMINBIRD "Wideside"; Schematic; Dec. 15, 1994; 5 pages.
Hydro Products; A Tetra Tech Company; 4000 Series Gifft Precision Depth Recorder Product Brochure; date stamped 1977.
The Hydrographic Society—Corporate Member News—KONGSBERG SIMRAD; Jul. 3, 2008; 7 pages.
Imagenex Model 855 Brochure: Online; Documents retrieved from internet web archives as follows: URL:http://web.archive.org/web/20021023212210/http:/www.imagenex.com/Products/855_858/855_858.html; 1 page; Archived on Oct. 23, 2002 URL:http://web.archive.org/web/20021024124035/http:/www.imagenex.com/Products/855_858/855/855.html; 1 page; Archived on Oct. 24, 2002 URL:http://web.archive.org/web/20021024125254/http:/www.imagenex.com/Products/855_858/858/858.html; 1 page; Archived on Oct. 24, 2002 URL:http://web.archive.org/web/20030424071306/http:/www.imagenex.com/855_Page_1.jpg; 1 page; Archived on Apr. 24, 2003 URL:http://web.archive.org/web/20030424091547/http:/www.imagenex.com/855_Page_2.jpg; 1 page; Archived on Apr. 24, 2003 URL:http://web.archive.org/web/20030424094158/http:/www.imagenex.com/855_Page_3.jpg; 1 page; Archived on Apr. 24, 2003 URL:http://web.archive.org/web/20030424101301/http:/www.imagenex.com/855_Page_4.jpg; 1 page; Archived on Apr. 24, 2003 URL:http://web.archive.org/web/20030424101939/http:/www.imagenex.com/855_Page_5.jpg; 1 page; Archived on Apr. 24, 2003 URL:http://web.archive.org/web/20030424135458/http:/www.imagenex.com/855_Page_6.jpg; Archived on Apr. 24, 2003 URL:http://web.archive.org/web/20030424141232/http:/www.imagenex.com/855_Page_7.jpg; 1 page; Archived on Apr. 24, 2003 URL:http://web.archive.org/web/20030424143158/http:/www.imagenex.com/855_Page_8.jpg; 1 page; Archived on Apr. 24, 2003.
Imagenex Model 872 "Yellowfin" Sidescan Sonar; Imagenex Technology Corp.; © 2004-2009.
The Imagenex SportScan; Digital Sidescan Sonar; "Redefining Image Clarity"; Imagenex Technology Corp.; © 2002.
Imagenex SportScan Digital SideScan Sonar Brochure: Online; Documents retrieved from internet web archives as follows: URL:http://web.archive.org/web/20030212030409/http://www.imagenex.com/Products/products.html; 1 page; Archived on Feb. 12, 2003 URL:http://web.archive.org/web/20030214044915/http://www.imagenex.com/Products/SportScan/sportscan.html; 1 page; Archived on Feb. 14, 2003 URL:http://web.archive.org/web/20030222152337/http://www.imagenex.com/Products/SportScan/SportScan_Specs/sportscan_specs.html; 3 pages; Archived on Feb. 22, 2003 URL:http://web.archive.org/web/20030222161450/http://www.imagenex.com/Products/SportScan/FAQ_s/faq_s.html; 4 pages; Archived on Feb. 22, 2003 URL:http://web.archive.org/web/20030419024526/http://www.imagenex.com/Products/SportScan/distributors.html; 2 page; Archived on Apr. 19, 2003.
IMAGENEX (Various) Technical Specifications and User's Manual; Prior to Aug. 2003.
Innomar—Products; "System Variants: SES Side Scan Option"; Retrieved from internet URL:http://www.innomar.com/produ_2000sidescan.html; Dec. 30, 2003; 2 pages.
International Search Report and Written Opinion for Application No. PCT/US2010/039441 dated Oct. 11, 2010.
International Search Report and Written Opinion for Application No. PCT/US2010/039443 dated Oct. 6, 2010.
"ITC Application Equations for Underwater Sound Transducers"; Published by International Transducer Corporation, 1995, Rev. 8/00; 3 pages.
Kelvin Hughes Transit Sonar; ". . . a new dimension in shallow water survey to assist in . . . "; Hydrography; Dredging; Salvage; Underwater Construction and Similar Works; Mar. 1966; 8 pages.
Klein Digital Sonar Systems, " . . . The Next Generation From the World Leader in Side Scan Sonar and Sub-bottom Profiling Systems," 1988.

Kongsberg Brochure EA 400 Survey; "A complete, integrated survey system"; Kongsberg Maritime AS; Oct. 2003.
Kongsberg Brochure EA 400/600 "Sidescan Echo sounder with combined sidescan and depth soundings"; Kongsberg Maritime AS; May 2004.
Lowrance HS-3DWN Transducer Assembly and Housing (Eagle IIID); Aug. 1994.
Lowrance LCX-18C & LCX-19C Fish-finding Sonar & Mapping GPS; Operation Instructions; © 2002; 200 pages.
Lowrance Transducers Product Information; 1 page.
Navico Design Report of Raytheon Electronics Side Looker Transducer; Mar. 12, 2010; 18 pages.
NOAA: Nautical Charting general information from public records; [Online]; Retrieved on Sep. 10, 2010 from the Internet < URL: http://www.nauticalcharts.noaa.gov/csdl/learn_hydroequip.html; 2 pages; http://www.nauticalcharts.noaa.gov/csdl/learn_hydroequip.html; 1 page; http://www.nauticalcharts.noaa.gov/csdl/PDBS.html; 2 pages; http://www.nauticalcharts.noaa.gov/hsd/pub.html; 1 page; http://www.nauticalcharts.noaa.gov/hsd/fpm/fpm.htm; 1 page; http://www.ozcoasts.gov.au/geom_geol/toolkit/Tech_CA_sss.jsp; 12 pages.
ONR Grant N66604-05-1-2983; Final Report; "Cooperative Autonomous Mobile Robots"; Retrieved from the Internet <URL: http://dodreports.com/pdf/ada463215.pdf; Post 2006.
Odom Echoscan™: For Sea Floor or Riverbed Surveys; Odom Hydrographic Systems; Apr. 26, 2002; 2 pages.
Odom Hydrographic Systems ECHOSCAN Manual; Revision 1.11; Apr. 26, 2002.
"Product Survey Side-Scan Sonar"; Hydro International Magazine; vol. 36; Apr. 2004; pp. 36-39.
R/V Quicksilver; Hydrographic Survey Launch Bareboat or Crewed; F/V Norwind, Inc.
R/V Tangaroa; Fact Sheet; Explore lost worlds of the deep; Norfanz Voyage; May 10 to Jun. 8, 2003.
SeaBat 8101 Product Specification; 240kHz Multibeam Echo Sounder; © 1999 RESON Inc.; Version 4.0.
Sidefinder—Reviews & Brand Information—Techsonic Industries, Inc.; [Online]; [Retrieved on Dec. 7, 2011]; Retrieved from the Internet <URL: http://www.trademarkia.com/sidefinder-74113182.html>; 3 pages.
SIMRAD EA 500; Hydrographic Echo Sounder; Product Specifications; Revision: Sep. 1993.
SonarBeam Underwater Surveying System Using T-150P tow-fish hull mounted; [Online]; [Retrieved on Feb. 12, 2010 from the Internet <URL: http://dsmeu.en.ec21.com/Remotely_Operated_Sonar_Boat_System--618904_2479905.html; 4 pages; http://www.remtechnology.en.ec21.com/Side_Scan_Sonar_Remotely_Operated--2902034.html; 4 pages; [Retrieved on Feb. 16, 2010 from the Internet <URL: http://dsmeu.en.ec21.com/Remotely_Operated_Sonar_Boat_System--618904_2479905.html; 4 pages; http://www.remtechnology.en.ec21.com/Side_Scan_Sonar_Remotely_Operated--2902230.html; 7 pages.
Sonar Theory and Applications; Excerpt from Imagenex Model 855 Color Imaging Sonar User's Manual; Imagenex Technology Corp.; Canada; 8 pages.
Starfish 450H; Sidescan System; Tritech International Limited; UK.
T297-00-01-01 Transducer housing outline drawing; Neptune Sonar Ltd.; © 2002.
Techsonic Industries, Inc.; "Mask, Acoustic"; Schematic, May 24, 1996.
Techsonic Industries, Inc.; "Element, 455 kHz"; Schematic, Jun. 13, 1996.
Trademark Electronic Search System (TESS); Word Mark: Sidefinder; [Online]; [Retrieved on Dec. 7, 2011]; Retrieved from the Internet.
"Transducers Quad Beam," Prior to Aug. 2, 2003.
U-Tech Company Newsletter.
Ultra III 3D Installation and Operation Instructions; EAGLE™; © 1994.
USACE "Chapter 11, Acoustic Multibeam Survey Systems for Deep-Draft Navigation Projects," Apr. 1, 2004.
Westinghouse Publication; "Side-Scan Sonar Swiftly Surveys Subsurface Shellfish"; May 1970; 4 pages.

(56) References Cited

OTHER PUBLICATIONS

PCT International Search Report and Written Opinion; PCT/IB2013/060285; Feb. 18, 2014.
PCT International Search Report and Written Opinion; PCT/US2013/047869; Oct. 21, 2013.
PCT International Search Report and Written Opinion; PCT/US2013/048177; Oct. 21, 2013.
PCT International Search Report and Written Opinion; PCT/US2013/048129; Oct. 17, 2013.
PCT International Search Report and Written Opinion; PCT/US2013/047926; Oct. 11, 2013.
PCT International Search Report and Written Opinion; PCT/US2013/047645; Sep. 27, 2013.
Airman Press Release: *Airman Introduces P48W 200kHz Adjustable, Wide-Beam, Transom-Mount: Industry's widest 200 kHz transducer can help win fishing tournaments* (Apr. 23, 2009).
Airman Technology Corporation Brochure/Presentation: Guide to Transducer Technology (Aug. 18, 2010).
Airman Technology Corporation Datasheet: P48W Transom-Mount Adjustable Wide-Beam, (Dec. 2010).
Owner's Guide & Installation Instructions, Transam or Tolling Motor Mount, Chirp or Adjustable Wide-beam Transducer, Models: P48W, TM130M, TM150M, TM210H (2013).
Airmar Technology Corporation Brochure DST800 Retractable Transducer System Sep. 2005.
Garmin GPSMAN 3206/3210 Color Chartplotter Owner's Manual (Jun. 2006).
GeoAcoustics, GeoSwath Operation Manual Swath 6100/B (Sep. 1998).
GeoAcoustics, GeoSwath Product Bulletin (2000).
Hogarth, P., Low Cost Swath Bathymetry: Widening the swath bathymetry market, Hydro International (Jul. 2000).
Datasheet / Specification for Imagenex Sportscan, (Aug. 2005).
Imagenex Model 858 User's Manual (May 1999).
Imagenex Model 855 User's Manual (Nov. 1991).
Imagenex Sportscan Installation / Setup Manual (date unknown).
Product News, Versatile Side-Scan Sonar: JW Fishers developed a side-scan towfish with adjustable transducers, Hydro International, (Feb. 2008) http://.hydro-international.com/news/id2531-VersatileSidescanSonar.html.
Side Scan PC Operation Manual: SSS-100k PC, SSS-600K PC, SSS-100k/600K PC Side Scan Sonar Operation and Maintenance Manual, JW Fishers MFG Inc (date unknown).
Klein Associates Brochure: Hydroscan for Pipeline Survey (date unknown).
Klein Associates Brochure: Klein Smartfish, A Proven Platform for Deep Tow Applications (date unknown).
Klein Associates Brochure: System 3900—Dual-Frequency Side Scan Sonar for Search and Recovery (Nov. 2008).
Klein Associates Product Catalog Supplement: Sub-Bottom Profiler & Microprofiler (Supplement to HYDROSCAN catalog) (Nov. 1983).
Klein Hydroscan Applications Bulletin: Oil and Gas Pipeline Routing, Laying and Inspection, (Jan. 1983).
Kucharski, William M., and Clausner, James E., Underwater Inspection of Coastal Structures Using Commercially Available Sonars, Technical Report REMR-CO-11, US Army Corps of Engineers, Department of the Army (Feb. 1990).
Mazel, Charles H., Inspection of Surfaces by Side Scan Sonar, Proceedings of the Remotely Operated Vehicles Conference and Exposition, (1984).
EA 400/600 Sidescan: Echo Sounder with Combined Sidescan and Depth Soundings, Konigsberg Maritime AS, (Nov. 2005).
SIMRAD EK 500 Fishery Research Echo Sounder Installation Manual (Jun. 2006).
SIMRAD EK 500 Fishery Research Echo Sounder Operator Manual (May 1996).
Avera W., et al., Multibeam Bathymetry from a Mine-Hunting Military Sonar, Report No. NRL/JA/7440-02-1010, Naval Research Laboratory and Naval Oceanographic Office, (Nov. 2002).
Barbu, Madalina, "Acoustic Seabed and Target Classification using Fractional Fourier Transform and Time-Frequency Transform Techniques" Dissertation Paper 480, University of New Orleans (2006).
Barbu, C., et al., AQS-20 Sonar Processing Enhancement for Bathymetry Estimation, pp. 1-5, Presented at OCEANS Conference (2005).
Buchanan, H.L. and Lt. Cmdr. John M. Cottingham, Countering Mines in 2005, Sea Technology, vol. 41, No. 1, pp. 24-29, (Jan. 2000).
Elmore, P.A., et al., Environmental Measurements Derived from Tactical Mine Hunting Sonar Data, pp. 1-5, Presented at OCEANS Conference (2007).
Elmore, P.A. et al., Use of the AN/AQS-20A Tactical Mine-hunting System for on-scene Bathymetry Data, Journal of Marine Systems, vol. 78, pp. 5425-5432(Feb. 2008).
Gallaudet, T.C., et al., Multibeam Volume Acoustic Backscatter Imagery and Reverberation Measurements in the Northeastern Gulf of Mexico, J. Acoust. Soc. Am., vol. 112, No. 2, pp. 489-503 (Aug. 2002).
Harris, M.M., et al., Tow Vehicle Depth Verification, Oceans 2002 IEEE/MTS Conference Proceedings, pp. 1199-1202 (Oct. 2002).
Streed, C.A., et al., AQS-20 Through-The-Sensor Environmental Data Sharing, Proceedings of the SPIE Defense & Security Symposium (Mar. 2005).
Taylor, W.A., et al., Taking the Man out of the Minefield, Sea Technology 2007, vol. 48, No. 11, pp. 15-19 (Nov. 2007).
Kelly, D., The Scoop on Scanning Sonar, Motor Boating and Sailing, pp. 51, 70-71 (Aug. 1976).
Sosin, M., Can Electronics Make You Almost as Smart as a Fish, Popular Mechanics, pp. 110-111 (Nov. 1976).
WESMAR Brochure: Wesmar's New HD800 Sonar (date unknown).
Wesmar Sonar Effective in Shallow-Water Operations Literature Available, Maritime Reporter and Engineering News, p. 13 (Dec. 15, 1983).
Denny, M., Blip, Ping, and Buzz, JHU Press 1st ed. (2007).
Hemming, B.W., M. Klein, P.M. Denbigh, Recent Developments in Side Scan Sonar Techniques, (1982).
Hansen, R.E., Introduction to Sonar, Course Material to INF-GEO4310, University of Oslo, (Oct. 7, 2009).
Kurie, F.N.D. Design and Construction of Crystal Transducers, Office of Scientific Research and Development Washington D C., (1946).
Loeser, Harrison T., Sonar Engineering Handbook, Peninsula Publishing (1992).
Medwin, H. et al., Fundamentals of Acoustical Oceanography, Academic Press (1998).
Miller, S.P., Selected Readings in Bathymetric Swath Mapping, Multibeam Sonar System Design, University of California Santa Barbara (Apr. 1993).
Sherman, C. & J. Butler, Transducers and Arrays for Underwater Sound, Springer Sci. & Bus. Media, 1st ed. (2007).
Stansfield, D., High Frequency Designs, Underwater Electroacoustic Transducers: A Handbook for Users and Designers, Bath University Press and Institute of Acoustics (1991).
Urick, R.J., Principles of Underwater Sound, 3rd Edition, McGraw-Hill Book Company, 1983.
Wilson, O.B., An Introduction to the Theory and Design of Sonar Transducers, Navy Postgraduate School, Monterey, California (Jun. 1985).
Woollett, R.S., Sonar Transducer Fundamentals, Scientific and Engineering Studies, Naval Underwater Systems Center (1984).
Bass, G. New Tools for Undersea Archeology, National Geographic, vol. 134, pp. 403-422 (1968).
Chesterman, W.D., Clynick, P.R., and Stride, A.H., An Acoustic Aid to Sea Bed Survey, Acustica, pp. 285-290, Apr. 1958.
Cyr, Reginald, A Review of Obstacle Avoidance/Search Sonars Suitable for Submersible Applications, Marine Tech. Soc. Journal., vol. 20, No. 4, pp. 47-57(Dec. 1986).
Donovan, D.T., Stride, A.H., and Lloyd, A.J., An Acoustic Survey of the Sea Floor South of Dorset and its Geological Interpretation, Philosophical Transactions of the Royal Society of London, Series B, Biological Sciences, pp. 299-330 (Nov. 1961).
Flemming, B.W., Side-Scan Sonar: A Practical Guide, International Hydrographic, pp. 65-92 (Jan. 1976).

(56) References Cited

OTHER PUBLICATIONS

Hersey, J. B, et al., Sonar Uses in Oceanography, Presented at Instrument Automation Conference and Exhibit, New York, NY, Sep. 1960.
Hydro Surveys: Side Scan Sonar Systems, Hydro International (2008).
Morang, Andrew, Kucharski, William M., Side-Scan Investigation of Breakwaters at Calumet and Burns Harbors in Southern Lake Michigan, Oceans 86 Conference Record, pp. 458-465, Sep. 1986.
Newman, P., Durrant-Whyte, H., Using Sonar in Terrain-Aided Underwater Navigation, IEEE Proceedings, (May 1998).
Noble, N., The Telltale Sound of Depth, Motor Boating and Sailing, pp. 23-24(Aug. 1976).
Pappalardo, M., Directivity Pattern of a Linear Array Transducer in High Frequency Range, Journal de Physique, pp. 32-34 (Nov. 1972).
Patterson, D.R., and J. Pope, Coastal Applications of Side Scan Sonar, Proceedings of Coastal Structures '83, Mar. 1983.
Onoe, M., and Tiersten, H.F., Resonant Frequencies of Finite Piezoelectric Ceramic Vibrators with High Electromechanical Coupling, IEEE Transactions of Ultrasonics Engineering, pp. 32-39 (Jul. 1963).
Rusby, Stuart, A Long Range Side-Scan Sonar for Use in the Deep Sea (Gloria Project) Int. Hydrogr. Rev., pp. 25-39 (1970).
Rossing, Thomas D., Sonofusion??, ECHOES: The Newsletter of the Acoustical Society of America, vol. 12, No. 2 (Spring. 2002).
Somers, M.L., and Stubbs, A.R., Sidescan Sonar, IEE Proceedings, pp. 243-256, Jun. 1984.
Spiess, F.N., Acoustic Imaging, Society of Photo-optical Instrumentation Engineers' Seminar-in-Depth on Underwater Photo-optical Instrumentation Applications, pp. 107-115 (Mar. 1971).
Stride, A.H., A Linear Pattern on the Sea Floor and its Interpretation, National Institute of Oceanography, Wormley, Surrey, pp. 313-318 (1959).
Tyce, R.C., Deep Seafloor Mapping Systems a Review, Marine Tech. Soc. Journal., vol. 20, No. 4, pp. 4-16 (Dec. 1986).
Wang, H.S.C., Amplitude Shading of Sonar Transducer Arrays, The Journal of the Acoustical Society of America, pp. 1076-1084, (May 1975).
Benthien, George W, and Hobbs, Stephen, Technical Report: Modeling of Sonar Transducers and Arrays, Sep. 2005.
Barnum, S.R. CDR, Descriptive Report to Accompany Hydrographic Survey Side, Scan Sonar / Multibeam Survey of Portsmouth Harbor, Survey No. H11014 (2001).
Clausner, J. Coastal Engineering Technical Note: Side Scan Sonar for Inspecting Coastal Structures, CETN-III-16, U.S. Army Engineer Waterways Experiment Station, (Nov. 1983).
Craig, J.D., Engineering and Design: Evaluation and Repair of Concrete Structures, Manual No. 1110-2-2002, US Army Corps of Engineers, Department of the Army (Jun. 1995).
McMillan, Ken, The Application of Sector Scanning Sonar Technology to the Mapping of Granular Resources on the Beaufort Shelf using the Sea-Ice as a Survey Platform, McQuest Marine Research and Development Company, Report Prepared Geological Survey of Canada Atlantic, (Mar. 1997).
Ronhovde, A., High Resolution Beamforming of Simrad EM3000 Bathymetric Multibeam Sonar Data, Cand Scient thesis, University of Oslo, Norway. (Oct. 1999).
Speiss, F.N., and Tyce, R.C., Marine Physical Laboratory Deep Tow Instrumentation System, Deep Submergence Systems Project and Office of Naval Research, Report No. MPL-U-69/72, (Mar. 1973).
Williams, S. Jeffress, Use of High Resolution Seismic Reflection and Side-Scan Sonar Equipment for Offshore Surveys, CETA 82-5, U.S. Army Corps of Engineers Coastal Engineering Research Center (Nov. 1982).

EdgeTech 2000-CSS Integrated Coastal System Subscan Brochure (date unknown).
HyPack Inc,: HyPack Software User Manual (date unknown).
L-3 Communications SeaBeam Instruments Technical Reference: Multibeam Sonar Theory of Operation, (2000).
QPS b.v.,: Qinsy User Manual (Apr. 27, 2004).
SIMRAD Kongsberg EM Series Multibeam Echo Sounder Operators Manual (2000).
Tritech Technical Data Sheet: ROV/AUV Side Scan—Sea King Side Scan Sonar (date unknown).
Tritech Manual: Starfish Hull Mount Sonar System User Guide (date unknown).
Triton Elics Intl.: ISIS Sonar® User's Manual, vols. 1 and 2 (Jun. 2004).
Vernitron Product Catalog: Modern Piezoelectric Ceramics, Custom Material Product Catalog (date unknown).
Oceanic Imaging Consultants (OIC) Inc.: GeoDAS SDV Geophysical Data Acquisition System Brochure.
SonarWeb Pro [retrieved Feb. 10, 2015]. Via the Internet Archive Wayback Machine at https://web.archive.org/web/20090622013837/http://chesapeaketech.com/prod-webpro.html (Jun. 22, 2009). 4 pages.
Feature Matrix—SonarTRX/-Si/-LSS Sidescan sonar processing software (Version 13.1—Feb. 20, 2013) [retrieved Feb. 10, 2015]. Retrieved from the Internet: http://www.sonartrx.com/Documents/SonarTRX-FeatureMatrix-1301.pdf (dated Feb. 10, 2015). 2 pages.
Clausner, J.E. and Pope, J., 1988. "Side-scan sonar applications for evaluating coastal structures"; U.S. Army Corps of Engineers, Technical Report CERC-88-16; 80 pages.
GARMIN; GPSMAP® 4000/5000 Series, Owner's Manual; 2007; 54 pages.
Hare, M.R., "Small-Boat Surveys in Shallow Water", 2008 Institute of Ocean Sciences, Marine habitat mapping Technology for Alaska; 19 pages.
Hayes, M.P. and Ho, T.Y., 2000. "Height estimation of a sonar towfish from sidescan imagery", Hamilton: Proc. Image Vision Computing New Zealand; 6 pages.
HUMMINBIRD 1100 Series Operations Manual; © 2007; 196 pages.
Imagenex Technology Corp., Model 881 Digital Tilt Adjust Imaging Sonar; Hardware Specifications; Aug. 12, 2002; 3 pages.
Klein Associates, Inc.; 1985, "Side Scan Sonar Training Manual", Side scan Sonar Record Interpretation; 151 pages.
Mazel, C. H., 1984 "Inspection of Surfaces by Side-Scan Sonar," ROV '84 Remotely Operated Vehicle Conference of the Marine Technology Society, 7 pages.
SOLAS Chapter V; Safety of Navigation, Jul. 1, 2002; [Online]; Retrieved from the Internet URL:https://www.gov.uk/government/uploads/system/uploads/attachment_data/file/343175/solas_v_on_safety_of_navigation.pdf.
Tcuker, M. J., and Stubbs, A. R., "Narrow-beam echo-ranger for fishery and geological investigations", British Journal of Applied Physics vol. 12:3 pp. 103-110 (1961).
Montgomery, E.T., et al., "Documentation of the U.S. Geological Survey Oceanographic Time-Series Measurement Database", USGS Open-File Report 2007-1194; 2 pages.
WESMAR; 500SS Sidescan Brochure; Feb. 1985; 2 pages.
WESMAR; 500SS Side Scan Brochure; May 1998; 2 pages.
WESMAR; 500SS Side Scan Owner's Manual; 82 pages.
WESMAR; SHD 700SS; "Super High Definition Side Scan Sonar with Color Video Display Capability", Operations Manual, May 1998, 45 pages.
WESMAR; SHD 700SS Super High Definition Side Scan Sonar; date unknown; 4 pages.

* cited by examiner

SONAR RENDERING SYSTEMS AND ASSOCIATED METHODS

FIELD OF THE INVENTION

Embodiments of the present invention relate generally to sonar systems, and more particularly, to managing and rendering sonar data.

BACKGROUND OF THE INVENTION

Sonar has long been used to detect waterborne or underwater objects. Sonar devices may be used to determine depth and bottom topography, detect fish or other waterborne objects, locate wreckage, etc. In this regard, due to the extreme limits on underwater visibility, sonar is typically the most accurate way to locate objects underwater. Devices such as transducer elements, or simply transducers, have been developed to produce sound or vibrations at a particular frequency that is transmitted into and through the water. Echo returns from the transmitted sound reflected off an object are received, either by the same transducers or by separate receiver elements and are converted into an electrical signal. These electrical signals can be analyzed and interpreted to obtain information about underwater structures.

Transducer technology and sonar techniques continue to evolve, such that information about larger underwater areas is being captured more rapidly. Innovations in both downscan and sidescan sonar technology have contributed to this increase in the amount of data being collected from the transducers and transducer arrays. Due to this availability of large amounts of detailed information, innovative ways to present this data can be considered and implemented.

Traditionally, sonar data has been rendered relative to the source of the sonar beam (i.e., the transducers). Since the only constant reference for the sonar data is this beam origin, renderings of sonar data can be difficult to interpret. For example, consider a transducer that is affixed to a watercraft. The transducer may continuously receive return echoes describing the underwater surroundings of the watercraft. However, by simply considering the content of the raw sonar data retrieved from a transducer, the physical movement of the watercraft is unaccounted for in the rendering of the data. Based on the raw sonar data alone, it can be unclear whether the watercraft was traveling in a straight line (e.g., due north) or if the watercraft is circling the same location. Because the only reference is the transducer or the watercraft itself, the context in which the raw sonar data is being provided can be unclear and confusing, particularly for a novice to sonar technology.

As such, it may be desirable to manage and render raw sonar data in different contexts in order to increase the interpretability of the data to a user.

BRIEF SUMMARY OF SOME EXAMPLE EMBODIMENTS

Example embodiments of various sonar rendering systems and methods are described herein. One example embodiment is an apparatus comprising a transducer assembly, position sensing circuitry, processing circuitry, and a display device. The transducer assembly may be configured to emit a sonar beam, receive return echoes of the sonar beam, and convert the return echoes into raw sonar data. The transducer assembly may also be configured to be affixed to a watercraft. The position sensing circuitry may be configured to determine positioning data. The positioning data may be indicative of a position of the watercraft. The processing circuitry may be configured to receive the raw sonar data and the positioning data, convert the raw sonar data into range cell data based at least on amplitudes of the return echoes, make a location-based association between the raw sonar data and the positioning data, plot the range cell data based on respective positions derived from the positioning data and rotate the range cell data based on a direction of movement of the watercraft to generate adjusted range cell data. The adjusted range cell data may then be converted into sonar image data. According to some embodiments, such as those where the transducer element is operating as a sidescan transducer, the range cell data may be rotated based on the direction of movement of the watercraft such that the range cell data is rotated to extend in a direction that is substantially perpendicular to the direction of movement of the watercraft. The display device may be configured to render the sonar image data with a presentation of a geographic map.

Various example method embodiments are also described. One example method comprises emitting a sonar beam by a transducer assembly, receiving return echoes of the sonar beam, and converting the return echoes into raw sonar data. The transducer assembly may be configured to be affixed to a watercraft. The example method may also include determining positioning data by position sensing circuitry, where the positioning data is indicative of a position of the watercraft. The example method may also comprise receiving the raw sonar data and the positioning data by processing circuitry, converting the raw sonar data into range cell data based at least on amplitudes of the return echoes, make a location-based association between the raw sonar data and the positioning data, plotting the range cell data based on respective positions derived from the positioning data and rotating the range cell data based on a direction of movement of the watercraft to generate adjusted range cell data, converting the adjusted range cell data into sonar image data, and rendering, by a display device, the sonar image data with a presentation of a geographic map.

Other example embodiments may include computer-readable media having computer-program instructions stored thereon. One example embodiment is a non-transitory computer-readable medium comprised of at least one memory device having computer program instructions stored thereon. The computer program instructions may be configured to, when executed by processing circuitry, to cause an apparatus to perform various functionalities. Those functionalities may include emitting a sonar beam by a transducer element, receiving return echoes of the sonar beam, and converting the return echoes into raw sonar data. The transducer element may be configured to be affixed to a watercraft. The computer program instructions may also be configured to cause the apparatus to determine positioning data by position sensing circuitry. The positioning data may be indicative of a position of the watercraft. The functionalities performed by the apparatus due to the execution of the computer program instructions may also include receiving the raw sonar data and the positioning data by processing circuitry, converting the raw sonar data into range cell data based at least on amplitudes of the return echoes, make a location-based association between the raw sonar data and the positioning data, plotting the range cell data based on respective positions derived from the positioning data and rotating the range cell data based on a direction of movement of the watercraft to generate adjusted range cell data, converting the adjusted range cell data into sonar image data, and rendering, by a display device, the sonar image data with a presentation of a geographic map.

BRIEF DESCRIPTION OF THE SEVERAL VIEWS OF THE DRAWING(S)

Having thus described the some example embodiments of the invention in general terms, reference will now be made to the accompanying drawings, which are not necessarily drawn to scale, and wherein:

Figure 15:
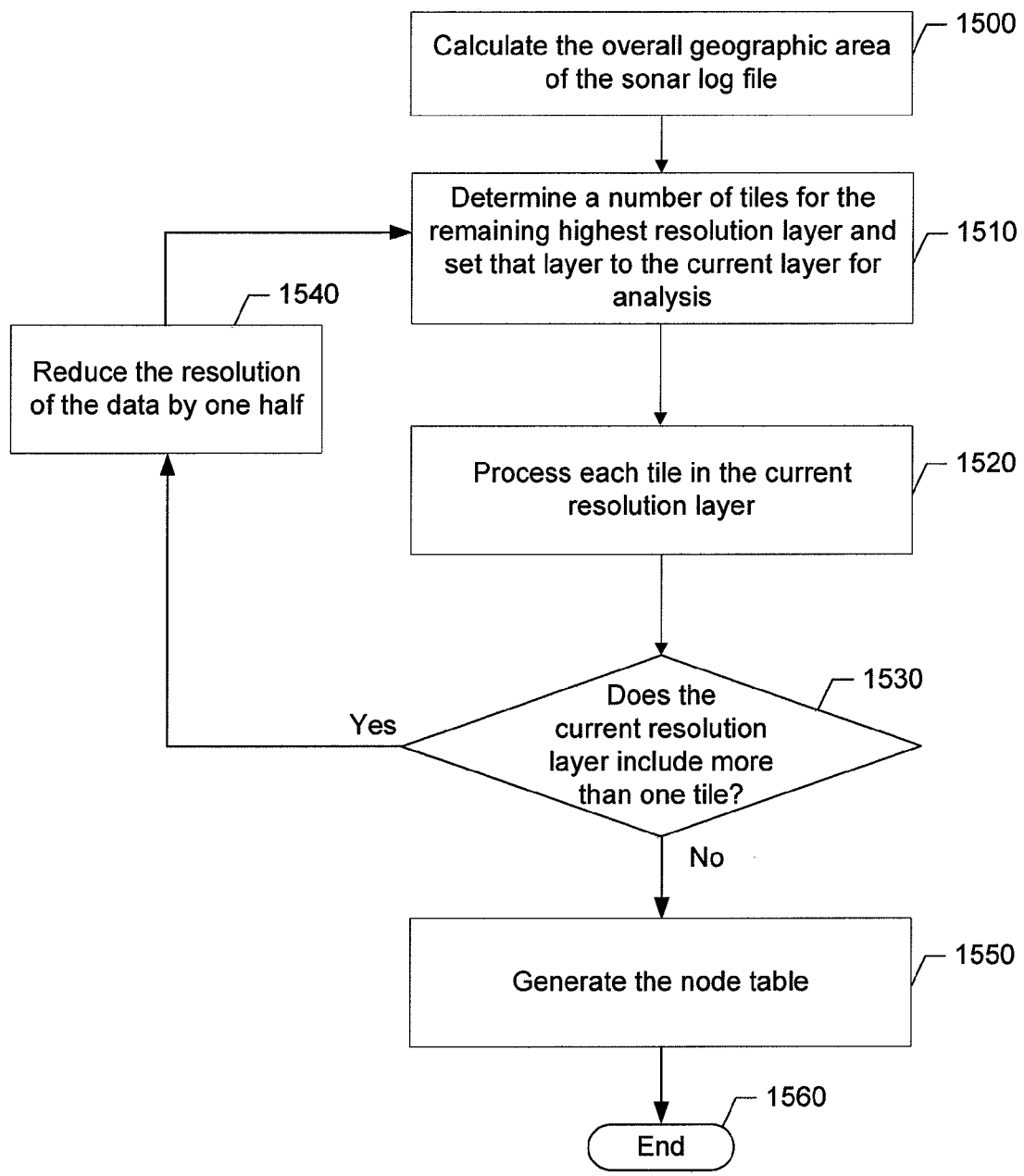
Figure 16:
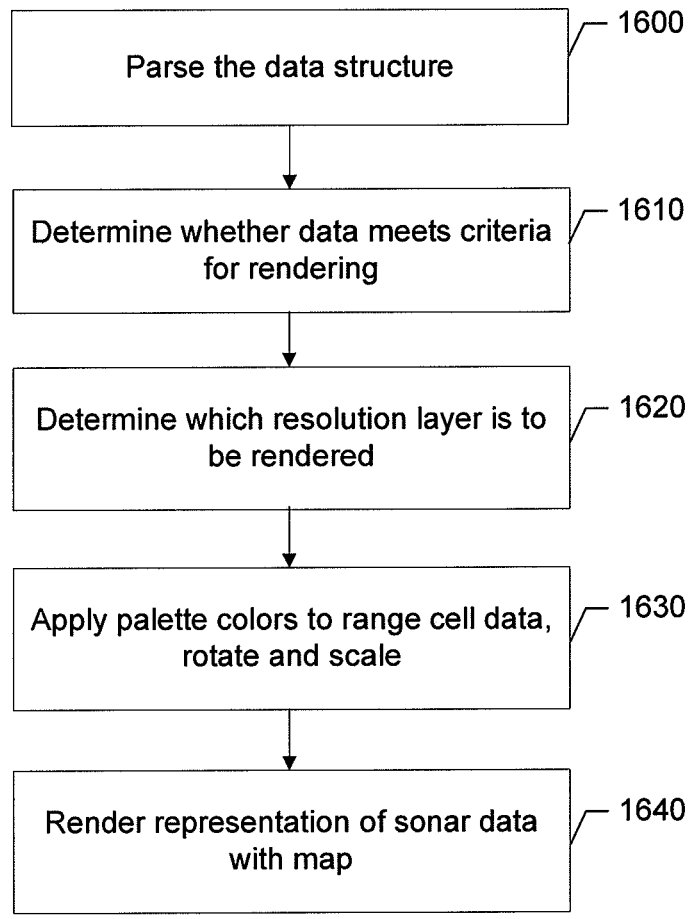

FIG. 15. is a flowchart of example operations for converting range cell data in the Saved Mode data structure according to some example embodiments; and FIG. 16 is a flowchart of example operations for rendering data in the Saved Mode according to some example embodiments.

DETAILED DESCRIPTION OF THE INVENTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Figure 1:
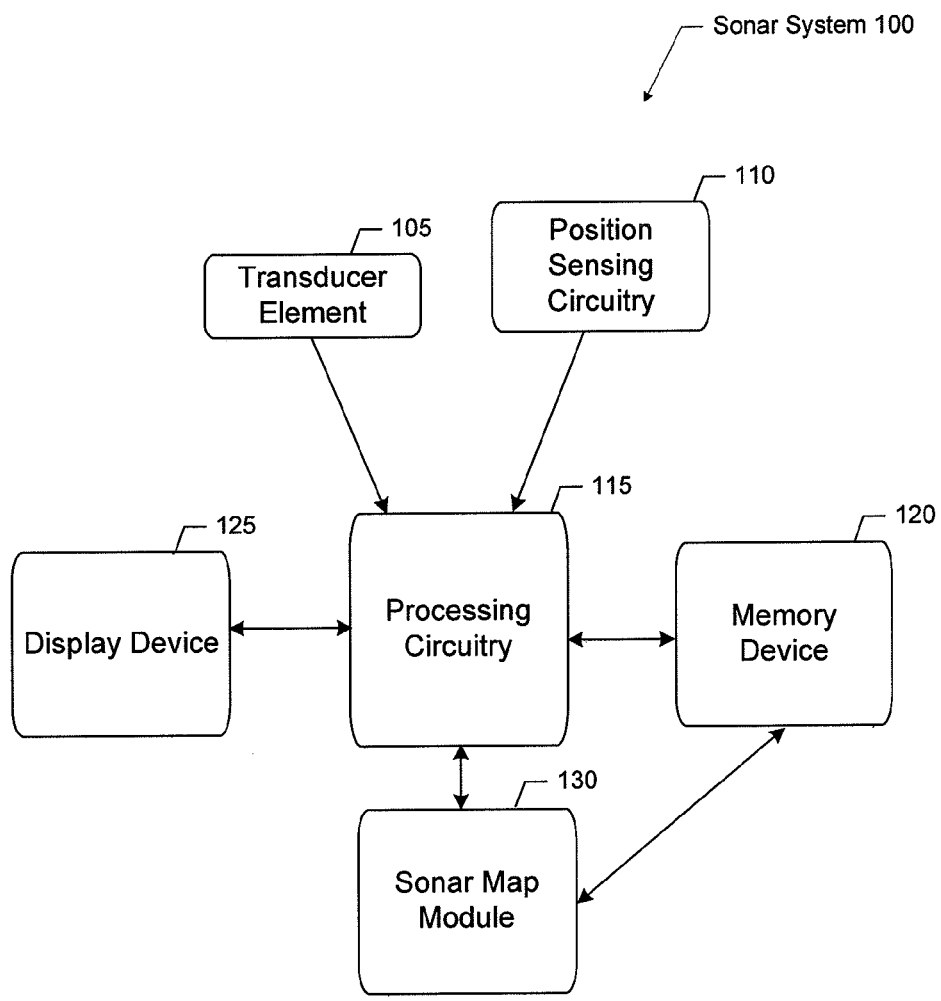
FIG. 1 is a block diagram of a sonar system according to some example embodiments.

FIG. 1 illustrates a block diagram of an example sonar system 100 according to some example embodiments of the present invention. Sonar system 100 may include at least one transducer element 105, position sensing circuitry 110, processing circuitry 115, at least one memory device 120, a display device 125, and a sonar map module 130. The sonar system 100 may, in some example embodiments, be configured for installation on a watercraft, which may be a surface-going vessel as small as a canoe or fishing boat or as large as an ocean liner or a cruise ship or may be a submersible such as a tow fish, remotely operated vehicle (ROV), autonomous underwater vehicle (AUV), or the like. The sonar system 100 may be configured for installation on any type of device or apparatus that may benefit from the use of sonar technology.

The transducer element 105 may include a piezoelectric material in the form of a crystal that may be constructed to produce vibrations (e.g., sound) at a particular frequency for transmission through water. The vibrations generated by the transducer element 105 may take the form of a sonar beam that is emitted from the transducer element 105. Based on the architecture and mounting angle of the transducer element 105, the sonar beam may define an underwater volume that is affected by the beam. Transducer element 105 may be configured to generate any type of sonar beam, such as, for example, a conical beam, a fan-shaped beam, or the like, and may be mounted such that the beam is directed in any desired direction.

In some example embodiments, the transducer element 105 may be constructed and mounted such that the transducer element 105 operates as a sidescan transducer element. As its name implies, a sidescan transducer element may be directed to look to a side of a vessel, as opposed to being aimed directly below a vessel (i.e., a downscan transducer element). A side scan transducer may generate a somewhat planar beam pattern that is relatively narrow in beamwidth in a horizontal direction parallel to the keel of a vessel and is relatively wide in beamwidth in a vertical direction perpendicular to the keel of the vessel.

Regardless of the architecture and mounting angle, the transducer element 105 may also be configured to receive echo returns from the generated sonar beam. However, in some example embodiments, a transmitting transducer may be used to emit the sonar beam and a receiving transducer may be used to receive the echo returns. The transducer element 105 may be configured to convert the echo returns into electrical signals, also referred to as raw sonar data, that may be analyzed. Based on the time difference from when the sonar beam was emitted to when an echo return was received, information about the seafloor and underwater structures can be determined. As such, the transducer element 105 may be controlled by processing circuitry 115 to trigger the transducer element 105 (e.g., at a particular scan rate) to emit a sonar beam and receive the electrical signals indicative of echo returns to be analyzed and interpreted.

Figure 2:
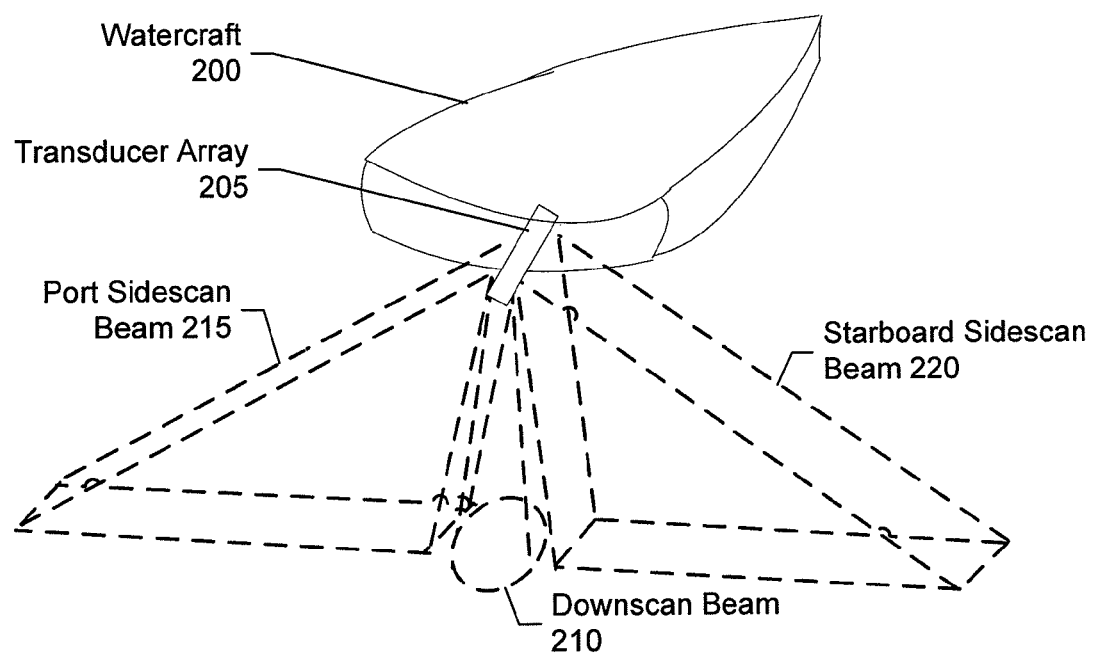
FIG. 2 is a diagram illustrating an example beam pattern for a sonar system according to some example embodiments.

According to some example embodiments, the transducer element 105 may be one element in a transducer array that produces multiple sonar beams. FIG. 2 illustrates an example multi-beam pattern that may be used in accordance with some example embodiments. The transducer array 205 may be affixed to the watercraft 200 to produce the multi-beam pattern. The transducer array may include, for example, three transducer elements. A first transducer element may be configured to generate the conical downscan beam 210. A second transducer element may be configured to generate a rectangular port sidescan beam 215, and a third transducer element may be configured to generate a rectangular starboard sidescan beam 220. According to some example embodiments, the downscan transducer need not be included in the array or the echo returns from the downscan beam need not be included in the raw sonar data that is used for underwater imaging as described in the following.

The sonar system 100 may also include position sensing circuitry 110 that is configured to determine a current location of an object that the position sensing circuitry is affixed to. The current location may be included as, for example, coordinates (e.g., longitude and latitude), in positioning data generated by the position sensing circuitry. In an example embodiment where the position sensing circuitry 110 is affixed to a watercraft, the position sensing circuitry may indicate the location of the watercraft. In this regard, the position sensing circuitry 110 may include an antenna and associated processors configured to receive global positioning system (GPS) signals and determine a current location. The positioning data may therefore be provided in the form of GPS coordinates that can be used to geo-tag various types of information. Additionally, or alternatively, the position sensing circuitry 110 may be configured to determine a location through the reception of WiFi signals, cellular telephone system signals, or the like. The position sensing circuitry 110 may interface with the processing circuitry 115 to provide positioning data to the processing circuitry 115. According to some example embodiments, the position sensing circuitry 110 may also determine a direction and speed of movement, and provide the direction and speed of movement in the positioning data provided to the processing circuitry 115. Alternatively, the processing circuitry 115 may be configured to determine the direction and speed of movement based on historical time-stamped location information received from the position sensing circuitry 110.

The processing circuitry 115 may be configured to receive raw sonar data from the transducer element for conversion and analysis. In this regard, the processing circuitry 115 may be configured to process the raw sonar data for rendering by the display device 125 and/or storage in the memory device 120. Further, the processing circuitry 115 may be configured to receive positioning data from the position sensing circuitry and associate the raw sonar data to the positioning data to determine the location and time at which the raw sonar data was acquired. In this regard, the processing circuitry 115 may be configured to make a location-based and/or temporal association between the raw sonar data and the positioning data. Additionally, in some example embodiments, the processing circuitry 115 may be configured to control the operation of the transducer element 105 to cause the transducer element 105 to generate a sonar beam at a particular scan rate. For each scan the transducer element 105 may generate, and upon generation transmit to the processing circuitry 115, an incremental set of raw sonar data for the scan. According to some example embodiments, the scan rate may be fixed or the scan rate may be dynamically modified based on, for example, the current speed of the watercraft. The processing circuitry 115 may also be configured to receive each incremental set of raw sonar data from the transducer element 105 and, in response to receiving the incremental set of raw sonar data, process the data to generate a sonar column of range cell data. The processing circuitry 115 may also be configured to generate sonar image data for rendering upon generating the range cell data.

The processing circuitry 115 may include one or more hardware processors (e.g., microprocessors) that are configured to retrieve instructions from a memory device (e.g., memory device 120) for execution by the processors. In this regard, the processing circuitry 115 may include a general purpose microprocessor that is converted into a particular machine through the execution of computer program instructions. Some of the various example embodiments described herein may be implemented through the execution of computer program instructions stored on the memory device 120 by the processing circuitry 115. The functionality described with respect to the sonar map module 130, FIGS. 4-16, and otherwise described herein may be implemented in this manner. Additionally or alternatively, the processing circuitry 115 may include hardware devices, such as application specific integrated circuits (ASICs) and field programmable gate arrays (FPGAs) that are hardware configured to implement functionality. In this regard, the functionality described with respect to the sonar map module 130, FIGS. 4-16 and otherwise described herein may be implemented in this manner.

The processing circuitry 115 may be centralized in a single housing (e.g., in a multi-function display (MFD) device) or the processing circuitry may be distributed. For example, some processing of the raw sonar data may be performed by a sonar coprocessor that may be housed with the transducer element 105, in a separate housing, or in a common housing with other processing circuitry.

The memory device 120 may comprise one or more data storage and retrieval devices that are configured to store instructions or data and provide the instructions or data when requested. The memory device 120 may be a non-transitory computer-readable medium. The memory device 120 may include volatile and/or non-volatile memory devices. Such memory devices may include on-board or on-chip memories, removable memory cards, hard drives, and the like. As mentioned above, the memory device 120 may be configured to store computer program instructions for execution by a processing device included in the processing circuitry 115. As further described below, the memory device 120 may be a date storage device that stores raw sonar data and transformed versions of the raw sonar data, such as range cell data and Saved Mode data structures.

The display device 125 may be any type of visual output device that renders information for consideration by a user. In this regard, the display device may include a display panel such as a liquid crystal display panel. While in some example embodiments, the display device may be simply a display panel that is controlled by the processing circuitry 115, in other example embodiments, the display device 125 may include some or all of the processing circuitry 115. For example, the processing circuitry external to the display device 125 may be configured to convert the raw sonar into range cell data (described further below) and the display device 125 may include processing circuitry configured to convert the range cell data into sonar image data for rendering on the display panel. As such, the display device 125 may include one or more hardware configured processors or processors that may be configured through the execution of computer program instructions.

In some example embodiments, the display device 125 may also include a user input interface for receiving user inputs and selections that may be passed to the processing circuitry 115 to trigger various functionalities. In this regard, the display device 125 may be a touch screen display, may include dynamically configurable softkeys, and/or may include a keypad. Further, according to various example embodiments, the display device may be a multi-function display (MFD) or may be a component of the MDF.

Although not depicted in FIG. 1, the sonar system 100 may also include a wired or wireless communications interface. The communications interface may permit the transmission and receipt of data via wired serial or parallel communications ports or via wireless links to a WiFi network, a cellular network, or the like.

According to various example embodiments, the sonar system 100 may be configured to perform various functionalities as further described below through the configuration of the sonar map module 130. In some example embodiments, the sonar map module 130 may take the form of computer executable instructions stored in the memory device 120, that, when executed, cause the processing circuitry 115 and the sonar system 100 to perform the functionality described with respect to FIGS. 4-16 and as otherwise described herein. Additionally or alternatively, some or all of the sonar map module 130 may take the form of a hardware configuration of the processing circuitry 115 as, for example, functionality of an ASIC or FPGA to configure the processing circuitry 115 to perform some or all of the functionality described with respect to FIGS. 4-16 and as otherwise described herein.

Figure 3:
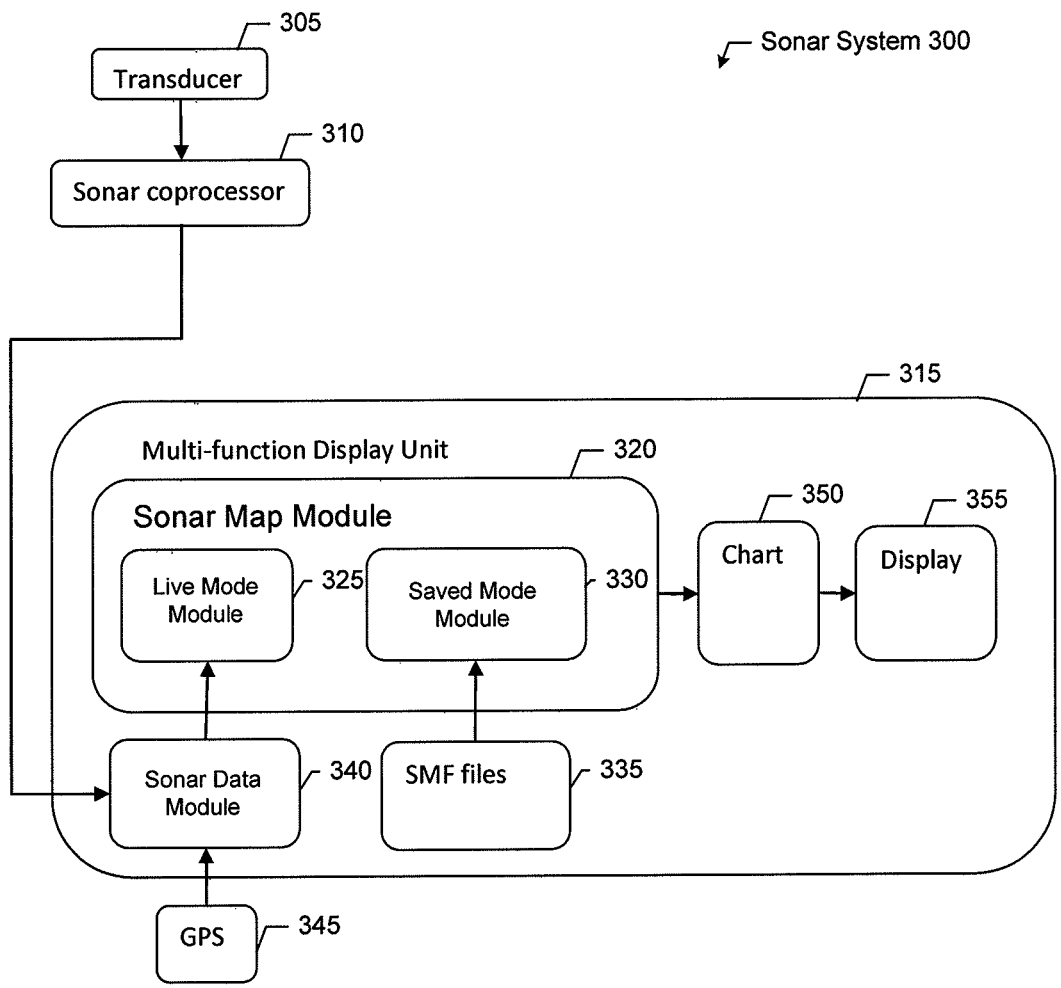
FIG. 3 is a block diagram of a more specific example embodiment of a sonar system according to some example embodiments.

FIG. 3 illustrates a block diagram of a more specific example sonar system 300 in accordance with some example embodiments of the present invention, wherein the processing circuitry 115 is more distributed. In this regard, the sonar system 300 may also be configured to perform the functionality of the sonar map module 130, however, with a more specific system architecture. The sonar system 300 includes a transducer 305, a sonar coprocessor 310, a multi-function display unit 315 and a GPS unit 345. The multi-function display unit 315 may be configured to implement the functionality described with respect to FIGS. 4-16 and as otherwise described herein via the sonar map module 320 which may be embodied as computer program instructions stored on a non-transitory computer-readable medium, processing circuitry configured through the execution of the computer program instructions, or through the hardware configuration of an ASIC, FPGA or the like. The sonar map module 320 may include a Live Mode Module 325 for generating Live Mode composite maps and a Saved Mode module for generating and rendering a Saved Mode data structure in a particular data format, such as a Structure Map File (SMF) 335. In this regard, the sonar map module 320 may be similar or the same as sonar map module 130 with respect to the associated functionality.

As described above, similar to transducer element 105, transducer 305 may be configured to generate raw sonar data. In the sonar system 300, the raw sonar data may be provided to the sonar coprocessor 310 for initial processing. As further described below, the raw sonar data may be converted into range cell data and provided to the sonar data module 340. The sonar data module 340 may configured to make a location-based association between range cell data received from the sonar coprocessor 310 and positioning data received from the GPS unit 345. The time-and-position-stamped range cell data may then be processed by the sonar map module 320 and provided together with a chart 350 (or map) to display 355 for rendering in the various manners described herein.

The following describes various example embodiments for transforming and rendering raw sonar data in different contexts, which may be performed by the sonar systems 200 and 300, through the configuration of the sonar map modules 130 and 320, respectively. It is understood that the sonar systems 200 and 300 are merely examples of computing systems that may be configured to perform the various functionalities. For example, computing systems that are not configured for mounting to a watercraft and do not have interfaces to sonar transducer elements may be configured to perform at least some of the functionality described herein. Additionally, it will be apparent to one of skill in the art that the following described functionalities may be performed together in a unified manner or as separate, independent functions where appropriate.

Figure 4:
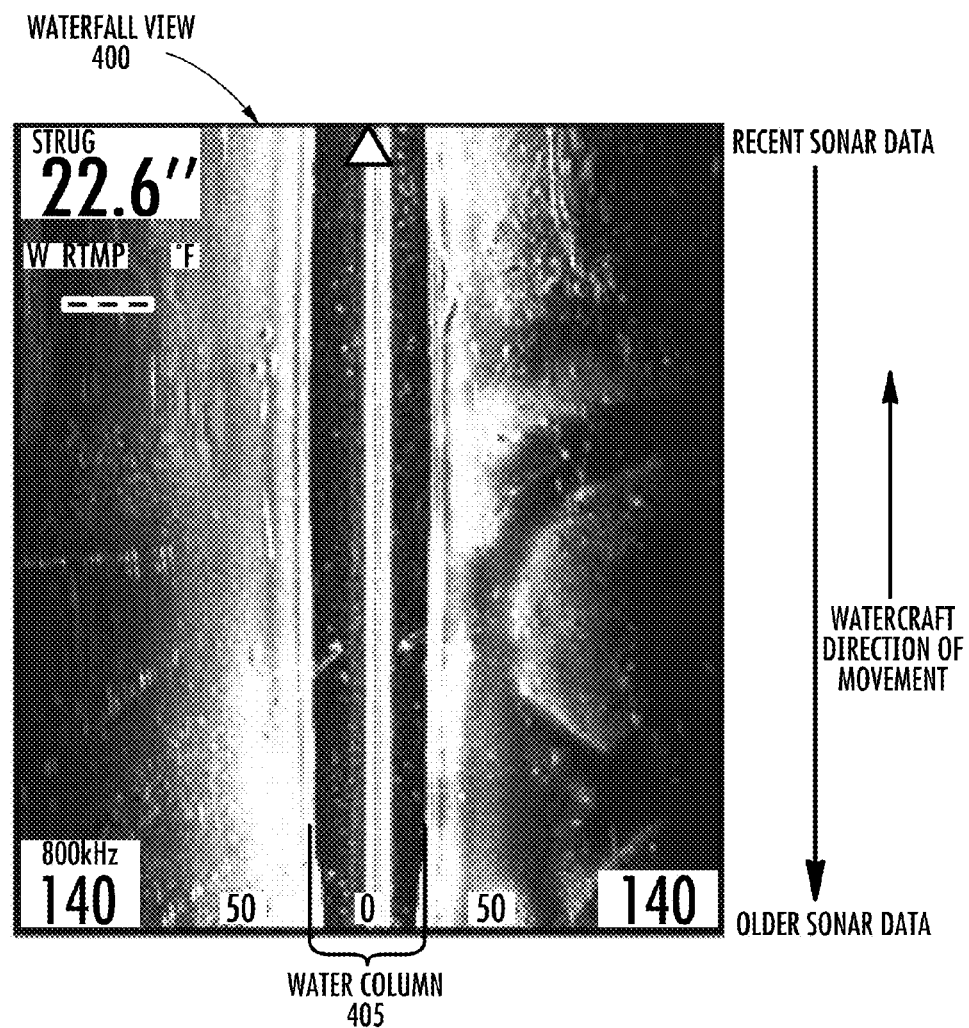
FIG. 4 is a waterfall view image generated by a sidescan sonar system according to some example embodiments.

FIG. 4 illustrates a waterfall view image of sonar data according to some example embodiments that may be rendered on a display, such as display device 125. The waterfall view 400 illustrates the rending of sonar image data derived from raw sonar data provided by port and starboard sidescan transducers over a period of time as the watercraft travels. The right half of the waterfall view 400 is a representation of the raw sonar data generated by the starboard sidescan transducer and the left half of the waterfall view 400 is a representation of the raw sonar data generated by the port sidescan transducer as a watercraft moves through a body of water. The image is referred to as a waterfall view because new sonar data is rendered across the top of the view as old sonar data falls off the bottom of the view. As such, movement of the watercraft is from the bottom to top of the image presentation and the image ratchets downward with the rendering of each scan performed by the transducers.

To generate the waterfall view 400 and the data used to render the waterfall view 400, one or more data conversions may take place. A transducer element may collect raw sonar data which may be transferred to processing circuitry (e.g., a sonar coprocessor). The processing circuitry may be configured to convert the raw sonar data into an intermediate form, referred to as range cells or range cell data. According to some example embodiments, the conversion to range cell data is not a conversion to color palette pixel values. Rather, the range cell data maintains a relative native format that permits subsequent changes in contrast that would not be capable if a conversion to color palette pixel values were performed at this point. According to some example embodiments, each range cell may be a single of byte of data.

According to various example embodiments, a range cell may be a form of the sonar data that indicates an amplitude of an echo return at a particular depth (or distance from the transducer). In this regard, the range cell data may include an indication of the amplitude of the echo returns at particular timings for the echo returns. For example, if a sonar column is broken up into individual elements (e.g., echo returns), each element may define a respective range cell. The range of values that a range cell may be assigned can be implementation dependent. For example, a range for range cell values may be 0 to 7, 0 to 255, or the like. If a range of 0 to 255 is used, a value of 0 may represent no return of echo data, while a value of 255 may represent the strongest return of echo data.

When rendering the sonar data, the range cell values may be converted into pixel values. For example, the pixels may be formatted in a 32-bit ARGB (Alpha, Red, Green, Blue) pixel format, where each segment of the pixel may be 8 bits. For explanation purposes, consider the alpha portion of each pixel to be 255, indicating no transparency. Based on an example range cell that has a value of 142 on a 0 to 255 range, a pixel in a first color palette may be derived that has a value of (255, 0, 83, 189) (i.e., mostly blue with a little green). If an alternative color palette is used, that same range cell value of 142 may be used to derive a pixel having a value of (255, 137, 115, 63), which is brownish in appearance.

The use of the range cell value allows different color palettes to be implemented, where changes in contrast do not affect the information provided in the resultant pixel values. If, on the other hand, a pixel value-to-pixel value direct conversion between color palettes is performed, the contrast setting may have an impact on the conversion. To perform a pixel value-to-pixel value direct conversion, a conversion table associating each pixel value in a first color palette to each pixel value in a second color palette may be used. For example, a blue color palette pixel value of (255, 0, 83, 189) may be converted to (255, 137, 115, 63) when the brown palette is selected based on the entries in a table. As such, in some example embodiments, conversion tables for converting between each of the palettes may be generated. In contrast, the use of range cell values to derive pixel values can avoid the need to generate and store these conversion tables.

Further, the use of range cell values can avoid issues that can arise from dependence on a contrast setting. For example, consider a worst case scenario where the contrast is set to an undesirable setting. The contrast setting may cause the pixel value to be all white—(255, 255, 255, 255). Accordingly, if pixel values are stored, for example to a Saved Mode data structure, after a contrast setting effects the pixel values, information that could be derived from the range cell values may be lost. Therefore, storing and using the range cell values, can avoid this loss of information introduced by the contrast setting.

A collection of range cells captured during a scan may be referred to as a sonar column. Additionally, a sonar column may include range cell data derived from scans taken by multiple transducers (e.g., two sidescan transducers). According to some example embodiments, each sonar column of range cell data may be processed to generate sonar image data (e.g., plotted color palette pixel values), which may be rendered as a visual representation of the sonar column on a display. When applied in the waterfall view, image data representative of a sonar column may be added to the top of the view as a row. To convert the range cell data to image data and render the representation of the sonar column, values in the range cell data may be converted to color palette pixel values, and each of the pixel values may be rendered on a display panel. The newest representation of a sonar column may be rendered at the top of the waterfall view 400 (i.e., rendered horizontally despite being referred to as columns), and existing historical data may be moved downward or off the view.

Figure 5:
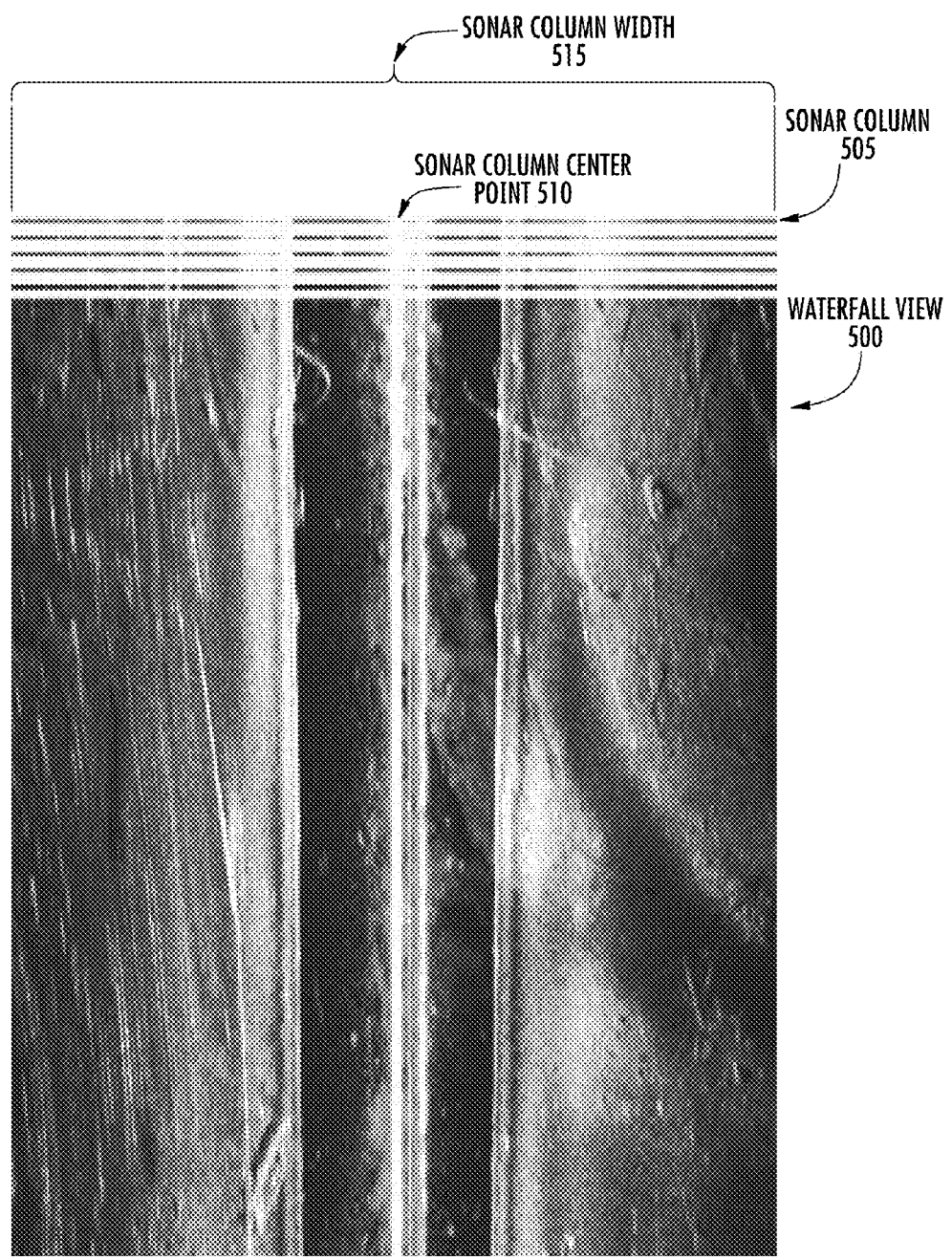
FIG. 5 is an illustration of separated sonar columns of a waterfall view image generated by a sidescan sonar system according to some example embodiments.

Each sonar column may be associated with a scan or beam emission performed by the transducer or a transducer array at a particular time. Based on a scan rate that may be controlled by processing circuitry of a sonar system, new sonar columns may be generated and prepared for rendering. Each sonar column may also be associated, by the processing circuitry, to a geo-location at the sonar column's center point. The geo-location of the sonar column may be determined based on the location of the watercraft at the time when the sonar column data was captured as indicated by the position sensing circuitry. The sonar column may also be time-stamped or given a sequence number that may be used to determine the ordering of the sonar columns. Similarly, the range cell data may be plotted and time-stamped. FIG. 5 depicts a waterfall view 500 with a number of separated renderings of sonar columns for illustration purposes, including a rendering of sonar column 505 with a center point 510. Each sonar column may also be characterized by a width 515, which may be derived from the outer boundary of the beam pattern of the transducers. According to some example embodiments, the width of the sonar column may be determined based on the center point and the direction of movement. As can be seen in FIG. 5, with each new scan performed by the transducers, a new rendering of a sonar column may be added and an oldest column may be removed from the view.

Referring back to FIG. 4, the waterfall view 400 also depicts a water column 405. The water column may be representative of a distance to the seafloor or bottom of a body of water. However, since sidescan transducers are not necessarily aimed directly downward, but rather at an acute angle, the distances in the waterfall view may not be accurate. Therefore, to determine an accurate distance to the seafloor based on sidescan data, some correction may be needed. Since few, if any, echoes should return before the sonar beam reaches the seafloor, regardless of how the transducer is aimed, a region having a substantial absence of echoes may be formed. In the waterfall view of FIG. 4, darker pixels are indicative of fewer echo returns, and therefore this region before the beam reaches the seafloor is dark due to the relative absence of echo returns. The water column 405 includes respective regions for each side scan transducer. Since this portion of the rendering depicts the water between the transducer and the seafloor, it does not provide information about the seafloor itself and therefore this region may not useful for geo-mapping purposes. Further, the presence of the water column introduces a vertical component to the two-dimensional rending of the sonar data, which can have an impact when rendering the sonar data on a geographic map.

Additionally, the only constant reference in the rendering of the waterfall view 400 is the location of the watercraft (or rather the location of the transducers). In other words, the rendering in the waterfall view itself is not geo-referenced, and therefore the waterfall view rendering could not be directly placed on a map. Since the watercraft is the only reference, movement of the watercraft is not apparent from the waterfall view. The direction and the speed of the watercraft (other than in a forward direction) are not considered when rendering the waterfall view. Regardless of whether the watercraft is headed on a straight bearing or the watercraft is turning in circles, both would appear on the waterfall view as movement in a straight line from the bottom of the view to the top of the view.

Figure 6:
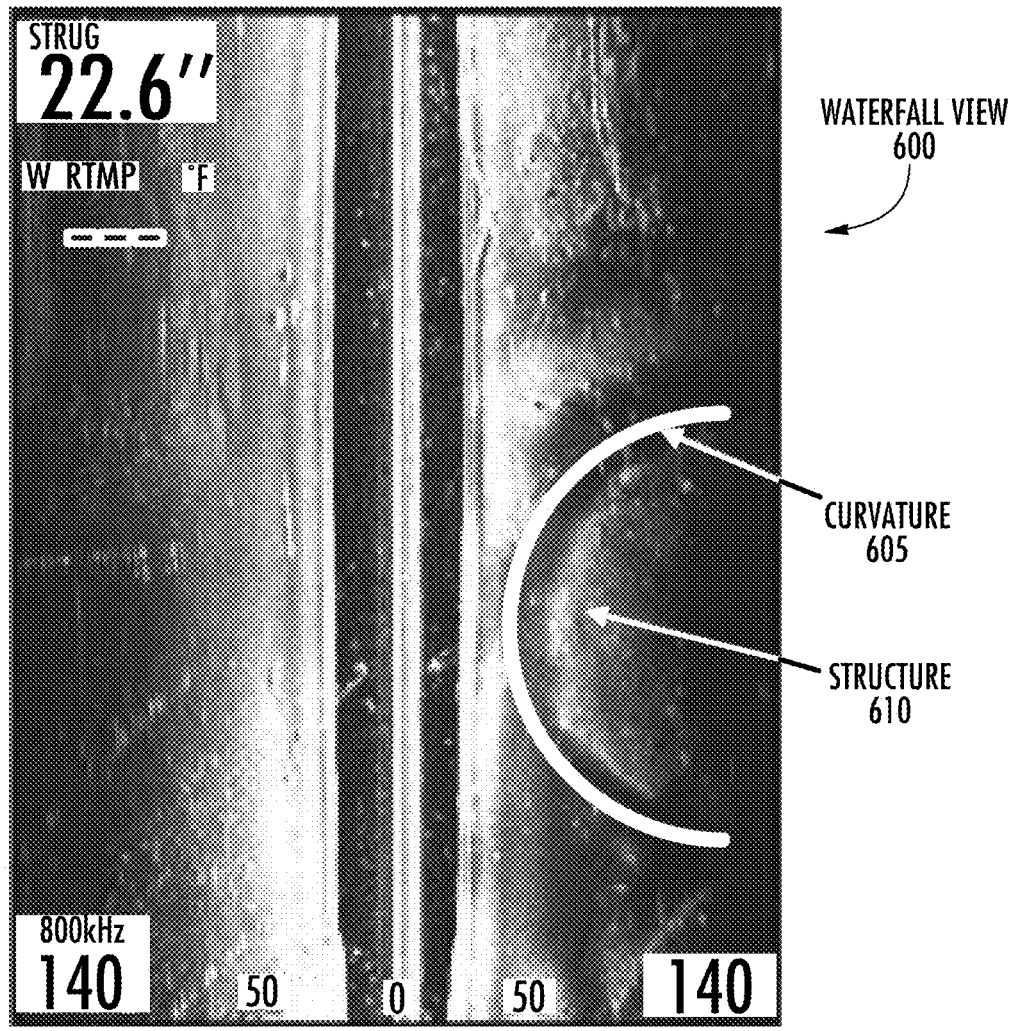
FIG. 6 is a waterfall view image generated by a sidescan sonar system during a watercraft turn according to some example embodiments.

This aspect of the waterfall view is illustrated in the waterfall view 600 of FIG. 6. Although it is not intuitive from the image in the water fall view 600, the watercraft was in a turn when the sonar data represented in the image was collected. However, it can be seen in waterfall view 600 how a structure on the seafloor may be distorted during a turn. The structure 610 may actually be a linear shallowing of the seafloor. However, in the waterfall view 600, the structure 610 appears to a have a curvature 605. This curvature can be the result of the watercraft turning and thereby distorting the image of the seafloor, relative to, for example, a geo-coordinate system. Accordingly, these aspects of the waterfall view representation of the sonar data may be compensated for prior to rendering the same sonar data on a map, where the reference is geo-coordinate-based.

According to some example embodiments, a Live Mode rendering of the sonar data on a map may be implemented. In the Live Mode, the sonar data is presented on a map, as the data is being captured and processed, and is therefore provided as a sonar image trail. The Live Mode may render the sonar data to the user in real-time or near real-time (in consideration of processing delays). Another implementation mode may be Saved Mode. In Saved Mode, the range cell data is saved in a memory device and is converted into a modified format to facilitate rendering. Live Mode and Saved mode may be implemented in isolation from the other, or together at the same time.

In order to implement a Live Mode rendering, the range cell data of each sonar column may be separately considered, or, in some example embodiments each range cell may be considered separately. In this regard, each sonar column of range cells may be associated with positioning data indicative of a center point of the sonar column, and the sonar column may be plotted (i.e., associated with a location) at a geo-location associated with the center point, and thereby the range cell data of the sonar column can be plotted and rotated. According to some example embodiments, plotted and rotated range cell data may be referred to as adjusted range cell data. Based on the direction of movement of the watercraft, for example derived from historical positioning data, the sonar column and the range cell data may also be translated. To translate the range cell data of a sonar column in this manner, the aimed direction of the sonar beams for each transducer relative to the keel of the watercraft may be used. For example, where the range cells of the sonar column are side scan data that was generated by at a ninety-degree angle to the forward movement of the watercraft (to the keel), the sonar column may be oriented with a center point at the boat position when the sonar column was generated by a fan-shaped beam directed, and rotated to be perpendicular to the direction of movement at that time. As such, if the watercraft is in a turn, each sonar column may fan out through the turn. Accordingly, since the data of the sonar column is now plotted and rotated with respect to a geo-location and the direction of movement, each range cell in the sonar column can be associated with a given geo-location based on the range cell's offset from the center point of the sonar column. Accordingly, pixel data that is derived from the range cells can also be geo-located and rendered accordingly.

Figure 7A:
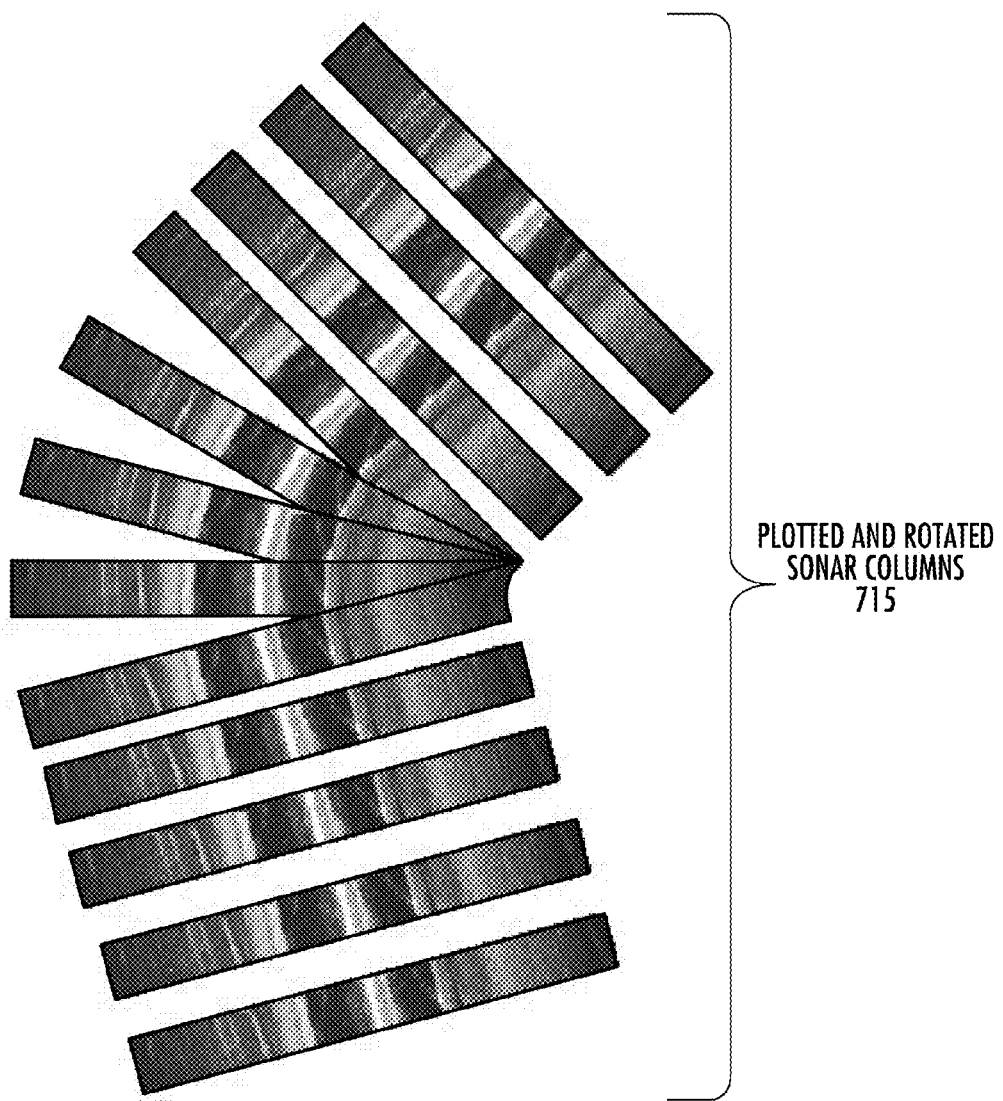
FIG. 7a illustrates a series of water columns of range cell data that have been plotted and rotated according to some example embodiments.

FIG. 7a illustrates sonar columns 715 of range cell data that have been plotted and rotated. Plotting may refer to the placement of the sonar columns and the associated range cell data at relative positions or geographic positions. The spacing between the sonar columns may account for or reflect the scan rate of the transducers and the speed of the watercraft. In this regard, at a fixed scan rate, a watercraft moving at high speed will collect fewer sonar columns per geographic unit area. As such, according to some example embodiments, the scan rate of the transducers may be dynamically controlled based on the speed of the watercraft to increase the number of scans per unit of time. For illustration purposes, the adjusted range cell data illustrated in FIG. 7a has also been converted to sonar image data, which may be rendered. A conversion to sonar image data can involve assigning a color palette value to each pixel described by the range cell data to facilitate rendering of the data.

It can also be seen in FIG. 7a that as the watercraft turned, the sonar columns are rotated. As can be seen, when the watercraft is in a turn, sonar data in the inside of the turn may be overlapping, while sonar data on the outside of the turn may be spread apart. To correct the image, processing circuitry may be configured to allow the data inside the turn to simply overlap. Further, the processing circuitry may also be configured to fan out or spread the data on the outside of the turn, for example based on the determined radius of the turn, to give the appearance of a continuous data capture. Also, the sonar columns that are captured when the watercraft is moving in a straight line may also be stretched relative to the direction of movement of the watercraft to give the appearance of a continuous data capture.

While FIG. 7a illustrates the plotting and rotating of the rendered sonar columns relative to each other, the modified sonar columns or the pixel data derived from the range cells of the sonar columns may also be scaled and oriented to a map. In this regard, when rendering a representation of the adjusted range cell data on a map, the zoom level of the presentation of the map may be considered and the range cell data of the sonar columns may be accordingly scaled. To do so with respect to the data of the sonar column as a whole, the width of the sonar column, for example as derived from the reach or lateral range of the beam pattern, may be considered and scaled. Accordingly the sonar column may be scaled to match the scaling of the map for the current zoom level. Rather than scaling the sonar column as a whole, the range cell data may be scaled individually for each range cell. The range cell data of the sonar column may also be oriented relative to the orientation and coordinate system of the map. For example, an orientation offset for the map be determined. The offset may indicate a deviation from a reference (e.g., due north) being directed towards, for example, the top of the view, and the adjusted range cell data may be oriented based on this offset.

As mentioned above, the sonar columns captured during the turn may overlap in the interior portion of the turn. According to some example embodiments, the most recently captured information for a given location may be used for rendering. In other words, at a particular location where an overlap of sonar data has been captured, the most recently captured range cell data for that location may be used when rendering an indication of the sonar data.

As an alternative, rather than using the most recently captured range cell data for a given location when overlapping data has been captured, according to some example embodiments, the range cell data from various sonar columns may be merged by rendering the peak value for the each of the range cells captured at a given location. For example, if a first sonar column includes a range cell at a given location with a value of 146 and a second sonar column includes a range cell data at the same location with a value of 65, a pixel derived from the 146 value may be used for rendering, regardless of the order in which the sonar columns were captured. This technique of using the peak value range cell for rendering at a given location can be used in both Live Mode and Saved Mode, as described herein. Further, the technique may be used anytime data is overlapped, such as for example, when the same geographic area is captured during multiple passes. In this regard, overlapping of data need not occur only during a turn. Overlap may occur when surveying passes are being performed in a particular area and some areas are captured twice. As further described below, in Saved Mode multiple files of sonar data may be rendered simultaneously. These files may have been captured at substantially different times (e.g., weeks, months, or years apart), but may nonetheless have overlapping data at particular locations. These files may nonetheless be rendered together, and the peak value range cell for a given location may be determined from amongst a plurality of files to determine which range cell value to render at a given location. Further, when compiling overlapping data into a single data structure, the peak value range cell for a given location may be stored, while others for that same location are not stored or are discarded. According to some example embodiments, additional or alternative criteria may be considered when determining which range cell value to render and/or store. For example, according to some example embodiments, criteria such as the degree of turning by a vessel when the range cell value was captured (e.g., favoring range cell values that were captured when the vessel was traveling in mostly a straight line (low turn degree) and disfavoring range cells that were captured when the vessel was in a tight turn (high turn degree)). Additionally, or alternatively, range cell values near the extents of the sonar column (furthest from the transducer) may be favored over range cell values that were captured at closer distances to the transducer.

Figure 7B:
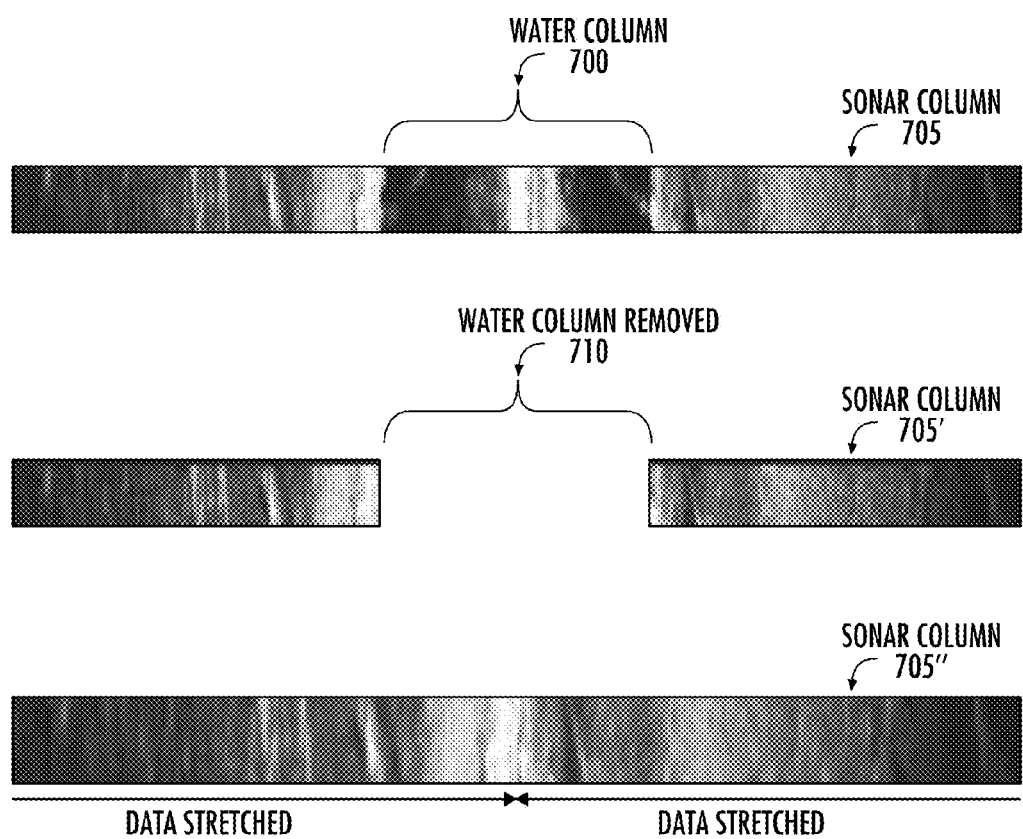
FIG. 7b illustrates a series of operations for removing a water column from a sonar column according to some example embodiments.

Additionally, FIG. 7b illustrates a process for removing the water column from the sonar column of range cells. Removal of the water column may be an option that, for example, may be user controlled. To remove the water column, the range cell data may be analyzed and the boundaries of the water column may be determined to identify the water column portion of the range cell data. As mentioned above, the water column portion of the range cell data may be a portion describing echo returns from a volume extending from the transducer element to the seafloor. In FIG. 7b, the water column 700 of sonar column 705 may be defined as the darker regions on either side of the center point. The remaining portions may be referred to as seafloor surface portions. A variety of techniques can be used to programmatically determine the boundary of the water column. For example, a threshold percentage increase in the number of echo returns moving outward from the transducer may be indicative of the water column boundary. Moreover, if more than a relative threshold number of echo returns at a given location are identified (e.g., a sudden increase in the number of returns as data is analyzed moving away from the transducer) a boundary of the water column may be defined. A boundary of the water column may also be determined via or take into account seafloor depth data that may be derived from depth soundings. In some example embodiments, the process of determining the boundary of the water column may also consider the range cell data of previously captured sonar columns, because abrupt changes in the boundaries of the water column can be uncommon. Upon determining the boundaries of the water column, the data associated with the water column may be omitted or removed at 710 in sonar column 705'. Subsequent to removal, the data on either side of the water column area may be stretched to meet at the center point of the sonar column as provided with respect to sonar column 705". According to some example embodiments, rather than being stretched, the data may be translated or moved together, to meet at the center point without further modification (e.g., stretching of the data).

Figure 8:
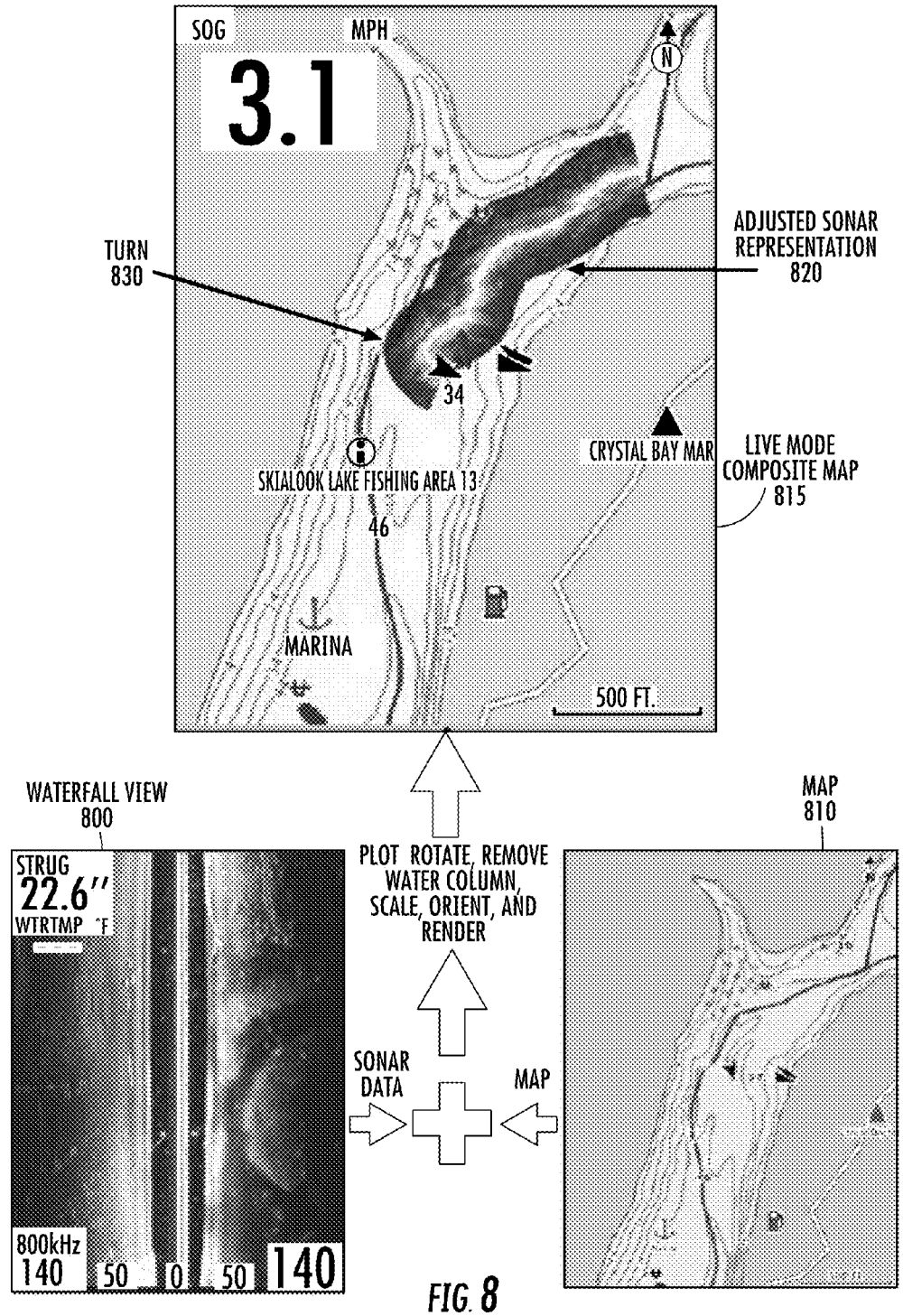
FIG. 8 illustrates operations for generating a Live Mode composite map according to some example embodiments.

FIG. 8 illustrates the process of rendering a Live Mode composite map 815 that includes a rendering of sonar image data that has been derived from adjusted range cell data with a presentation of a geographic map. Based on the data represented in the waterfall view 800 and the map 810, the Live Mode composite map 815 may be rendered with an adjusted sonar representation 820 of sonar image data overlaying the map, where, for example, the adjusted sonar representation 820 is semi-transparent so that information underlying the representation is still viewable by the user. In this regard, the sonar image data may be rendered as a layer of the composite map 815. According to some example embodiments, the rendering of the sonar image data as the adjusted sonar representation 820 may be one of a plurality of user-selectable layers that may overlie the presentation of the geographic map. In some example embodiments, the plurality of user-selectable layers may include a weather layer, a radar layer, or a depth sounding layer (described further below with respect to FIG. 10).

The sonar image data used to render the adjusted sonar representation 820 may be derived from the range cell data of the sonar columns and converted into color palette pixel values (similar to the coloring used in the waterfall view). According to some example embodiments, the sonar columns of range cell data may be rendered at a location on the geographic map that is associated with an area that the sonar beam of the transducer element captured to generate the associated raw sonar data. As indicated in FIG. 8, the process of plotting the data of the sonar column at a location, rotating the data of the sonar column relative to the direction of movement, removing the water column, scaling and orienting the data of the sonar column based on the characteristics of the map (e.g., zoom level and compass orientation) and rendering the image is described. It is also noteworthy to consider the turn 830, which is associated with the structure 610 of FIG. 6. Due to the rotation of the sonar columns, the structure 610 takes a more linear form rather the distorted curved form presented in FIG. 6.

As stated above, the Live Mode composite map may be updated as new sonar data is received and processed. Similar to the waterfall view, a memory buffer may be used that, when full, removes the oldest sonar column and adds the most recent sonar column. Accordingly, in some example embodiments, based on the size of the memory buffer, a fixed number of sonar columns may be rendered on a display once the buffer is full. When rendering, the oldest incremental set of sonar image data may therefore be removed from the buffer or rendering may be otherwise discontinued (e.g., due to overwriting of the data), upon rendering a new incremental set of sonar image data.

According to some example embodiments, to reduce the processing power needed to perform a rendering of the data of a sonar column, the geographic region covered by the data of the sonar column may be considered prior to processing. In this regard, if no portion of the region covered by the data of the sonar column is currently viewable in the display (e.g., that portion of the map is not visible), then the data of the sonar column need not be processed for rendering. Alternatively, if a portion (e.g., one or more range cells) of the sonar column would be present on the current display, then the data of the sonar column may be processed and rendered.

Via a user interface of the display device, a user may activate Live Mode. Once activated, the sonar columns may be rendered on the display as the data is received. According to some example embodiments, after activation of the Live mode, the sonar columns may be rendered based on a regular timer signal, or upon receipt of a given or threshold number of sonar columns that have yet to be rendered.

An alternative to presenting indications of the actual sonar data in the Live View composite map, may be to render extent trails. Since the rendering of the actual sonar data may be processing intensive, some applications may require only that the areas that have been scanned be indicated on the composite map.

Figure 9:
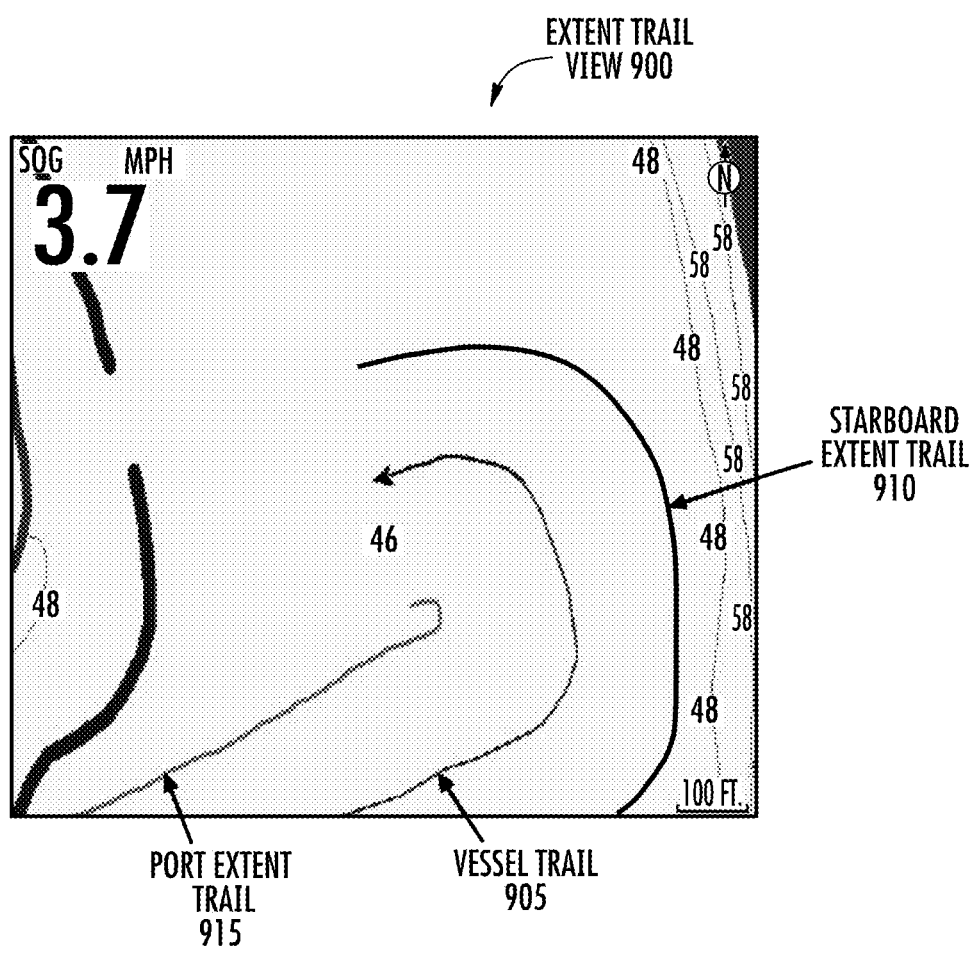
FIG. 9 illustrates an example extent trail composite map according to some example embodiments.

As described above, the data of a sonar column may have a determinable corresponding physical width. Based on this width, extent trails of the sonar beams can be rendered on a composite map to indicate the areas from which sonar data has been collected, without the need of actually rendering indications of the actual sonar data. FIG. 9 illustrates an example rendering of extent trails according to some example embodiments. In this regard, the extent trail view 900 includes a rendering indicating the vessel trail 905, the starboard side scan extent trail 910, and the port side scan extent trail 915. The vessel trail 905 may be determined based on the positioning data provided by position sensing circuitry, and, based on an association between the positioning data and the width of the sonar column, the starboard and port extent trails can be determined and rendered. In this regard, a horizontal extent of the sonar column of range cell data may be determined, for example using the positioning data. The display device may be configured to render a form of the sonar image data as these extent trails, where the extent trails 915 and 910 indicate the position of the horizontal extent of the sonar column. The extent trails may be parallel to the vessel's trail and may be located to align with the side scan sonar's geographic coverage width. The extent trails may be colored red and green to coincide with the common navigation light colors for port and starboard, respectively. According to some example embodiments, the extent trails may be an option to be toggled in a vessel view that shows where the vessel has previously been located. Further, the extent trails may be rendered without also presenting or rendering information representative of echo returns.

Extent trails functionality may be useful in a variety of applications including, for example, surveying applications. To create a high-quality survey, consecutive passes made by the watercraft should be aligned next to each other with little or no overlap of the side scan beam. With the use of extent trails, this type of surveying can be conducted since a rendering of the covered areas is provided on the display. Additionally, since Live Mode rendering can require substantial processing power, some sonar systems that lack the requisite processing power may use the extent trails functionality to indicate the areas where data has been acquired for subsequent use as part of the Saved Mode, which may be supported by sonar systems having lesser processing power. Further, the extent trails may be rendered for a longer period than a Live Mode rendering, since rendering of the extent trails does not require the memory capacity that a Live Mode rendering may require.

Figure 10:
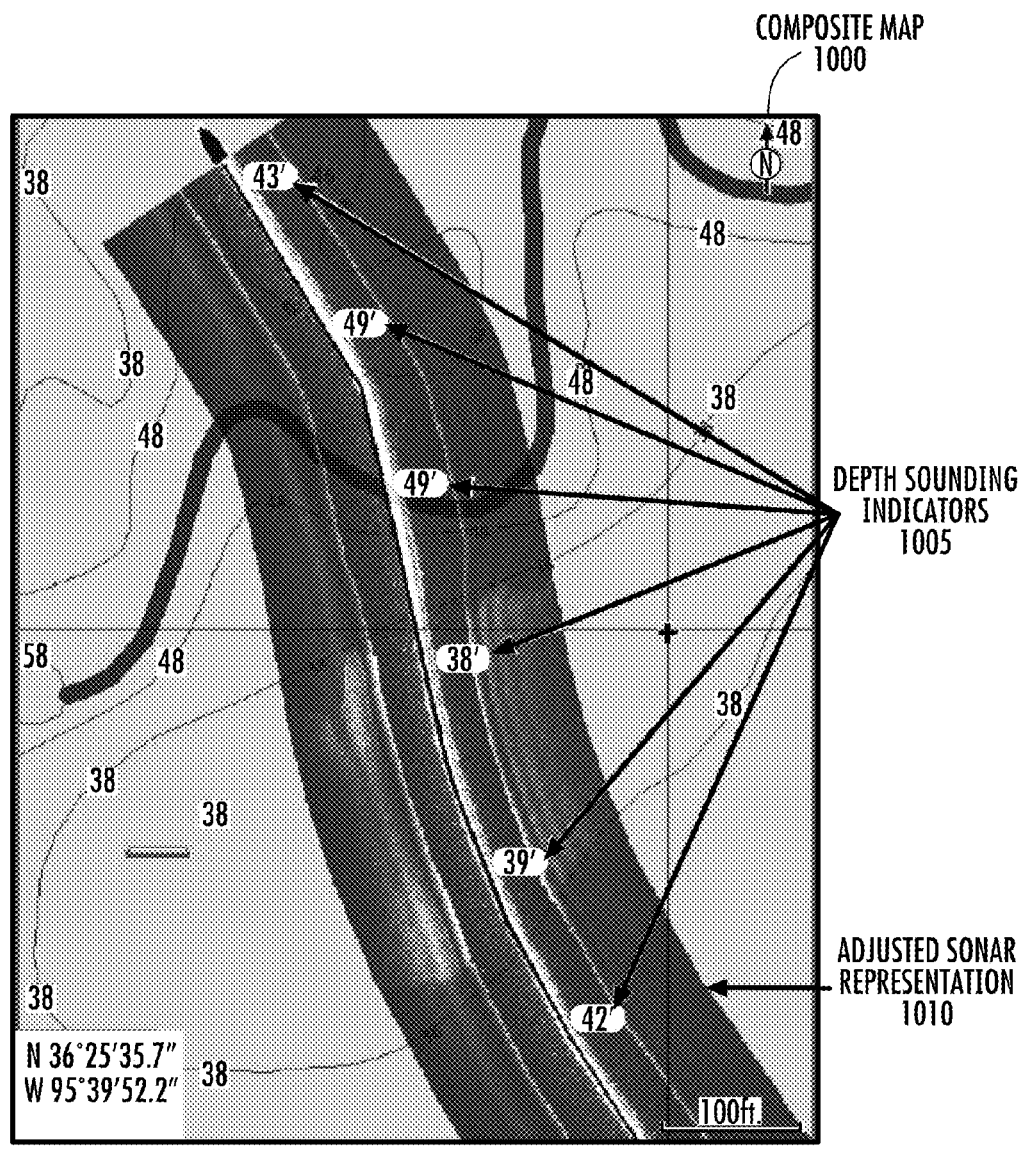
FIG. 10 illustrates an example composite map including depth sounding indicators according to some example embodiments.

Yet another optional feature that may be implemented in the Live Mode or in the Saved Mode (as described below) may be a composite map with depth sounding indicators. The composite map 1000 of FIG. 10 provides an example rendering of a Live Mode adjusted sonar representation 1010 with depth sounding indicators 1005. The depth sounding indicators may be added as a separate layer on the composite map. In this regard, as a watercraft moves through an area, the sonar system may be configured to take depth measurements using, for example, a downscan transducer element. The depth measurement may be associated with positioning data provided by the position sensing circuitry at the time that the depth measurement is taken to generate a geo-located depth measurement. The geo-located depth measurements may then be rendered as depth sounding indicators on a composite map with a Live Mode adjusted sonar representation as depicted in FIG. 10. As mentioned above, depth sounding indicators may also be rendered with data that is processed in accordance with the Saved Mode.

According to some example embodiments, a sonar system may be configured to implement a Saved Mode. In the Saved Mode, raw sonar data may be converted into sonar columns of range cell data, and the range cell data may be stored in a local memory device (e.g., memory device 120). The range cell data may be further transformed into a data structure comprising a collection of tile-based resolution layers that facilitate the rendering of sonar data either on a display of a sonar system installed in a watercraft or on an external display device that may not have an interface to transducers and other sonar hardware (e.g., a business or household computer system, a mobile computing device such as a smartphone or a tablet device, or the like).

In the Saved Mode, there may be no limitation on the amount of data that may be rendered. Unlike the Live Mode, implementation of the Saved Mode renders sonar data that was previously stored in a memory device. Accordingly, the Saved mode may be useful in surveying applications and the like.

Figure 11:
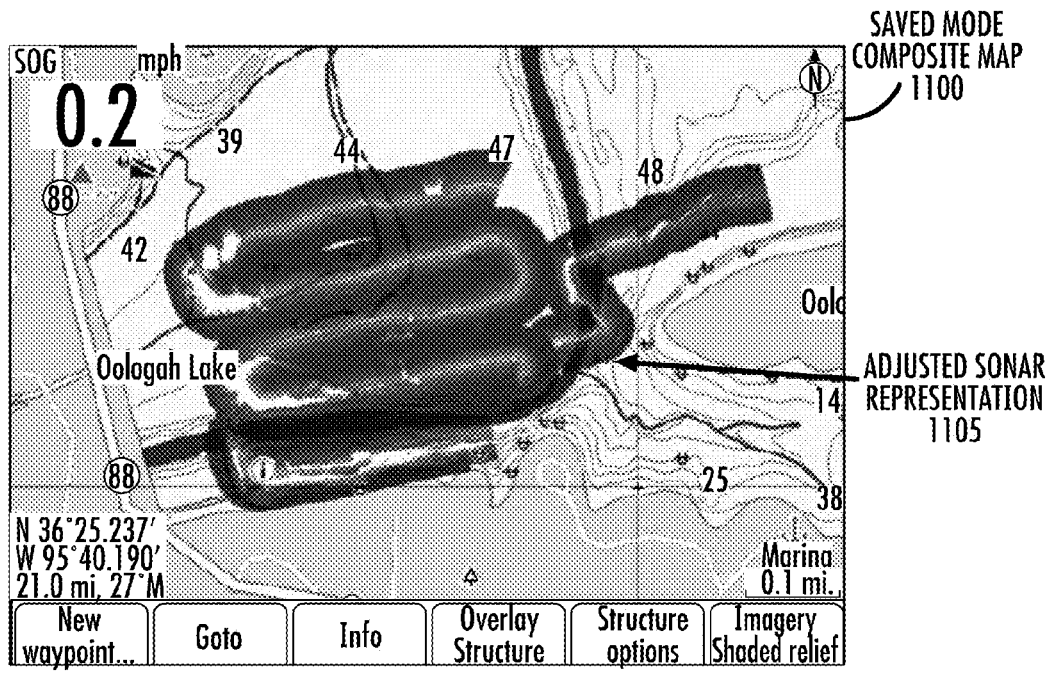
FIG. 11 illustrates an example Saved Mode composite map according to some example embodiments.

FIG. 11 illustrates an example rendering of sonar data in the Saved Mode. The Saved Mode composite map 1100 includes an adjusted sonar representation 1105 that appears similar to a rendering of sonar data in the Live Mode described above. In this regard, as further described below, the range cell data stored in a sonar log file may be plotted and rotated to begin the conversion process to render the sonar image data formatted in the Saved Mode. The sonar data rendered in the Saved Mode composite map 1100 may be derived from range cell data that has been organized into tile-based segments and rendered on a tile-by-tile basis.

As such, Saved Mode operation may involve the conversion of range cell data into an intermediate form, prior to a subsequent conversion to image data at rendering time. According to some example embodiments, range cell data is generated from the raw sonar data provided by the transducer element, and stored as a sonar log file (e.g., an .sl2 file) which may be stored in a memory device such as a data storage device. The sonar log files may be further converted, according to some example embodiments, into a data structure (e.g., a file) that facilitates rendering of the sonar data through the use of tile-based resolution layers. The data structure may be organized as a file and referred to as a StructureMap file or .smf file. The data structure may also be organized to support rendering on various mapping platforms, such as, for example, Google Earth. The data structure may be stored on a memory that is internal to a sonar system or a removable memory such as, for example, an SD card. When a rendering request is made, the data structure may be processed for rendering the sonar data overlaying a map.

Figure 12:
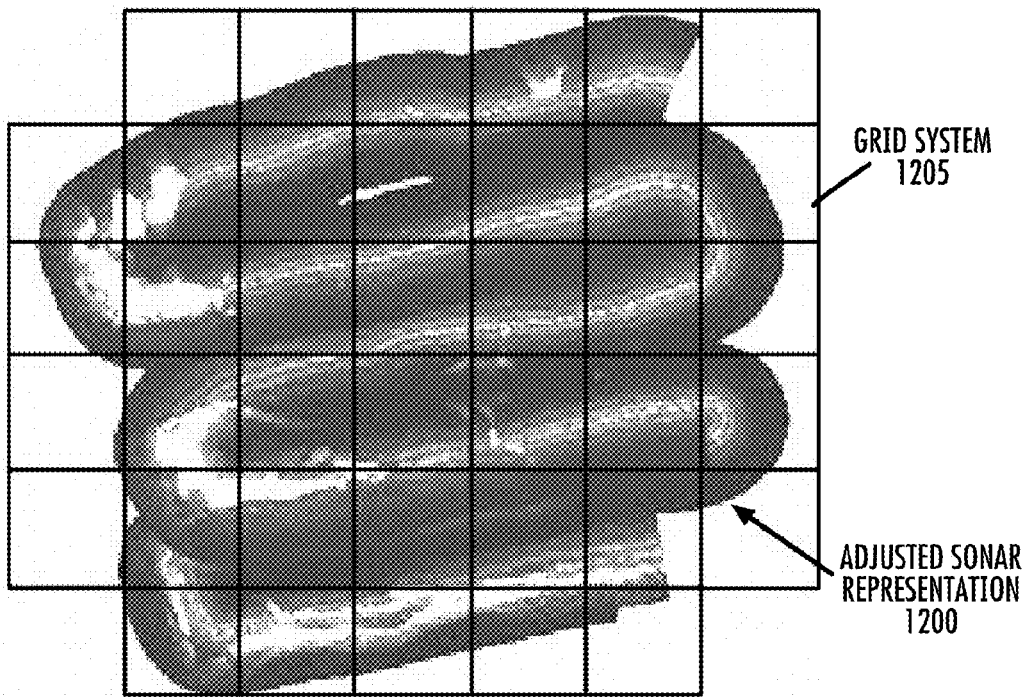
FIG. 12 illustrates an example grid system for sectionalizing range cell data into tiles according to some example embodiments.
Figure 13:
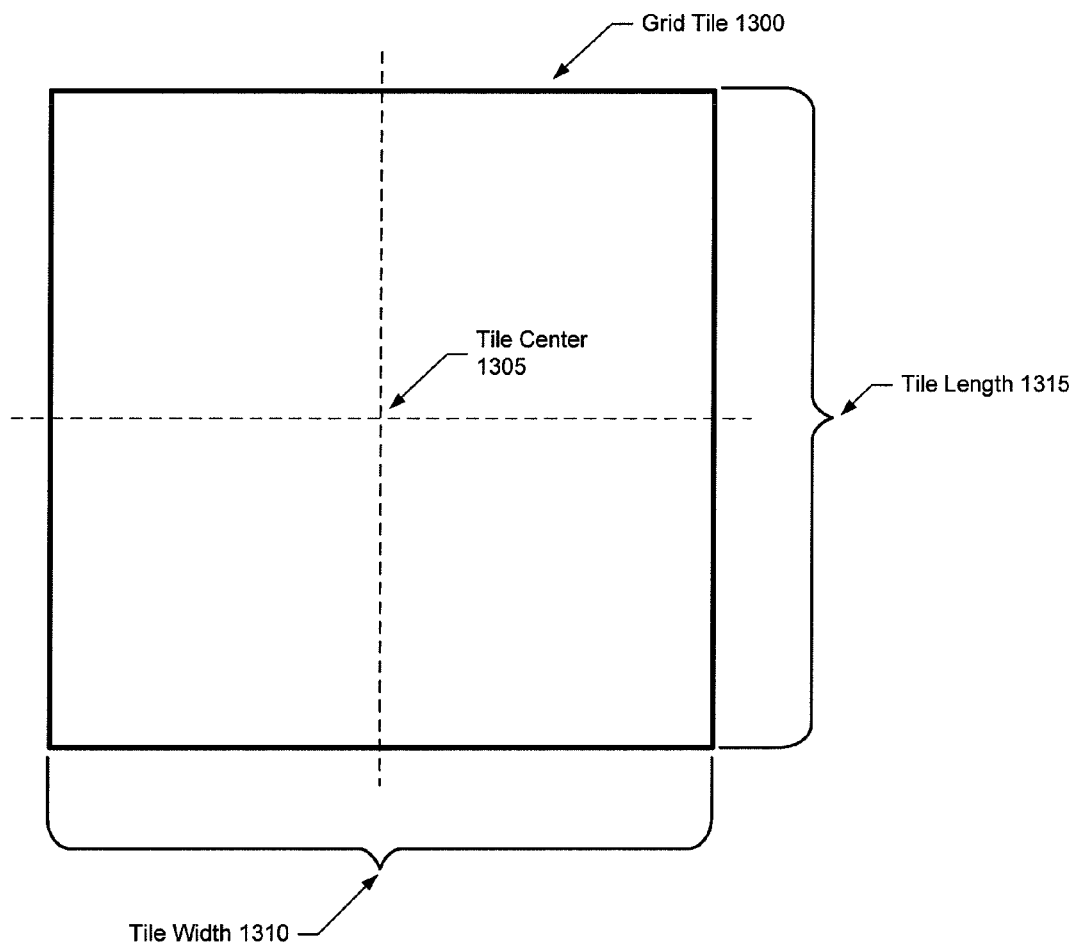
FIG. 13 illustrates an example tile and defining characteristics according to some example embodiments.

To generate the data structure, processing of the range cell data may be performed to plot and rotate the range cell data of a sonar column as described above with respect to the processing for the Live Mode. However, in the Saved Mode, further processing of the plotted and rotated (adjusted) range cell data may be performed. In this regard, the sonar columns included in a sonar log file may be considered in the aggregate, and a grid system may be applied to the range cell data. FIG. 12 illustrates the application of a grid system 1205 on an adjusted sonar representation 1200 of the range cell data in a sonar log file, for illustration purposes.

The range cell data located within each of the tiles may be grouped to the tile area. The tile areas may be defined in any number of ways, including, but not limited to, the tile definition provided in FIG. 13. Grid tile 1300 may be defined by a tile center, which may be described by geographic coordinates for the tile center 1305. The tile may be further defined by a tile length 1315 and a tile width 1310. Since a grid system may have square tiles, in some example embodiments, a tile width alone may be sufficient to describe the shape and boundaries (relative to the center point) of the tile. The size and shape of the tiles may be determined based on any type of criteria. According to some example embodiments, the tile shapes may be square or rectangular and the size of the tiles may depend on the quantity or resolution of the data within the tile.

As mentioned above, the actual data values stored in the tiles may be range cell data, and as such, the tiles and the data within the tiles are not yet interpreted as images. In other words, the data in the tiles need not be pixels with an applied color palette. The process to render the data of the data structure and the tiles may begin with a chart request or may occur automatically when new data structure is created. When the composite map is redrawn, an iteration over all the Saved Mode data structures may be performed to identify the data structures with geographic areas that intersect with the map. The data of the tiles inside the data structure may be given a palette and may be rotated and scaled to fit the chart view. The data of the tiles may then be drawn to the chart, with optional transparency.

Figure 14:
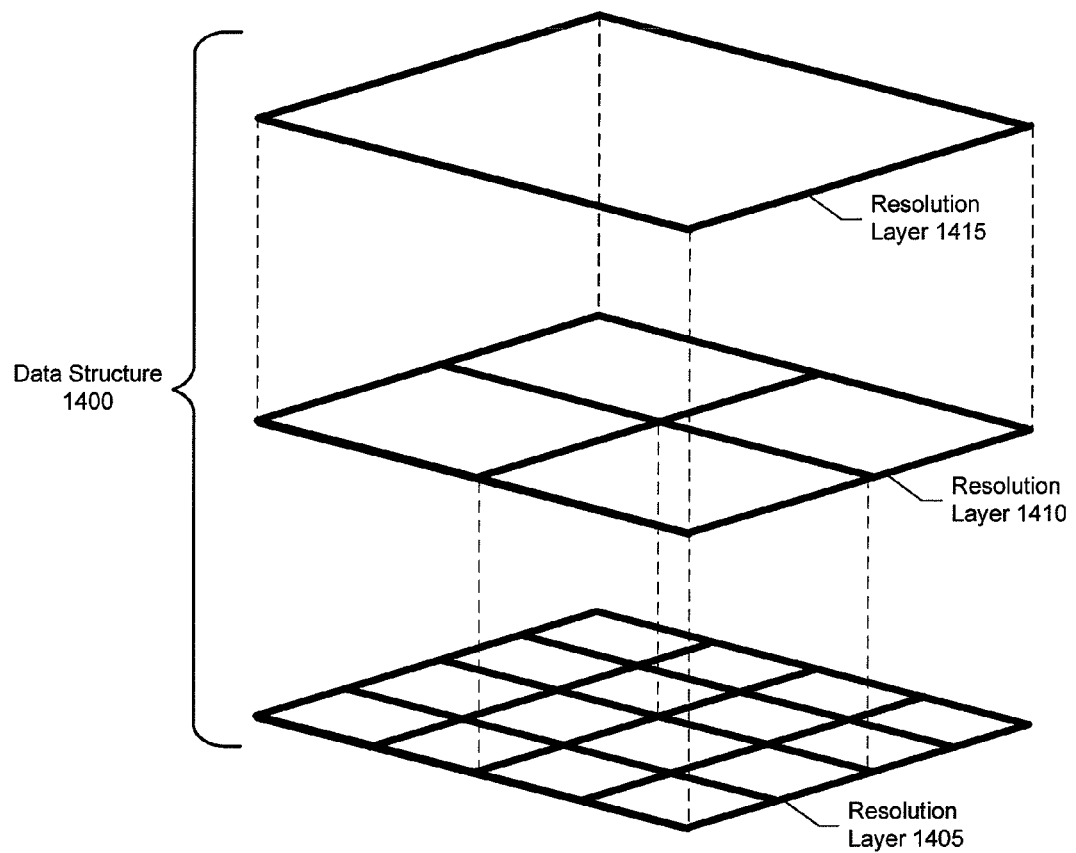
FIG. 14 illustrates an example data structure resolution layer arrangement according to some example embodiments.

According to various example embodiments, the composite map that is generated with the sonar data may be an interactive map that permits zooming and panning. In this regard, according to some example embodiments, a single top-most tile having the highest resolution may be used to render the interactive map. This is an example of an implementation with a single-resolution layer data structure that is rendered, regardless of the zoom level. However, in some example embodiments, multiple-resolution layers having differing resolutions can be generated and rendered, as needed, to increase the efficiency of user interactions with the map. To facilitate the ability to increase the efficiency of map interactions, the data structure generated for use in, for example, the Saved Mode, may include a collection of layers of range cell data that are formatted for different resolutions. In this regard, according to some example embodiments, the resolution layers may be constructed such that the resolution layers differ by half-resolution increments. FIG. 14 illustrates an example data structure 1400 with three resolution layers. Resolution layer 1405 may have the highest resolution, and therefore have the largest number of tiles. The range cell data included in the tiles of resolution layer 1405 may be modified to reduce the resolution of the data by one-half, and this lower resolution data may be grouped into the tiles of resolution layer 1410. In turn, range cell data included in the tiles of resolution layer 1410 may be modified to reduce the resolution of the data by one-half, and this lower resolution data may be grouped into the single tile of resolution layer 1415. By constructing the data structure in this manner, different layers of data may be rendered as a user transitions though zoom levels on a composite map. A data structure may therefore be constructed where groups of adjusted range cell data (i.e., plotted and rotated) are stored in tiles having a particular resolution. Further, a node tree architecture for the data structure can be generated based on the number of tiles for each resolution layer and the geographic boundaries that are shared between the tiles of each layer.

Various file formats may be used for compiling the data structure. In some example embodiments, the data structure may take the form of a file (e.g., a .smf file) that includes fields and packets. In this regard, the file may include a file header. The file header may comprise a field that identifies the file type (e.g., identifies the file as a .smf file) and thereby indicates the formatting of the file. Further, the file header may include a version field indicating a version number for the file for compatibility determinations.

The file may also include any number of data packets with each packet having a header. In this regard, each packet may begin with a common header that specifies a packet type. Upon reading the packet type, a decision may be made as to whether the remainder of the packet should be considered based upon the operation currently being performed. The size of the packet, which need not include the size of the common header, may also be provided in the common packet header. Indicating the size of the packet may allow a read operation to be aware of the end of the packet based on the packet's size. Example packet types in the file may include an overall log information type, a tile type, a spot soundings type, or a table node type.

A file may include a single overall log information packet that may be the first packet in the file. The overall log information packet may follow the file header. If the overall log information packet is not encountered at the correction location, an error indication may be issued or subsequent behavior may be undefined.

The overall log information packet may include information about the characteristics of the sonar log file. In this regard, the overall log information packet may include fields for indicating center coordinates for the sonar data in the log file, a length and width of the grid that encompasses the sonar data in the log file, and the size (e.g., width, or width and length) of the tiles indicating the number of cells in a tile. The overall log information packet may also include an indicator of the highest resolution layer, and the number of resolution layers. The overall log information packet may also include a byte offset value for use in determining where a tile tree table can be located in the file.

The file may also include one or more tile packets. The payload of the tile packets may be the tile data (e.g., the range cell data for the tile). The payload may be compressed using various techniques. The tile packet may also include a field indicating a tile identifier, coordinates for the tile center, an indication of the size of the data in the tile, and a resolution value for the tile.

The file may further include spot sounding packets. Each spot sounding packet may include an indication of a number of soundings in the packet. For each sounding, the packet may include coordinates indicating the location of the sounding and a depth value.

Additionally, the file may include table node packets. A first table node packet may be a master node that represents the lowest resolution layer, which may be a single tile layer that includes data from the entire log file. If there are children nodes from a table node packet, then those nodes may be read thereafter to determine the architecture of the table. As such, the table node packets may include various fields such as a tile center indicating the coordinates of the center, a tile width (and length), a resolution value, a file offset of the tile indicating the start of the common header, and the number of children table node packets.

Having generally described the process of converting the range cell data into a data structure, such as the file structure described above, FIG. 15 illustrates a flowchart of example operations that may be performed to implement the data conversion in the Saved Mode. At 1500, a calculation or determination of the overall geographic area of the sonar log file may be performed. In this regard, the range cell data in the sonar log file may already be plotted and rotated, and as such the data may be referred to as adjusted range cell data. Subsequently, at 1510, a number of tiles for the remaining resolution layer having the highest resolution may be determined and that layer may be the current resolution layer considered for analysis. In this regard, during a first iteration the highest resolution layer may be considered and a grid system may be applied to sectionalize the data in the sonar log file. For example, a grid system having eight tiles may be applied. Further, for example, if the number of tiles on each side of the grid system are not already a power of 2 (e.g., 16, 8, 4, 2, 1), the number of tiles may be rounded up so that each side of the grid system has a number of tiles that is a power of two. Subsequently, different grid systems may be applied to range cell data having different resolutions, and application of the grids systems may be based on the geographic area that is being considered.

At 1520, each tile in the current resolution layer may be processed. Processing of the tiles may include attempting to render the range cell data in the sonar log file. If the attempt to render the range cell data in the cell is successful, then the data may be saved in association with the tile. In this regard, the groups of range cell data may be separately stored based on the boundaries of the tiles. The characteristics of the tile may be stored for consideration when building a table node tree. A tile header may be saved with the data for the cell. If no data is present in the cell, no further operations with respect to that tile need to be performed.

At 1530, a determination may be made as to whether the current resolution layer includes data in more than one tile. If so, then the resolution of the range cell data for the current layer may be reduced by one half at 1540, and a new resolution layer may be considered. In this regard, for example, when a determination of the number of tiles for the new resolution layer is determined at 1510, the number of tiles on each side of the grid for the new resolution layer would be reduced by one-half of the number of tiles on the respective sides of the previous resolution layer.

This process may be repeated until the current resolution layer includes only one tile. When the single tile resolution layer is considered, then processing of the sonar log file is complete and the node table indicating the relationships between the tiles may be constructed and saved at 1550. Subsequently, the process may end at 1560.

Rendering the sonar image data of Saved Mode data structure may be performed in various ways. For example, sonar image data may be rendered with the presentation of a geographic map where the sonar image data is the derived from range cell data of a tile associated with one of the plurality of resolution layers of a data structure. Further, based on a resolution of the presentation of the geographic map, one of the plurality of resolution layers may be selected for rendering. The node tree indicative of an architecture of the resolution layers and tiles of the data structure may also be used in the selection of a resolution layer. According to some example embodiments, the adjusted range cell data with a tile to be rendered may be scaled and oriented based on an orientation and zoom level of the presentation of the geographic map. A color palette may also be applied to the range cell data of tile to be rendered. The coloring of the range cell data may impart information indicating a density of echo returns at a location of the range cell data of the given tile.

FIG. 16 is a flow chart describing an example process for rendering the data stored in a data structure for the Saved Mode. The example process may begin by parsing the data structure and loading the data in the data structure or file at 1600. To do so, according to some example embodiments, the file header may be read and a version compatibility check may be performed. Further, a common header and a log file information packet may be read. Via the offset in the log file information packet, reading of the table nodes may be performed to determine the architecture of the data structure. In instances where the offset value is zero or movement within the data structure based on the offset fails, the data structure may be moved through in sequence until the first tile table node is found. Regardless of how the tile table node is found, the first table node (i.e., the master table node) may be read, and subsequently any children nodes may be read, until all children nodes are read. Upon completion, the architecture of the data structure may be determined (e.g., how many resolution layers, how many tiles on each layer, etc.).

At 1610, a determination may be made as to whether the data meets specific criteria for rendering. In this regard, for example, an analysis of the geo-location of the data may be performed to determine if any of the data intersects with the currently requested map or a portion of the map presented on a display. Similarly, an analysis of the master node representative of the single tile resolution layer may be performed to determine if the boundaries of the master node intersect with the currently requested map or a portion of the map presented on a display. If the data fails one or more of the criteria, then the rendering process may be ended.

However, if the criteria are met, then a determination of which resolution layer to render may be made at 1620. In this regard, a resolution of the map may be determined and a resolution layer having a resolution that is greater than or equal to the resolution of the map may be used. In some instances, the resolution layer having the highest resolution may be used because no higher resolution layer may be available. When the proper resolution layer is determined, the data for a tile within the resolution layer may be loaded. To do so, the offset given by an associated child node may be used to retrieve the data. At the location indicated by the offset, a common header and a tile packet may be located. Additionally, other related packets may be found following the tile packet. For example, a spot sounding packet may follow. Further, in an instance where a tile that is being analyzed is not at the proper resolution, then an analysis of a child tile may be performed and an intersection of the tile with the map may be made as described at 1610 and the process may continue from that point with respect to each child tile. Further, this process may continue in a recursive manner.

After loading the data of the tile, palette colors may be applied to the range cell data in the tile at 1630. Further, the data may be scaled and oriented as appropriate for rendering on the map. At 1640, the representation of the sonar data may be rendered with the map as provided, for example, in FIG. 11.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
a transducer assembly configured to emit a sonar beam, receive return echoes of the sonar beam, and convert the return echoes into raw sonar data, wherein the transducer assembly is configured to be affixed to a watercraft;
position sensing circuitry configured to determine positioning data, the positioning data being indicative of a position of the watercraft;
processing circuitry configured to:
receive the raw sonar data and the positioning data,
convert the raw sonar data into range cell data based at least on amplitudes of the return echoes;
make a location-based association between the range cell data and the positioning data,
plot the range cell data based on respective positions derived from the positioning data and rotate the range cell data based on a direction of movement of the watercraft to generate adjusted range cell data, and
convert the adjusted range cell data into sonar image data; and
a display device configured to render at least a portion of a sonar image over a geographic map at a position and oriented in the direction of movement of the watercraft, wherein the sonar image is based on the sonar image data, wherein the position of the sonar image on the geographic map corresponds to the position of the watercraft associated with the sonar image data;
wherein, in an instance in which at least two sets of range cell data are associated with a same location, the display device is configured to render the portion of the sonar image at the same location corresponding to one of the at least two sets of range cell data, wherein each set of range cell data of the at least two sets of range cell data comprises an amplitude value at the same location, and wherein the amplitude value for the one of the at least two sets of range cell data that corresponds to the rendered portion of the sonar image is larger than any of the other amplitude values of the other sets of range cell data of the at least two sets of range cell data.

2. The apparatus of claim 1, wherein the transducer assembly includes a rectangular transducer configured to emit a fan-shaped sonar beam, and wherein the transducer assembly is further configured to be positioned on the watercraft to operate as a side scan sonar transducer assembly.

3. The apparatus of claim 1, wherein the display device is configured to render the sonar image as one of a plurality of selectable layers.

4. The apparatus of claim 1, wherein when the watercraft turns, the processing circuitry is configured to spread the range cell data on the outside of the turn.

5. The apparatus of claim 3, wherein the plurality of selectable layers includes a weather layer, a radar layer, or a depth sounding layer.

6. The apparatus of claim 1, wherein the display device is configured to render the sonar image as a semi-transparent layer.

7. The apparatus of claim 1, wherein the transducer assembly is configured to repeatedly emit the sonar beam at a scan rate to generate, and upon generation transmit to the processing circuitry, incremental sets of raw sonar data including a given incremental set of the raw sonar data;
wherein the processing circuitry is configured to, in response to receiving the given incremental set of raw sonar data, process the incremental set of raw sonar data to generate a sonar column of range cell data, and generate a given incremental set of sonar image data based on the sonar column of range cell data; and
wherein the display device is configured to, in response to the generation of the given incremental set of sonar image data, render the sonar image based on the given incremental set of sonar image data.

8. The apparatus of claim 7, wherein the processing circuitry is configured to scale the sonar column of range cell data based on a zoom level of the geographic map.

9. The apparatus of claim 7 wherein the processing circuitry is configured to orient the sonar column of range cell data relative to a coordinate system of the geographic map.

10. The apparatus of claim 7 wherein the display device is configured to render the sonar image at the position on the geographic map that is associated with an area that the transducer assembly captured the return echoes of the sonar beam.

11. The apparatus of claim 7, wherein the position sensing circuitry comprises a global positioning system (GPS) device and wherein the position sensing circuitry is configured to determine the positioning data of the watercraft as GPS coordinates; and wherein processing circuitry is configured to plot and rotate the sonar column of range cell data using the GPS coordinates.

12. The apparatus of claim 7, wherein the processing circuitry is configured to generate a respective sonar column of range cell data for each incremental set of raw sonar data; and wherein the display device is configured to render the sonar image based on the sonar columns of range cell data.

13. The apparatus of claim 7 wherein the processing circuitry is configured to discontinue rendering an oldest sonar image upon rendering the sonar image.

14. The apparatus of claim 7, wherein the transducer assembly includes a rectangular transducer element configured to emit a fan-shaped sonar beam and configured to be positioned on the watercraft to operate as a side scan sonar transducer assembly; and wherein the processing circuitry is configured to rotate the sonar column of range cell data based on the direction of movement of the watercraft such that the sonar image is rotated to extend in a direction that is substantially perpendicular to the direction of movement of the watercraft.

15. The apparatus of claim 7, wherein the processing circuitry is configured to determine a horizontal extent of the sonar column of range cell data, and wherein the display device configured to render a visual indicator of a position indicating the horizontal extent of the sonar column of range cell data.

16. The apparatus of claim 15, wherein the display device is configured to render the visual indicator without also presenting information representative of the echo returns.

17. The apparatus of claim 15 further comprising a data storage device and wherein the processing circuitry is configured to store the sonar column of range cell data in the data storage device.

18. The apparatus of claim 7, wherein the processing circuitry is configured to determine a horizontal extent of the sonar column of range cell data based on the positioning data generated by the position sensing circuitry.

19. The apparatus of claim 1, wherein the processing circuitry is configured to analyze the range cell data to identify a water column portion of the range cell data, wherein the water column portion of the range cell data is a portion of the range cell data describing the echo returns from the transducer assembly to the seafloor based on an angle of the sonar beam; and wherein the processing circuitry is configured to remove the range cell data in the water column portion.

20. The apparatus of claim 19, wherein the processing circuitry configured to analyze the range cell data to identify the water column portion includes being configured to identify the water column portion of the range cell data based on a quantity of echo returns in a given area exceeding a relative threshold.

21. The apparatus of claim 19, wherein the processing circuitry is configured to determine seafloor depth data, and wherein the processing circuitry configured to analyze the range cell data to identify the water column portion includes being configured to identify the water column portion of the range cell data based on the seafloor depth data.

22. The apparatus of claim 1, wherein the processing circuitry is configured to analyze the range cell data to identify a water column portion of the range cell data and a seafloor surface portion of the range cell data, wherein the water column portion of the range cell data is a portion of the range cell data describing the echo returns from a volume extending from the transducer assembly to the seafloor based on an angle of the sonar beam, and wherein the seafloor surface portion is a portion of the range cell data describing the echo returns that interact with the seafloor; and wherein the processing circuitry is further configured to remove the range cell data in the water column portion and expand the range cell data of the seafloor surface portion to maintain a width of the range cell data despite the omission of the water column portion.

23. The apparatus of claim 1 further comprising a memory device, and wherein the processing circuitry is configured to store the range cell data as a sonar log file in the memory device.

24. The apparatus of claim 23, wherein the processing circuitry configured to plot, and rotate the range cell data is configured to plot and rotate the range cell data in the sonar log file.

25. The apparatus of claim 24, wherein the processing circuitry configured to convert the adjusted range cell data includes being configured to:

determine a geographic area covered by the adjusted range cell data;

based on the geographic area, apply a first grid system to the adjusted range cell data to group the adjusted range cell data into one or more tiles; and separately store the groups of adjusted range cell data within respective tiles of the one or more tiles.

26. The apparatus of claim 25, wherein the processing circuitry configured to separately store the groups of adjusted range cell data within the respective tiles includes being configured to separately store the groups of adjusted range cell data at a first resolution within the respective tiles as one resolution layer of a data structure comprising a plurality of resolution layers.

27. The apparatus of claim 26, wherein the processing circuitry is configured to apply a second grid system to the adjusted range cell data at a second resolution.

28. The apparatus of claim 27, wherein the processing circuitry is configured to generate a node tree indicative of an architecture of the resolution layers and tiles of the data structure.

29. The apparatus of claim 26, wherein the sonar image data is the derived from range cell data of a tile associated with one of the plurality of resolution layers of the data structure.

30. The apparatus of claim 26, wherein the processing circuitry is configured to select one of the plurality of resolution layers based on a resolution of the geographic map.

31. The apparatus of claim 26, wherein the processing circuitry is configured to select one of the plurality of resolution layers based on a resolution of the presentation of the geographic map and a node tree indicative of an architecture of the resolution layers and tiles of the data structure.

32. The apparatus of claim 26, wherein the processing circuitry is configured to scale and orient the range cell data of a given tile based on an orientation and zoom level of the geographic map, and color the range cell data of the given tile by applying a color palette to the range cell data of the given tile; and wherein the sonar image data is derived from the range cell data of the given tile that has been oriented, scaled, and colored.

33. The apparatus of claim 12, wherein the processing circuitry configured to color the range cell data of the given tile includes being configured to color the range cell data of the given tile to impart information indicating a density of echo returns at a location of the range cell data of the given tile.

34. The apparatus of claim 25, wherein the processing circuitry configured to apply the first grid system to the adjusted range cell data to group the adjusted range cell data into tiles includes being configured to define each tile based on characteristics including a tile center point, and a tile width.

35. The apparatus of claim 1, wherein the processing circuitry is configured to receive depth sounding data and associate the depth sounding data with a location based on the positioning data; and wherein the display device is configured to render indications of the depth sounding data with the sonar image.

36. The apparatus of claim 7, wherein the processing circuitry is configured to dynamically adjust the scan rate based on a speed of the watercraft such that the transducer assembly is configured to repeatedly emit the sonar beam at a first scan rate when the watercraft is traveling at a first speed and a second scan rate when the watercraft is traveling at a second speed, wherein the first scan rate is greater than the second scan rate and the first speed is greater than the second speed.

37. A method comprising:
emitting a sonar beam by a transducer assembly affixed to a watercraft;
receiving return echoes of the sonar beam;
converting the return echoes into raw sonar data;
determining positioning data by position sensing circuitry, the positioning data being indicative of a position of the watercraft;
receiving the raw sonar data and the positioning data by processing circuitry;
converting the raw sonar data into range cell data based at least on amplitudes of the return echoes;
making a location-based association between the range cell data and the positioning data;
plotting the range cell data based on respective positions derived from the positioning data and rotating the range cell data based on a direction of movement of the watercraft to generate adjusted range cell data;
converting the adjusted range cell data into sonar image data; and
rendering, by a display device, at least a portion of a sonar image over a geographic map at a position and oriented in the direction of movement of the watercraft, wherein the sonar image is based on the sonar image data, wherein the position of the sonar image on the geographic map corresponds to the position of the watercraft associated with the sonar image data;
wherein, in an instance in which at least two sets of range cell data are associated with a same location, the display device is configured to render the portion of the sonar image at the same location corresponding to one of the at least two sets of range cell data, wherein each set of range cell data of the at least two sets of range cell data comprises an amplitude value at the same location, and wherein the amplitude value for the one of the at least two sets of range cell data that corresponds to the rendered portion of the sonar image is larger than any of the other amplitude values of the other sets of range cell data of the at least two sets of range cell data.

38. The method of claim 37, wherein emitting the sonar beam includes emitting a fan-shaped sonar beam, wherein the transducer assembly is configured to be positioned on the watercraft to operate as a side scan sonar transducer assembly.

39. The method of claim 37, wherein rendering the sonar image includes rendering the sonar image as one of a plurality of selectable layers.

40. The method of claim 37, wherein the method further comprises spreading the range cell data on the outside of a turn when the watercraft turns.

41. The method of claim 39, wherein the plurality of selectable layers includes a weather layer, a radar layer, or a depth sounding layer.

42. The method of claim 37, wherein rendering the sonar image includes rendering the sonar image as a semi-transparent layer.

43. The method of claim 37, wherein emitting the sonar beam includes repeatedly emitting the sonar beam at a scan rate to generate, and upon generation transmit to the processing circuitry, incremental sets of raw sonar data including a given incremental set of the raw sonar data;

wherein the method further comprises, in response to receiving the given incremental set of raw sonar data, processing the incremental set of raw sonar data to generate a sonar column of range cell data, and generating a given incremental set of sonar image data based on the sonar column of range cell data; and wherein the method further comprises, in response to the generation of the given incremental set of sonar image data, rendering the sonar image based on the given incremental set of sonar image data.

44. The method of claim 43 further comprising scaling the sonar column of range cell data based on a zoom level of the geographic map.

45. The method of claim 43 further comprising orienting the sonar column of range cell data relative to a coordinate system of the geographic map.

46. The method of claim 43, wherein rendering the sonar image includes rendering the sonar image at the position on the geographic map that is associated with an area that the transducer assembly captured the return echoes of the sonar beam.

47. The method of claim 43, wherein determining the positioning data includes determining the positioning data of the watercraft as GPS coordinates; and wherein plotting and rotating the range cell data is performed using the GPS coordinates.

48. The method of claim 43 further comprising:
generating a respective sonar column of range cell data for each incremental set of raw sonar data; and
rendering the sonar image based on the sonar columns of range cell data.

49. The method of claim 43 further comprising discontinuing the rendering of an oldest sonar image upon rendering the sonar image.

50. The method of claim 43, wherein the transducer assembly is configured to be positioned on the watercraft to operate as a side scan sonar transducer assembly; and wherein the method further comprises rotating the sonar column of range cell data based on the direction of movement of the watercraft such that the sonar image is rotated to extend in a direction that is substantially perpendicular to the direction of movement of the watercraft.

51. The method of claim 43 further comprising determining a horizontal extent of the sonar column of range cell data, and wherein rendering the sonar image includes rendering a visual indicator of a position indicating the horizontal extent of the sonar column of range cell data.

52. The method of claim 51, wherein rendering the visual indicator includes rendering the visual indicator without also presenting information representative of the echo returns.

53. The method of claim 51 further comprising storing the sonar column of range cell data in a data storage device.

54. The method of claim 51 further comprising determining a horizontal extent of the sonar column of range cell data based on the positioning data.

55. The method of claim 37 further comprising analyzing the range cell data to identify a water column portion of the range cell data, wherein the water column portion of the range cell data is a portion of the range cell data describing the echo returns from a volume extending from the transducer assembly to the seafloor based on an angle of the sonar beam; and removing the range cell data in the water column portion.

56. The method of claim 55, wherein analyzing the range cell data to identify the water column portion includes identifying the water column portion of the range cell data based on a quantity of echo returns in a given area exceeding a relative threshold.

57. The method of claim 55 further comprising determining seafloor depth data, and wherein analyzing the range cell data to identify the water column portion includes identifying the water column portion of the range cell data based on the seafloor depth data.

58. The method of claim 37 further comprising analyzing the range cell data to identify a water column portion of the range cell data and a seafloor surface portion of the range cell data, wherein the water column portion of the range cell data is a portion of the range cell data describing the echo returns from a volume extending from the transducer assembly to the seafloor based on an angle of the sonar beam, and wherein the seafloor surface portion is a portion of the range cell data describing the echo returns that interact with the seafloor; and wherein the method further comprises removing the range cell data in the water column portion and expanding the range cell data of the seafloor surface portion to maintain a width of the range cell data despite the omission of the water column portion.

59. The method of claim 37 further comprising storing the range cell data as a sonar log file in a data storage device.

60. The method of claim 59, wherein plotting and rotating the range cell data includes plotting and rotating the range cell data in the sonar log file.

61. The method of claim 60, wherein converting the adjusted range cell data includes:
determining a geographic area covered by the adjusted range cell data;
based on the geographic area, applying a first grid system to the adjusted range cell data to group the adjusted range cell data into one or more tiles; and
separately storing the groups of adjusted range cell data within respective tiles of the one or more tiles.

62. The method of claim 61, wherein separately storing the groups of adjusted range cell data within the respective tiles includes separately storing the groups of adjusted range cell data at a first resolution within the respective tiles as one resolution layer of a data structure comprising a plurality of resolution layers.

63. The method of claim 62 further comprising applying a second grid system to the adjusted range cell data at a second resolution.

64. The method of claim 63 further comprising generating a node tree indicative of an architecture of the resolution layers and tiles of the data structure.

65. The method of claim 62, wherein the sonar image data is the derived from range cell data of a tile associated with one of the plurality of resolution layers of the data structure.

66. The method of claim 62 further comprising selecting one of the plurality of resolution layers based on a resolution of the geographic map.

67. The method of claim 62 further comprising selecting one of the plurality of resolution layers based on a resolution of the presentation of the geographic map and a node tree indicative of an architecture of the resolution layers and tiles of the data structure.

68. The method of claim 62 further comprising:
scaling and orienting the range cell data of a given tile based on an orientation and zoom level of the presentation of the geographic map;
coloring the range cell data of the given tile by applying a color palette to the range cell data of the given tile; and
wherein the sonar image data is derived from the range cell data of the given tile that has been oriented, scaled, and colored.

69. The method of claim 68, wherein coloring the range cell data of the given tile includes coloring the range cell data of the given tile to impart information indicating a density of echo returns at a location of the range cell data of the given tile.

70. The method of claim 61, wherein applying the first grid system to the adjusted range cell data to group the adjusted range cell data into tiles includes defining each tile based on characteristics including a tile center point, and a tile width.

71. The method of claim 37 further comprising:
receiving depth sounding data;
associating the depth sounding data with a location based on the positioning data; and
rendering indications of the depth sounding data with the sonar imaging data.

72. The method of claim 43 further comprising dynamically adjusting the scan rate based on a speed of the watercraft such that the transducer assembly is configured to repeatedly emit the sonar beam at a first scan rate when the watercraft is traveling at a first speed and a second scan rate when the watercraft is traveling at a second speed, wherein the first scan rate is greater than the second scan rate and the first speed is greater than the second speed.

73. A non-transitory computer-readable medium comprised of at least one memory device having computer program instructions stored thereon, the computer program instructions being configured, when executed by processing circuitry, to:
cause transmission of a sonar beam via a transducer assembly affixed to a watercraft;
determine positioning data by position sensing circuitry, the positioning data being indicative of a position of the watercraft;
convert received raw sonar data into range cell data based at least on amplitudes of return echoes of the sonar beam received by the transducer assembly, wherein the raw sonar data is based on the return echoes;
make a location-based association between the range cell data and the positioning data;
plot the range cell data based on respective positions derived from the positioning data and rotate the range cell data based on a direction of movement of the watercraft to generate adjusted range cell data;
convert the adjusted range cell data into sonar image data; and
render at least a portion of a sonar image over a geographic map at a position and oriented in the direction of movement of the watercraft, wherein the sonar image is based on the sonar image data, wherein the position of the sonar image on the geographic map corresponds to the position of the watercraft associated with the sonar image data;
wherein, in an instance in which at least two sets of range cell data are associated with a same location, the portion of the sonar image that is rendered at the same location corresponds to one of the at least two sets of range cell data, wherein each set of range cell data of the at least two sets of range cell data comprises an amplitude value at the same location, and wherein the amplitude value for the one of the at least two sets of range cell data that corresponds to the rendered portion of the sonar image is larger than any of the other amplitude values of the other sets of range cell data of the at least two sets of range cell data.

74. The computer-readable medium of claim 73, wherein the computer program instructions are configured to cause transmission of a rectangular sonar beam, wherein the transducer assembly is a member of a transducer array and the transducer assembly is configured to be positioned on the watercraft to operate as a side scan sonar transducer assembly.

75. The computer-readable medium of claim 73, wherein the computer program instructions are configured to render the sonar image as one of a plurality of selectable layers over the geographic map.

76. The computer program product of claim 73, wherein the computer program instructions are configured to spread the range cell data on the outside of a turn when the watercraft turns.

77. The computer-readable medium of claim 75, wherein the plurality of selectable layers includes a weather layer, a radar layer, or a depth sounding layer.

78. The computer-readable medium of claim 73, wherein the computer program instructions are configured to render the sonar image as a semi-transparent layer over the geographic map.

79. The computer-readable medium of claim 73, wherein the computer program instructions are configured to cause repeated transmission of the sonar beam at a scan rate to generate, and upon generation transmit to the processing circuitry, incremental sets of raw sonar data including a given incremental set of the raw sonar data;
wherein the computer program instructions are further configured to, in response to receiving the given incremental set of raw sonar data, process the incremental set of raw sonar data to generate a sonar column of range cell data, and generate a given incremental set of sonar image data based on the sonar column of range cell data; and
wherein the computer program instructions are further configured to, in response to the generation of the given incremental set of sonar image data, render the sonar image based on the given incremental set of sonar image data.

80. The computer-readable medium of claim 79, wherein the computer program instructions are further configured to scale the sonar column of range cell data based on a zoom level of the geographic map.

81. The computer-readable medium of claim 79, wherein the computer program instructions are further configured to orient the sonar column of range cell data relative to a coordinate system of the geographic map.

82. The computer-readable medium of claim 79, wherein the computer program instructions are configured to render the sonar image at the position on the geographic map that is associated with an area that the transducer assembly captured the return echoes of the sonar beam.

83. The computer-readable medium of claim 79, wherein the computer program instructions are configured to determine the positioning data of the watercraft as GPS coordinates; and wherein the computer program instructions are configured to plot and rotate the range cell data using the GPS coordinates.

84. The computer-readable medium of claim 79, wherein the computer program instructions are further configured to:
generate a respective sonar column of range cell data for each incremental set of raw sonar data; and
render the sonar image based on the sonar columns of range cell data.

85. The computer-readable medium of claim 79, wherein the computer program instructions are further configured to discontinue rendering an oldest sonar image upon rendering the sonar image.

86. The computer-readable medium of claim 79, wherein the computer program instructions are further configured to rotate the sonar column of range cell data based on the direction of movement of the watercraft such that the sonar image is rotated to extend in a direction that is substantially perpendicular to the direction of movement of the watercraft, wherein the transducer assembly is configured to be positioned on the watercraft to operate as a side scan sonar transducer assembly.

87. The computer-readable medium of claim 79, wherein the computer program instructions are further configured to determine a horizontal extent of the sonar column of range cell data, and wherein the computer program instructions configured to render the sonar image by rendering a visual indicator of a position indicating the horizontal extent of the sonar column of range cell data.

88. The computer-readable medium of claim 87, wherein the computer program instructions are configured to render the visual indicator without also presenting information representative of the echo returns.

89. The computer-readable medium of claim 87, wherein the computer program instructions are further configured to store the sonar column of range cell data in a data storage device.

90. The computer-readable medium of claim 87, wherein the computer program instructions are further configured to determine a horizontal extent of the sonar column of range cell data based on the positioning data.

91. The computer-readable medium of claim 73, wherein the computer program instructions are further configured to:
analyze the range cell data to identify a water column portion of the range cell data, wherein the water column portion of the range cell data is a portion of the range cell data describing the echo returns from a volume extending from the transducer assembly to the seafloor based on an angle of the sonar beam; and
remove the range cell data in the water column portion.

92. The computer-readable medium of claim 91, wherein the computer program instructions are configured to identify the water column portion of the range cell data based on a quantity of echo returns in a given area exceeding a relative threshold.

93. The computer-readable medium of claim 91, wherein the computer program instructions are further configured to determine seafloor depth data, and wherein the computer program instructions configured to identify the water column portion of the range cell data based on the seafloor depth data.

94. The computer-readable medium of claim 73, wherein the computer program instructions are further configured to analyze the range cell data to identify a water column portion of the range cell data and a seafloor surface portion of the range cell data, wherein the water column portion of the range cell data is a portion of the range cell data describing the echo returns from a volume extending from the transducer assembly to the seafloor based on an angle of the sonar beam, and wherein the seafloor surface portion is a portion of the range cell data describing the echo returns that interact with the seafloor; and
wherein the computer program instructions are further configured to remove the range cell data in the water column portion and expand the range cell data of the seafloor surface portion to maintain a width of the range cell data despite the omission of the water column portion.

95. The computer-readable medium of claim 73, wherein the computer program instructions are further configured to store the range cell data as a sonar log file in a data storage device.

96. The computer-readable medium of claim 95, wherein the computer program instructions are configured to plot and rotate the range cell data in the sonar log file.

97. The computer-readable medium of claim 96, wherein the computer program instructions are configured to convert the adjusted range cell data by:
determining a geographic area covered by the adjusted range cell data;
applying, based on the geographic area, a first grid system to the adjusted range cell data to group the adjusted range cell data into one or more tiles; and
separately storing the groups of adjusted range cell data within respective tiles of the one or more tiles.

98. The computer-readable medium of claim 97, wherein the computer program instructions are configured to separately store the groups of adjusted range cell data within the respective tiles at a first resolution within the respective tiles as one resolution layer of a data structure comprising a plurality of resolution layers.

99. The computer-readable medium of claim 97, wherein the computer program instructions are further configured to apply a second grid system to the adjusted range cell data at a second resolution.

100. The computer-readable medium of claim 99, wherein the computer program instructions are further configured to generate a node tree indicative of an architecture of the resolution layers and tiles of the data structure.

101. The computer-readable medium of claim 98, wherein the sonar image data is the derived from range cell data of a tile associated with one of the plurality of resolution layers of the data structure.

102. The computer-readable medium of claim 98, wherein the computer program instructions are further configured to select one of the plurality of resolution layers based on a resolution of the presentation of the geographic map.

103. The computer-readable medium of claim 98, wherein the computer program instructions are further configured to select one of the plurality of resolution layers based on a resolution of the presentation of the geographic map and a node tree indicative of an architecture of the resolution layers and tiles of the data structure.

104. The computer-readable medium of claim 98, wherein the computer program instructions are further configured to:
scale and orient the range cell data of a given tile based on an orientation and zoom level of the presentation of the geographic map; and
color the range cell data of the given tile by applying a color palette to the range cell data of the given tile; and
wherein the sonar image data is derived from the range cell data of the given tile that has been oriented, scaled, and colored.

105. The computer-readable medium of claim 104, wherein the computer program instructions are configured to color the range cell data of the given tile to impart information indicating a density of echo returns at a location of the range cell data of the given tile.

106. The computer-readable medium of claim 97, wherein the computer program instructions configured to define each tile based on characteristics including a tile center point, and a tile width.

107. The computer-readable medium of claim 73, wherein the computer program instructions are further configured to:
associate received depth sounding data with a location based on the positioning data; and
render indications of the depth sounding data with the sonar image.

108. The computer program product of claim 79, the computer program instructions configured to dynamically adjust the scan rate based on a speed of the watercraft such that the transducer assembly is configured to repeatedly emit the sonar beam at a first scan rate when the watercraft is traveling at a first speed and a second scan rate when the watercraft is traveling at a second speed, wherein the first scan rate is greater than the second scan rate and the first speed is greater than the second speed.

* * * * *